United States Patent
Newton

(10) Patent No.: US 7,137,385 B2
(45) Date of Patent: Nov. 21, 2006

(54) DEVICE TO PROVIDE A REGULATED POWER SUPPLY FOR IN-CYLINDER IONIZATION DETECTION BY USING THE IGNITION COLI FLY BACK ENERGY AND TWO-STAGE REGULATION

(75) Inventor: Stephen J. Newton, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 299 days.

(21) Appl. No.: 10/458,712

(22) Filed: Jun. 11, 2003

(65) Prior Publication Data

US 2004/0084035 A1 May 6, 2004

Related U.S. Application Data

(60) Provisional application No. 60/467,660, filed on May 2, 2003, provisional application No. 60/423,163, filed on Nov. 1, 2002.

(51) Int. Cl.
  *F02P 17/12* (2006.01)
(52) U.S. Cl. ..................... 123/630; 324/388
(58) Field of Classification Search ............... 123/618, 123/620, 630, 655, 198 DC, 198 D, 198 DA, 123/652; 73/35.08; 324/388, 399, 378, 324/379
See application file for complete search history.

(56) References Cited

U.S. PATENT DOCUMENTS

| 4,069,665 | A | | 1/1978 | Bolasny | 60/275 |
| 4,696,280 | A | | 9/1987 | Niggemeyer | 123/598 |
| 5,060,623 | A | | 10/1991 | McCoy | 123/605 |
| 5,531,206 | A | | 7/1996 | Kitson et al. | 123/596 |
| 5,548,220 | A | | 8/1996 | Kawamoto et al. | 324/399 |
| 5,561,239 | A | * | 10/1996 | Yasuda | 73/35.08 |
| 5,592,118 | A | | 1/1997 | Wilmot et al. | 327/440 |
| 5,602,332 | A | | 2/1997 | Pyko | 73/117.3 |
| 5,636,620 | A | | 6/1997 | Kiess et al. | 123/625 |
| 5,638,799 | A | | 6/1997 | Kiess et al. | 123/637 |
| 5,656,966 | A | | 8/1997 | Wilmot et al. | 327/440 |
| 5,675,072 | A | | 10/1997 | Yasuda et al. | 73/35.08 |
| 5,701,876 | A | | 12/1997 | Morita et al. | 123/630 |
| 5,755,206 | A | | 5/1998 | Takahashi et al. | 123/425 |
| 5,781,012 | A | | 7/1998 | Yasuda | 324/399 |
| 5,785,020 | A | | 7/1998 | Takahashi et al. | 123/425 |
| 5,852,381 | A | | 12/1998 | Wilmot et al. | 327/440 |
| 5,936,830 | A | | 8/1999 | Rousseau et al. | 361/253 |
| 5,959,192 | A | * | 9/1999 | Mogi et al. | 73/35.08 |
| 6,011,397 | A | | 1/2000 | Yasuda | 324/388 |
| 6,040,698 | A | | 3/2000 | Takahashi et al. | 324/399 |

(Continued)

FOREIGN PATENT DOCUMENTS

JP   2001073919 A   3/2001

(Continued)

*Primary Examiner*—Willis R. Wolfe
*Assistant Examiner*—Johnny H. Hoang
(74) *Attorney, Agent, or Firm*—Dickinson Wright PLLC

(57) ABSTRACT

This feature of the present invention comprises a method and apparatus that provides a regulated power supply for in-cylinder ionization detection by harvesting the excess ignition coil leakage and magnetizing energy immediately following the turn off of the ignition coil IGBT. It uses an additional energy storage capacitor which replaces a first capacitor as the primary energy storage device. Thus, this feature of the present invention uses a two step method for charging the ionization detection circuit, as opposed to just one stage. The second capacitor is charged first, typically up to 400 Volts DC, and is then used as a reservoir to charge the first capacitor.

14 Claims, 54 Drawing Sheets

U.S. PATENT DOCUMENTS

| | | | |
|---|---|---|---|
| 6,075,366 A | 6/2000 | Yasuda | 324/380 |
| 6,118,276 A * | 9/2000 | Nakata et al. | 324/464 |
| 6,186,129 B1 | 2/2001 | Butler, Jr. | 123/620 |
| 6,196,054 B1 | 3/2001 | Okamura et al. | 73/35.08 |
| 6,202,474 B1 | 3/2001 | Takahashi et al. | 73/35.08 |
| 6,205,844 B1 | 3/2001 | Morita et al. | 73/35.08 |
| 6,216,530 B1 | 4/2001 | Shimizu et al. | 73/116 |
| 6,222,367 B1 | 4/2001 | Shimizu et al. | 324/380 |
| 6,222,368 B1 | 4/2001 | Inagaki et al. | 324/399 |
| 6,343,500 B1 | 2/2002 | Katogi et al. | 73/35.08 |
| 6,360,587 B1 * | 3/2002 | Noel | 73/35.08 |
| 6,539,930 B1 * | 4/2003 | Inagaki | 123/655 |
| 6,779,517 B1 * | 8/2004 | Sakakura | 123/630 |

FOREIGN PATENT DOCUMENTS

| | | |
|---|---|---|
| WO | WO 97/27400 | 7/1997 |

\* cited by examiner

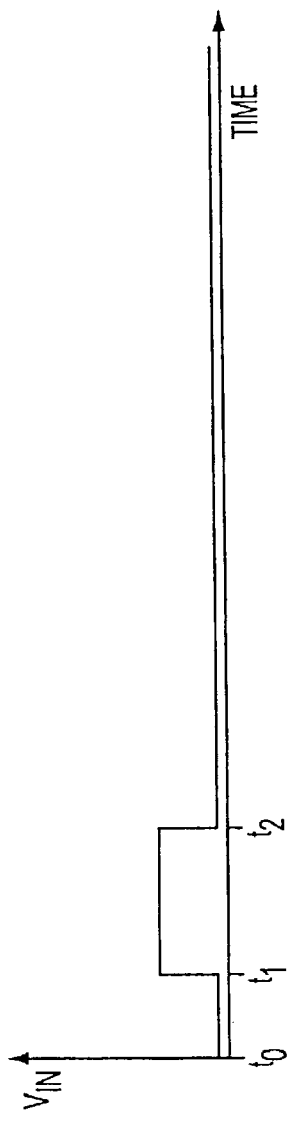
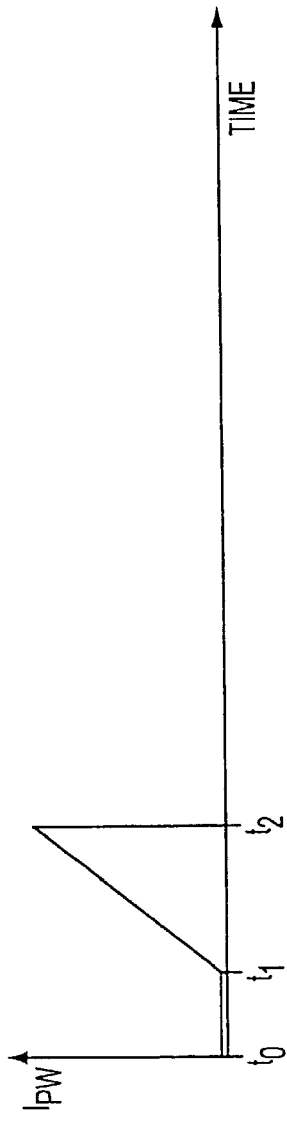
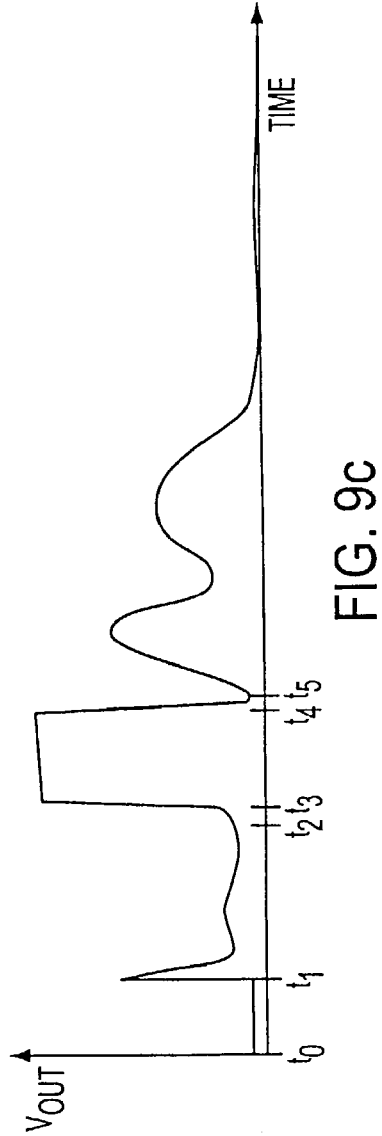
FIG. 9a
FIG. 9b
FIG. 9c

DEVICE TO PROVIDE A REGULATED POWER SUPPLY FOR IN-CYLINDER IONIZATION DETECTION BY USING THE IGNITION COLI FLY BACK ENERGY AND TWO-STAGE REGULATION

CROSS-REFERENCE TO RELATED APPLICATIONS

This application claims benefit of U.S. Provisional Application Ser. Nos. 60/423,163, filed Nov. 1, 2002, and 60/467,660, filed May 2, 2003, the entire disclosure of these applications being considered part of the disclosure of this application and hereby incorporated by reference.

BACKGROUND OF THE INVENTION

1. Technical Field

This invention is related to the field of automobile ignition diagnosis systems. More particularly, it is related to the field of using an ionization signal from an ionization detection circuit to monitor ignition parameters and diagnose engine performance.

2. Discussion

The prior art includes a variety of conventional methods for detecting and using ionization current in a combustion chamber of an internal combustion engine. However, each of the various conventional systems suffers from a great variety of deficiencies. For example, prior art ionization current detection circuits are generally too slow and generate a current signal with low signal-to-noise ratio.

The ionization current of an internal combustion engine can be used for diagnosing engine misfire, knock, ignition timing and duration, etc. Through sophisticated signal conditioning processing, the individual cylinder combustion properties can also be obtained. Therefore, the engine combustion process can be precisely monitored and controlled in closed loop. To detect in-cylinder ions generated during the combustion process, a DC bias voltage needs to be applied between the spark plug gap. There are two ways to generate the DC bias: conventional DC power supply (large electronics) and capacitor charges by primary or secondary flyback voltage (high voltage capacitor). Both approaches present disadvantages due to the size of DC power supply and reliability of high voltage capacitors.

SUMMARY OF THE INVENTION

In view of the above, the described features of the present invention generally relate to one or more improved systems, methods and/or apparatuses for detecting and/or using an ionization current in the combustion chamber of an internal combustion engine.

In one embodiment, the invention comprises a method of providing a regulated power supply, including the steps of harvesting an excess ignition coil leakage and magnetizing energy following turn off of the ignition coil.

In another embodiment, the step of harvesting an excess ignition coil leakage energy comprises the steps of turning a switch off, reversing a transformer primary voltage, forward biasing a diode, and charging a capacitor.

In a further embodiment, the step of harvesting magnetizing energy following turn off of the ignition coil comprises supplying current to at least one ionization circuit.

In another embodiment, the step of harvesting magnetizing energy following turn off of the ignition coil comprises supplying current to a second capacitor.

In a further embodiment, the invention comprises an ionization detection bias circuit comprising an ignition coil having a primary winding and a secondary winding, a spark plug operably connected between the secondary winding and ground potential, a switch having a first node operably connected between the primary winding and ground potential, a first capacitor having a first end and a second end, whereby the second end is operably connected to ground, a diode operably connected between the first end of the first capacitor and the first node of the switch, a second capacitor having a first end and a second end, whereby the second end is operably connected to ground, and a resistor operably connected between the first end of the first capacitor and the first end of the second capacitor.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 9a is a graph of the control signal $V_{IN}$ from the PCM to the IGBT versus time.

FIG. 9b is a graph of the current flow $I_{PW}$ through the primary winding of the ignition coil versus time;

FIG. 9c illustrates an output voltage signal Vout resulting from a normal combustion event.

DETAILED DESCRIPTION OF THE PREFERRED EMBODIMENT

Figure 1:
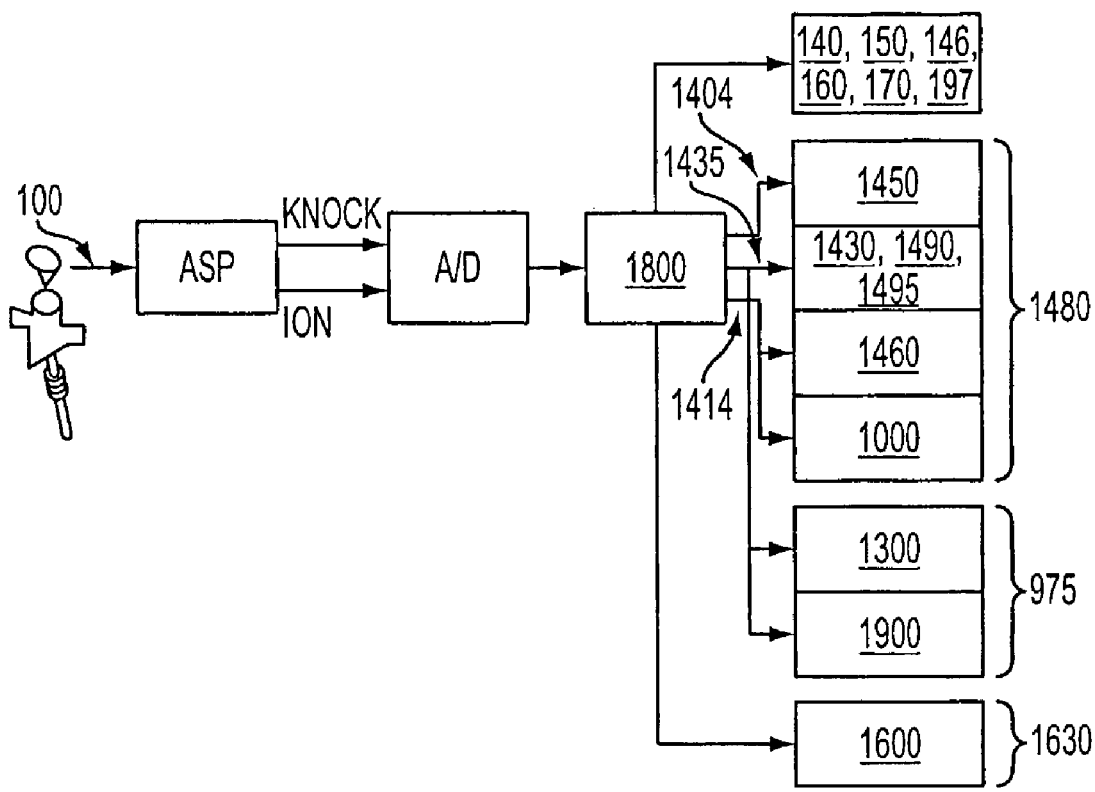
FIG. 1 illustrates an ionization feedback and control system.

The present invention detects an ionization signal in an engine combustion chamber from an ionization detection circuit. The system and associated subsystems described herein used the detected ionization signal to monitor ignition parameters, diagnose and improve engine performance, detect cylinder ID, control air-to-fuel ratio, control spark retard timing, control minimum timing for best torque timing, and control exhaust gas recirculation, in addition to other features disclosed in the following embodiments. For clarity, it is noted that many of the details concerning the two step method and apparatus for charging an ionization detection circuit in which an additional energy storage capacitor is used according to the present invention are described in Section G of this detailed description.

This detailed description includes a number of inventive features generally related to the detection and/or use of an ionization current. The features may be used alone or in combination with other described features. While one or more of the features are the subject of the pending claims, other features not encompassed by the appended claims may be covered by the claims in one or more separate applications filed on even date by or on behalf of the assignee of the present application.

For clarity, each of the features is described in separate sections of this detailed description. Section A discloses the use of an ionization signal from an ionization detection circuit monitor ignition parameters, such as primary charge timing (or time), primary charge duration, ignition or spark timing, and ignition or spark duration for future "smart" ignition system control.

Section B discloses a circuit for measuring ionization current in a combustion chamber of an internal combustion engine in this circuit, the ignition current and the ionization current flow in the same direction through the secondary winding of the ignition coil and the circuit detects an ionization signal by applying a bias voltage between a spark plug gap. Notwithstanding the described preferred circuit, those skilled in the art will appreciate that many of the features of the invention may be implemented through other ionization detection circuits or methodologies without departing from the scope of the appended claims.

Sections C and D generally relate to methods of detecting cylinder identification using in-cylinder ionization for spark detection. More particularly, Section C discloses a method of detecting cylinder identification using the spark phase of an ionization signal to determine the current engine crank cycle, i.e., Cylinder Identification in which the spark coils are only partially charged (instead of fully charged) to a predetermined level. When the air in a cylinder is compressed (cylinder is in the compression stroke), the resistance between the spark plug electrodes will increase. The cylinders that fail to fire are on the compression stroke because the gas mixture density is high enough that the partially charged coils are unable to deliver the voltage required to break down the resistance at the spark plug gap. Further, Section D discloses methods of detecting cylinder identification by determining which cylinder is in compression. The cylinder with the shortest spark duration is in compression. The two methods used to time this duration are edge detection and integration.

Section E discloses a circuit comprising an ionization detection circuit and a coil driver transistor which are integrated into the on-plug ignition coil. By placing the circuit on top of the coil or on the side of the coil, the connection distance from the circuit to the secondary winding is minimized. Thus, the circuit is less susceptible to noise. Another advantage is that the placement is easy to assemble.

Section F discloses a method and apparatus to multiplex both the ionization and driver current feedback signals into one signal so that the ignition coil with integrated driver and ionization circuit has the same pin count number as the driver on coil design. When integrating both the ignition driver circuit and ionization detection circuit onto the ignition coil (as described in Section E), one open issue is to use minimum pin count of the integrated package to cover both integrated driver and ionization detection circuits for reduced cost. By multiplexing the ignition coil charge current feedback signal with the ionization signal, package pin count is reduced by one.

Section G discloses a two step method and apparatus for charging an ionization detection circuit, as opposed to just one stage, in which an additional energy storage capacitor is used. The second capacitor replaces the first capacitor as the primary energy storage device. This two stage method of charging produces a stable 100 volt output at the first capacitor. In addition, by using two capacitors or stages, more energy is available to the ionization detection circuit.

Section H discloses multiplexing the ignition primary charge gate signal with both the ionization and the driver current feedback signals so that the ignition coil with an integrated drover and an ionization circuit (See Section E) has a pin count number as few as three.

Section J discloses the use of either an ASIC or a single electronic package to integrate an IGBT and an ionization detection electronics into one silicon device, or into one electronic package respectively. These devices reduce the cost and complexity of an in-cylinder ionization detection system by combining like functionality into one ASIC or electronic module easing packaging constraints.

Section K discloses the use of a high voltage charge pump to provide DC bias voltage for measuring ionization current.

Section A: Ignition Diagnosis Using Ionization Signal

This feature utilizes the ionization signal from an ionization detection circuit to monitor ignition parameters, such as primary charge timing (or time), primary charge duration, ignition or spark timing, and ignition or spark duration for future "smart" ignition system control. In addition, the ionization signal is also used to detect spark plug carbon fouling, insulator overheating, pre-ignition, as well as a failed ionization circuit or ignition coil.

The performance of an engine is heavily dependent upon the performance of its ignition system, especially at low load and high EGR (exhaust gas recirculation) conditions. Understanding how the ignition system behaves at various engine conditions is very beneficial to "smart" control of the ignition system. Typically, the primary coil of an ignition system is charged close to a desired amount of energy as a function of engine operational conditions such as the local mixture A/F (air to fuel) ratio, pressure, temperature, and EGR concentration. The actual charged energy of the primary coil and discharged energy of the secondary coil are unknown. This leads to an ignition system that is not robust to parts-to-parts variation, engine aging, engine operational environmental charges, etc. To improve the ignition system robustness, a "smart" ignition system that can change its charged energy to match the discharged energy is desirable. Therefore, the secondary discharge information is very important. Since the breakdown voltage and spark duration at the discharge moment can be different from cycle to cycle, it is desirable to monitor some of these parameters.

This invention uses the spark plug ionization signal to monitor the primary charge time (primary charge timing 146) and primary charge duration, and also the secondary discharge time and duration to lay the foundation for "smart" control of the ignition system 110. In addition, this invention also includes using the ionization signal to detect spark plug malfunction, such as carbon fouling or insulator overheating 197, pre-ignition 190, and a failed ionization circuit or/and ignition coil.

This feature of the invention is generally directed to a subsystem of an ignition diagnostics and feedback control system using ionization current feedback. The relationship of this subsystem to the diagnostics and control system is shown in FIG. 1 in the top box "Ignition system diagnostics", 140, 150, 146, 160, 170, and 197, which comprises the following ignition parameters: ignition duration 170, charge duration 150, warning signal 197, primary charge time 146, ignition timing 160, and pre-charge 140. The four blocks of the ignition diagnostics and feedback control system using ionization current feedback that are directed to spark timing 1480 are the CL knock (advance) limit control 1450, the closed-loop MBT spark control 1430, 1490 and 1495, CL misfire & partial burn (retard) limit control 1460 and the CL cold start retard limit control 1000. There are two blocks directed to the fuel trim vector 975, the individual cylinder A/F ratio control 1300 and the WOT A/F ratio optimization 1900. There is one block directed to the desired EGR rate 1630, the EGR rate optimization 1600. The three other blocks shown in FIG. 1 are an analog signal processing block ASP, an A/D conversion block A/D and a parameter estimation block 1800. The parameter estimation block is shown outputting knock 1404, MBT 1435 and misfire 1414 signals. The input to the analog signal processing block ASP is an ionization current 100.

Figure 2:
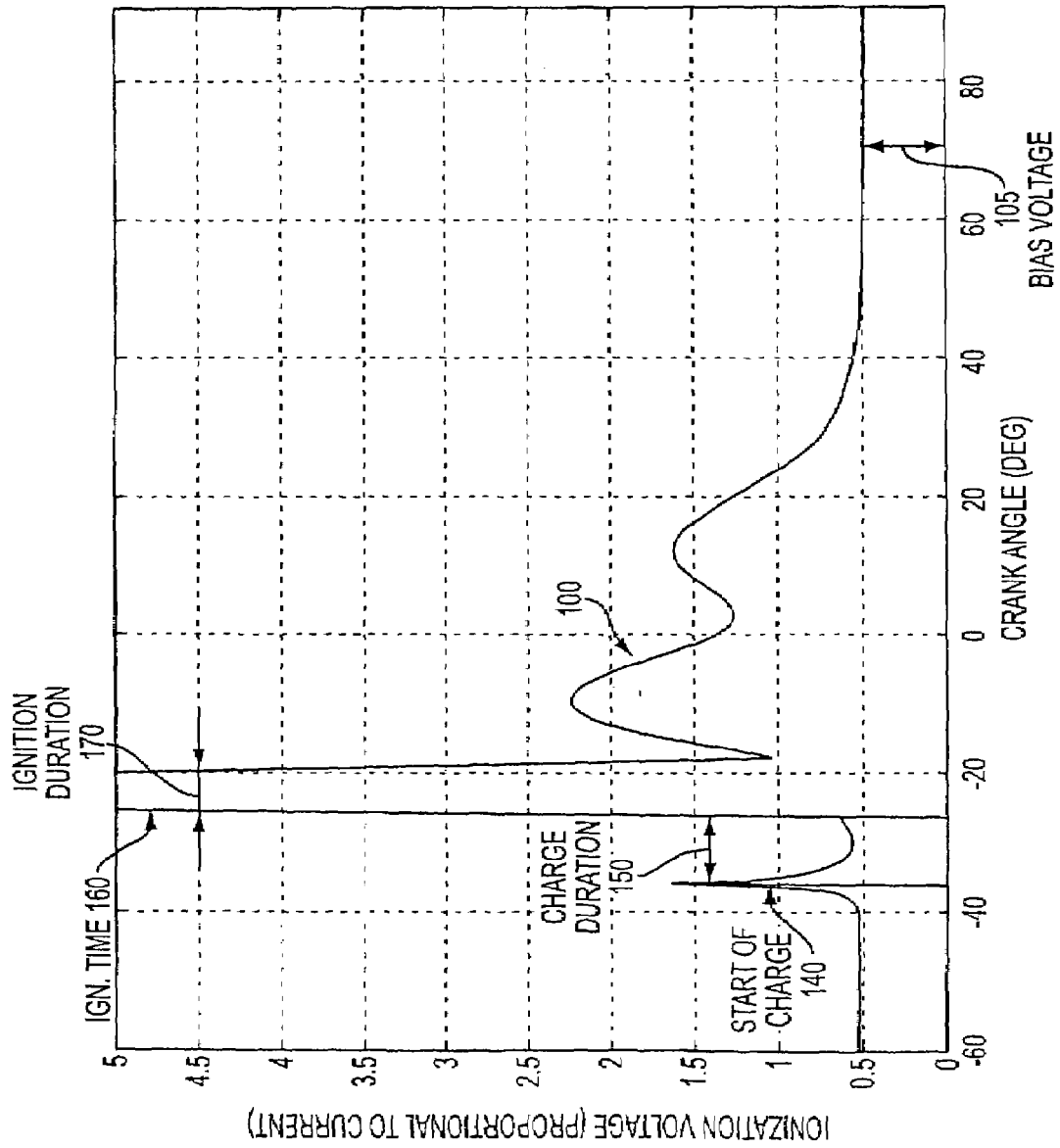
FIG. 2 is a graph of an ionization signal.
Figure 3:
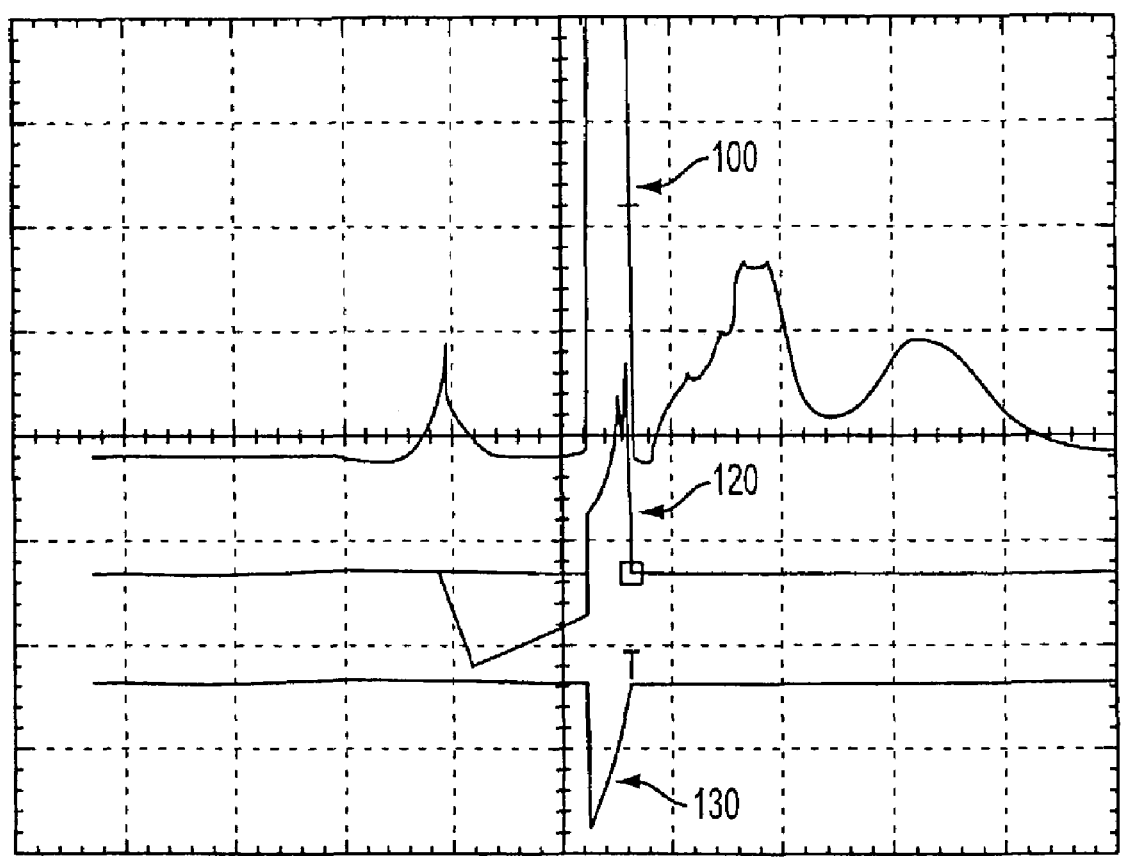
FIG. 3 is a graph that compares the secondary signals and the ionization signals.

A typical ionization signal 100 versus crank angle is shown in FIG. 2. Note that the signal shown is a voltage that is proportional to the detected ionization current. Comparing the secondary voltage 120 and current waveforms 130 (FIG. 3), it is clear that the initial rise of the ion signal before the sharp change at the ignition time is the pre-charge (or start of charge) of the primary coil 140. See FIG. 2. After the primary coil charge is completed, the signal goes down and rises almost vertically (i.e., a step rise) versus crank angle. The breakdown has occurred at the step's rising edge. Spark timing can be detected based on this point. That is, the ignition or spark time occurs when the ionization signal has a step rise. This is the ignition or spark time 160. The time difference between the first rise and the stepped rise is the primary charge duration 150. When the arc between the spark gap dies out, the signal declines rapidly and the secondary current 130 due to the spark reaches zero (see FIG. 3). The duration between the sharp stepped rising and the subsequent declining represents the ignition duration 170. Therefore, based on the ionization signal, the primary charge time 146, the primary charge duration 150, the ignition timing 160, and the ignition duration 170 can be detected. These parameters can be monitored for every cylinder of the engine for each engine cycle.

Figure 4:
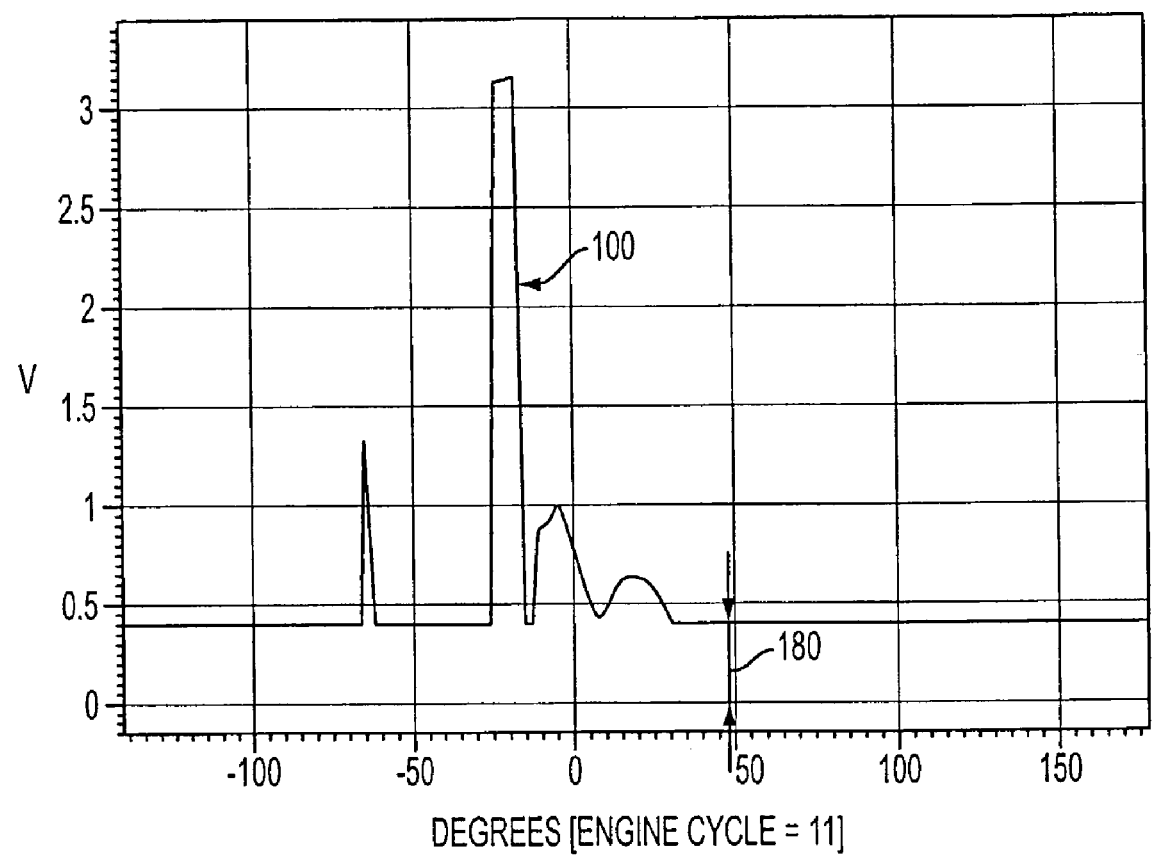
FIG. 4 is a graph of an ionization signal when the plug is fouled and the insulator is overheated.
Figure 6:
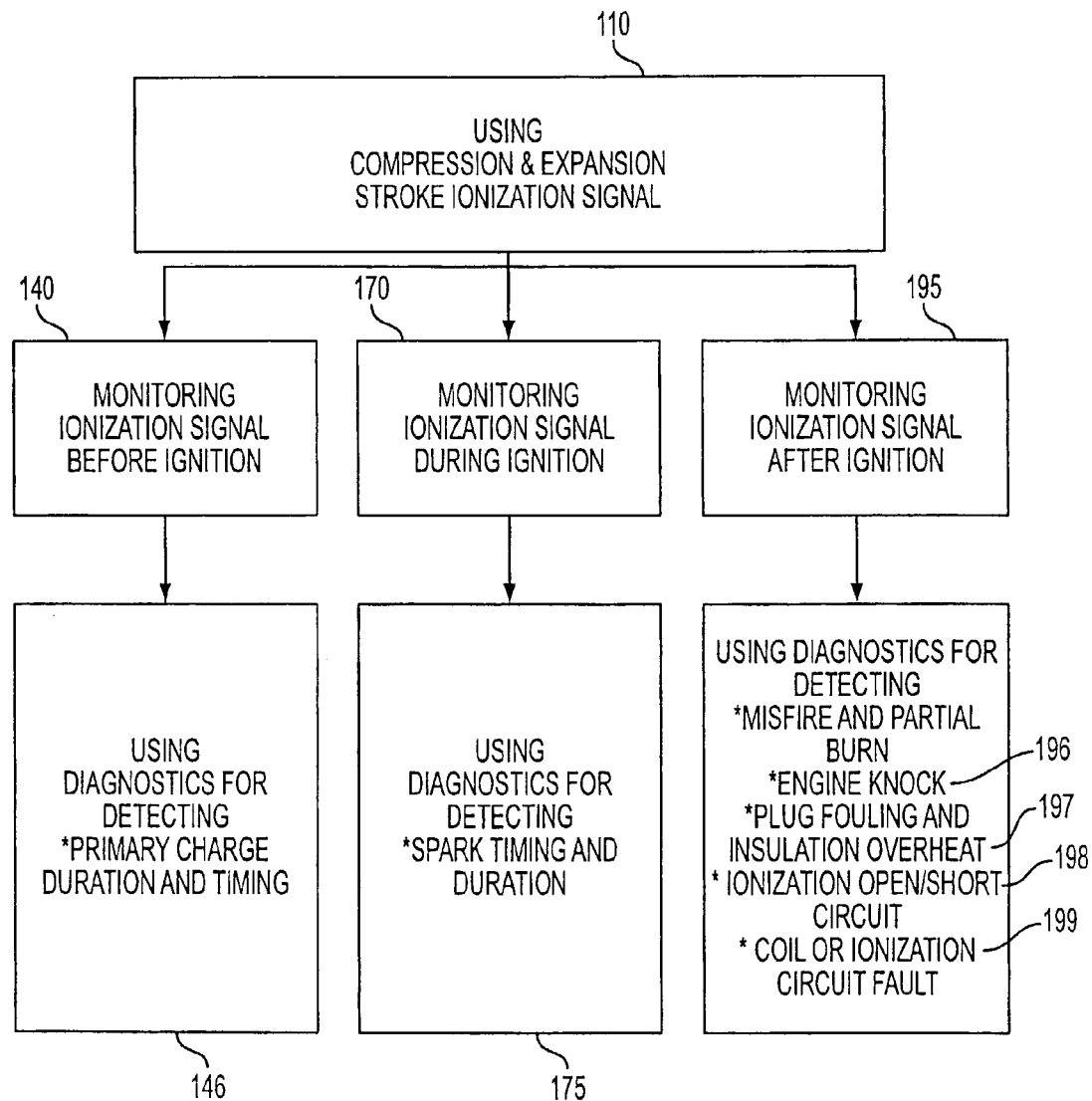
FIG. 6 is a diagnostics flowchart of the steps taken in the present embodiment of a method of monitoring ignition efficiency.

When a spark plug is fouled, or the spark plug insulator is overheated, or the plug itself is temporarily contaminated by fuel spray, the insulator of the spark plug serves as a conductor. At these conditions, the ionization signal baseline is no longer equal to the bias voltage 105. Depending on how badly the plug is fouled and how overheated the insulator is, the ionization baseline will be elevated 180 (FIG. 4) from the bias voltage 105. Meanwhile, part of the ignition energy will leak through the fouled plug or the insulator during the primary charge period. Eventually the remaining energy is not enough to jump the spark gap and a misfire will occur (196) (FIG. 6). For some cases, the baseline can be so high that it reaches the limit of the ionization signal and the signal becomes of little use. Once the baseline is elevated to (or beyond) a certain threshold (e.g., an elevation of approximately 20% or 1 volt above the initial baseline), a warning signal indicating plug fouling or overheating will be sent out 197 (FIG. 6).

Figure 5:
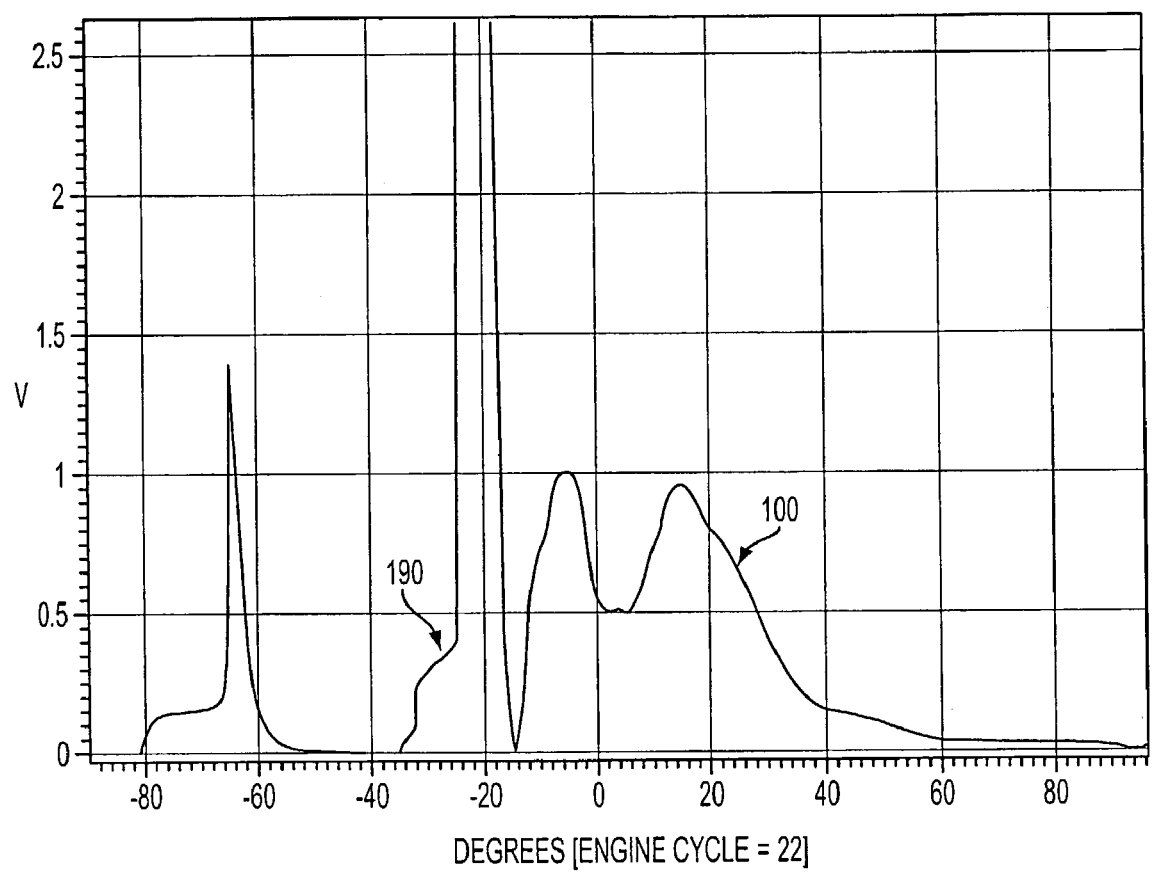
FIG. 5 illustrates the effect of pre-ignition on an ionization signal.

When pre-ignition occurs in the cylinder, the ionization signal 100 will detect ions before the ignition happens (190), see FIG. 5 which shows pre-ionization due to pre-ignition. One pre-ignition cycle could lead to an even earlier pre-ignition during the next cycle and damage the engine. It is desirable to control the engine to a cooler operating condition once the pre-ignition is detected.

Figure 7:
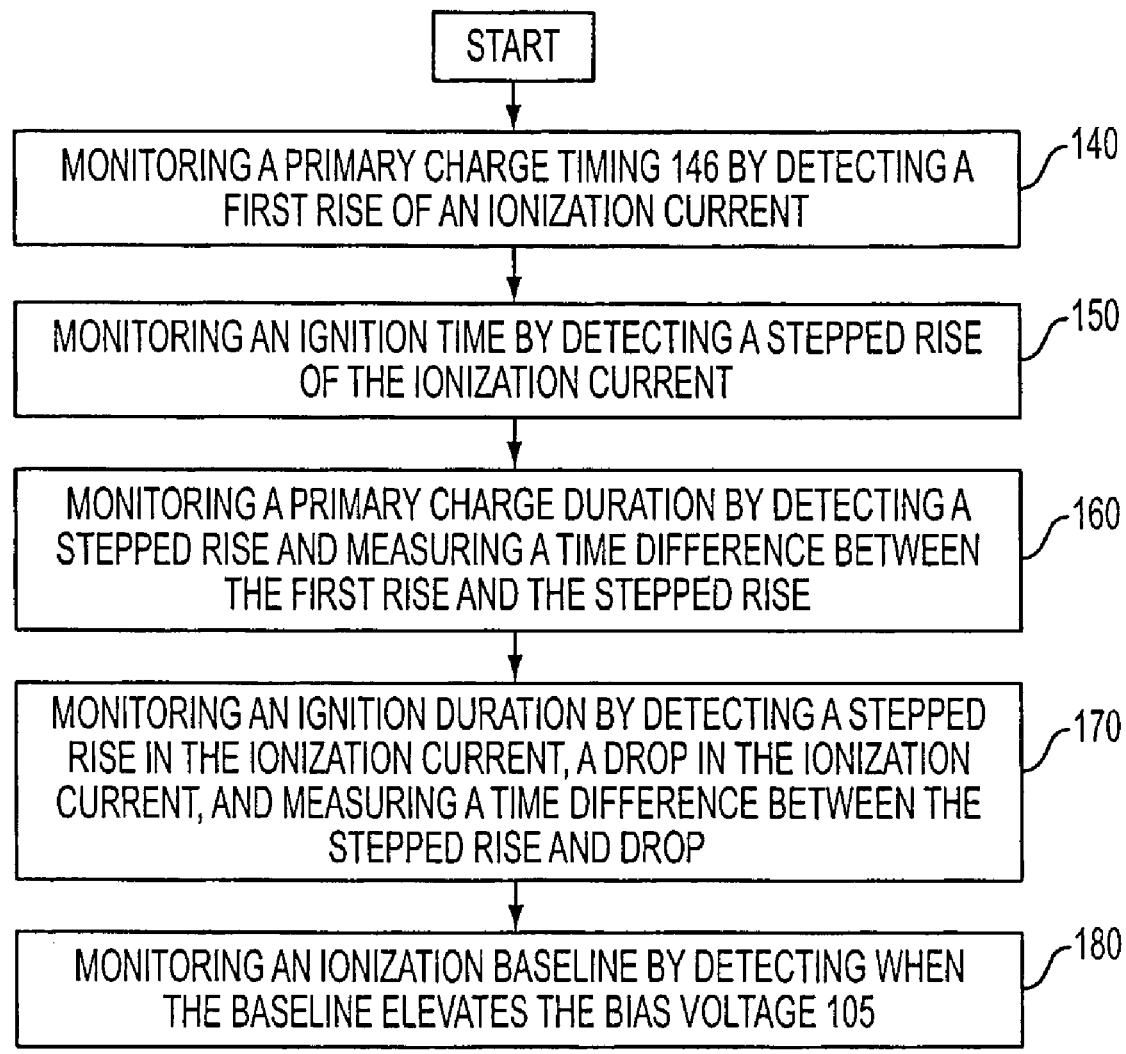
FIG. 7 is a flowchart of the steps taken in the present embodiment to diagnose the ignition using the ionization signal.

In order to detect an open or a shorted ionization circuit, the bias voltage (105) is sampled far away from the ignition and combustion events (e.g., 180 degree after the top dead center). If the sampled bias voltage is below a given threshold (such as 0.5 volt), an open ionization circuit or a short to ground fault can be detected 198 (FIG. 6); if the bias voltage is greater than a threshold (e.g., 4.5 volts), an ionization circuit that is shorted to the battery shall be declared 199 (FIG. 6). The open or short circuit information can then be used to diagnose the condition of the ignition system (see FIGS. 6 and 7).

Section B: Circuit for Measuring Ionization Current

Figure 8:
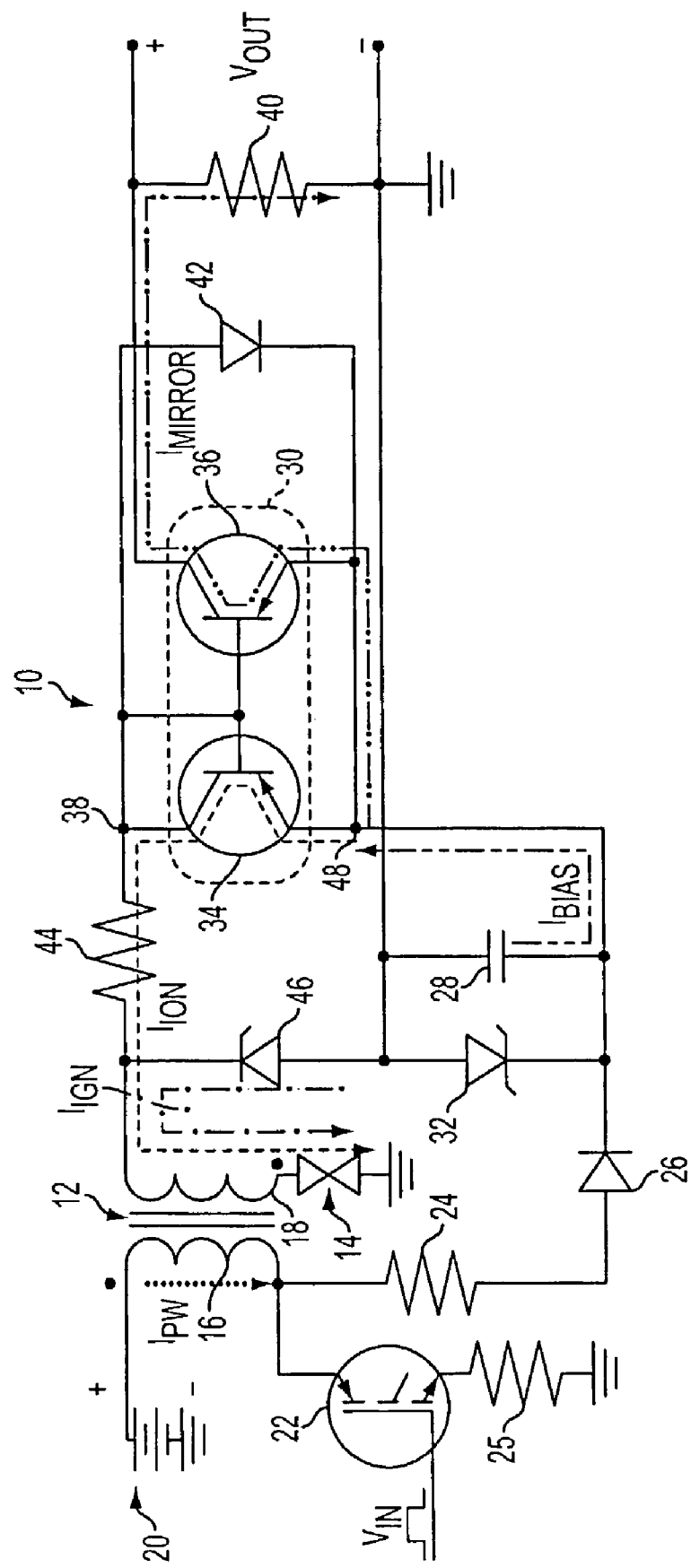
FIG. 8 is an electrical schematic of a circuit for measuring ionization current in a combustion chamber of an internal combustion engine.
Figure 35:
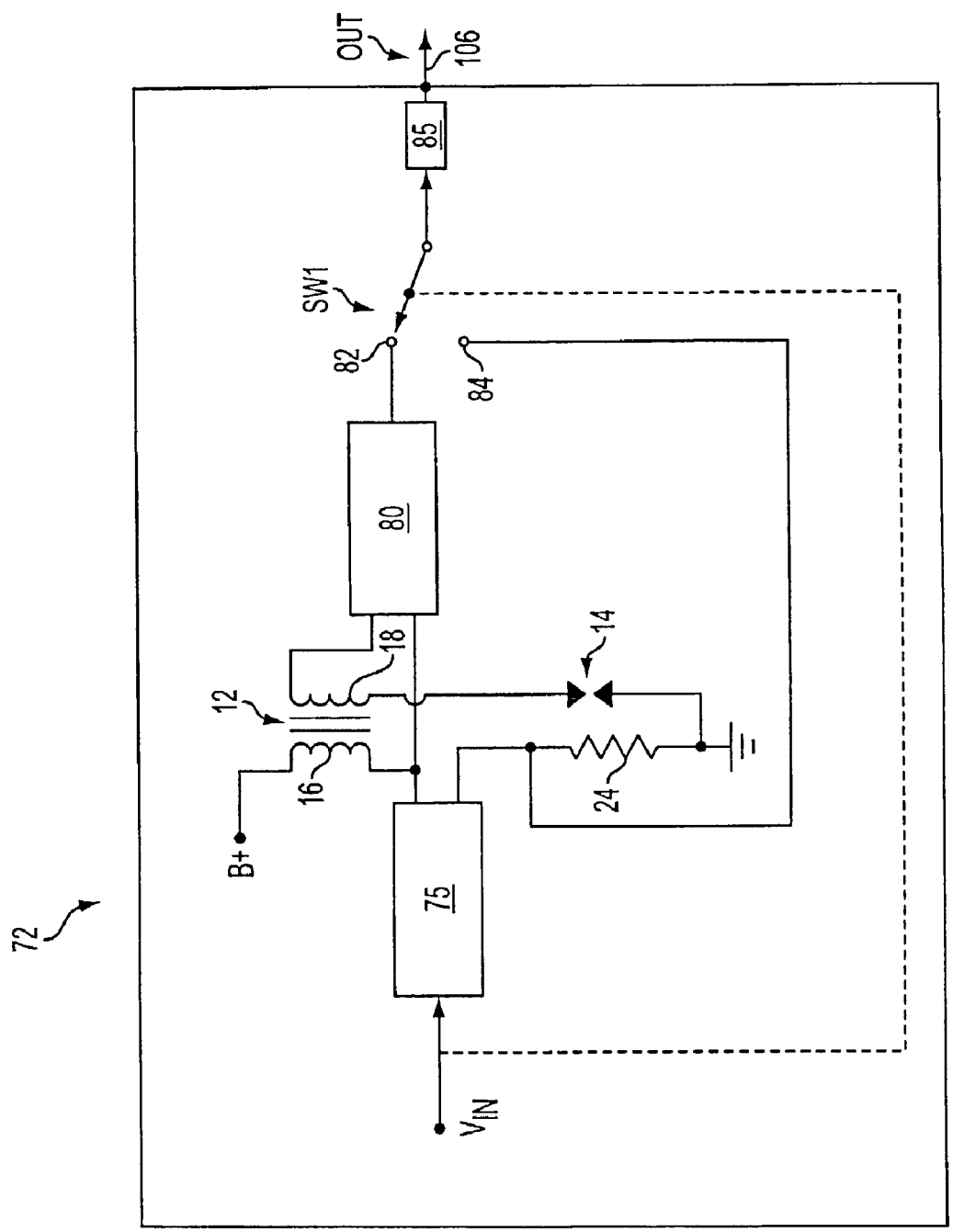
FIG. 35 is a diagram of an integrated coil driver and ionization detection sub-system.

FIG. 8 is a basic electrical schematic of a circuit 10, which represents the function block (80) of FIG. 35, for measuring ionization current in a combustion chamber of an internal combustion engine. The circuits not shown in FIG. 8, that are shown in FIG. 35, are the bias circuit and the switch circuit to multiplex the primary charge current. The components and configuration of the circuit 10 are described first, followed by a description of the circuit operation.

First, with regard to the components and configuration of this feature, the circuit 10 includes an ignition coil 12 and an ignition or a spark plug 14 disposed in a combustion chamber of an internal combustion engine. The ignition coil 12 includes a primary winding 16 and a secondary winding 18. The ignition plug 14 is connected in electrical series between a first end of the secondary winding 18 and ground potential. The electrical connections to a second end of the secondary winding 18 are described further below. A first end of the primary winding 16 is electrically connected to a positive electrode of a battery 20. A second end of the primary winding 16 is electrically connected to the collector terminal of an insulated gate bipolar transistor (IGBT) or other type of transistor or switch 22 and a first end of a first resistor 24. The base terminal of the IGBT 22 receives a control signal, labeled $V_{IN}$ in FIG. 8, from a powertrain control module (PCM) not shown. Control signal $V_{IN}$ gates IGBT 22 on and off. A second resistor 25 is electrically connected in series between the emitter terminal of the IGBT 22 and ground. A second end of the first resistor 24 is electrically connected to the anode of a first diode 26.

The circuit 10 further includes a capacitor 28. A first end of the capacitor 28 is electrically connected to the cathode of the first diode 26 and a current mirror circuit 30. A second end of the capacitor 28 is grounded. A first zener diode 32 is electrically connected across or, in other words, in parallel with the capacitor 28 with the cathode of the first zener diode 32 electrically connected to the first end of the capacitor 28 and the anode of the first zener diode 32 electrically connected to ground.

The current mirror circuit 30 includes first and second pnp transistors 34 and 36 respectively. The pnp transistors 34 and 36 are matched transistors. The emitter terminals of the pnp transistors 34 and 36 are electrically connected to the first end of the capacitor 28. The base terminals of the pnp transistors 34 and 36 are electrically connected to each other as well as a first node 38. The collector terminal of the first pnp transistor 34 is also electrically connected to the first node 38, whereby the collector terminal and the base terminal of the first pnp transistor 34 are shorted. Thus, the first pnp transistor 34 functions as a diode. A third resistor 40 is electrically connected in series between the collector terminal of the second pnp transistor 36 and ground.

A seccond diode 42 is also included in the circuit 10. The cathode of the second diode 42 is electrically connected to the first end of the capacitor 28 and the emitter terminals of the first and second pnp transistors 34 and 36. The anode of the second diode 42 is electrically connected to the first node 38.

The circuit 10 also includes a fourth resistor 44. A first end of the fourth resistor 44 is electrically connected to the first node 38. A second end of the fourth resistor 44 is electrically connected the second end of the secondary winding 18 (opposite the ignition plug 14) and the cathode of a second zener diode 46. The anode of the second zener diode 46 is grounded.

Referring now to FIGS. 8 and 9, the operation of the circuit 10 is described. FIG. 9a is a graph of the control signal $V_{IN}$ from the PCM to the IGBT 22 versus time. FIG. 9b is a graph of the current flow $I_{PW}$ through the primary winding 16 of the ignition coil 12 versus time. FIG. 9c is a graph of an output voltage signal from the circuit 10 versus time. As mentioned above, the IGBT 22 receives the control signal $V_{IN}$ from the PCM to control the timing of 1) the ignition or combustion and 2) the charging of the capacitor 28. In this circuit configuration, the IGBT 22 is operated as a switch having an OFF, or non-conducting state, and an ON, or conducting state.

Initially, at time=$t_0$, the capacitor 28 is not fully charged. The control signal $V_{IN}$ from the PCM is LOW (see FIG. 9a) thereby operating the IGBT 22 in the OFF, or non-conducting, state. Primary winding 16 sees an open circuit and, thus, no current flows through the winding 16.

At time=$t_1$, the control signal $V_{IN}$ from the PCM switches from LOW to HIGH (see FIG. 9a) thereby operating the IGBT 22 in the ON, or conducting, state. Current from the battery 20 begins to flow through the primary winding 16 of the ignition coil 12, the conducting IGBT 22, and the second resistor 25 to ground. Any of a number of switches or switching mechanisms can be used to connect current through the primary winding 16. In a preferred embodiment IGBT 22 is used. Between time=$t_1$ and time=$t_2$, the primary winding current $I_{PW}$, (illustrated in FIG. 8 with a dotted line) begins to rise. The time period between time=$t_1$ and time=$t_2$ is approximately one millisecond which varies with the type of ignition coil used.

At time=$t_2$, the control signal $V_{IN}$ from the PCM switches from HIGH to LOW (see FIG. 9a) thereby operating the IGBT 22 in the OFF, or non-conducting, state. As the IGBT 22 is switched OFF, flyback voltage from the primary winding 16 of the ignition coil 12 begins to quickly charge the capacitor 28 up to the required bias voltage. Between time=$t_2$ and time=$t_3$, the voltage at the first end of the secondary winding 18 connected to the spark plug 14 rises to the voltage level at which the ignition begins. The time period between time=$t_2$ and time=$t_3$ is approximately ten microseconds. The first resistor 24 is used to limit the charge current to the capacitor 28. The resistance value of the first resistor 24 is selected to ensure that the capacitor 28 is fully charged when the flyback voltage is greater that the zener diode.

At time=$t_3$, an ignition voltage from the secondary winding 18 of the ignition coil 12 is applied to the ignition plug 14 and ignition begins. Between time=$t_3$ and time=$t_4$, combustion of the air/fuel mixture begins and an ignition current $I_{IGN}$ (illustrated in FIG. 8 with a dash-dot line) flows through the second Zener diode 46, the secondary winding 18 of the ignition coil 12, and the ignition plug 14 to ground. At time=$t_4$, the ignition is completed and the combustion of the air/fuel mixture continues.

At time=$t_5$, the combustion process continues and the charged capacitor 28 applies a bias voltage across the electrodes of the ignition plug 14 producing an ionization current $I_{ION}$ due to the ions produced by the combustion process which flows from the capacitor 28. The current mirror circuit 30 produces an isolated mirror current $I_{MIRROR}$ identical to the ionization current $I_{ION}$. A bias current $I_{BIAS}$ (illustrated in FIG. 8 with a phantom or long dash-short dash-short dash line) which flows from the capacitor 28 to the second node 48 is equal to the sum of the ionization current $I_{ION}$ and the isolated mirror current $I_{MIRROR}$ (i.e., $I_{BIAS}=I_{ION}+I_{MIRROR}$).

The ionization current $I_{ION}$ (illustrated in FIG. 8 with a dashed line) flows from the second node 48 through the first pnp transistor 34, the first node 38, the fourth resistor 44, the secondary winding 18 of the ignition coil 12, and the ignition plug 14 to ground. In this manner, the charged capacitor 28 is used as a power source to apply a bias voltage, of approximately 80 volts, across the spark plug 14 to generate the ionization current $I_{ION}$. The bias voltage is applied to the spark plug 14 through the secondary winding 18 and the fourth resistor 44. The secondary winding induction, the fourth resistor 44, and the effective capacitance of the ignition coil limit the ionization current bandwidth. Accordingly, the resistance value of the fourth resistor 44 is selected to maximize ionization signal bandwidth, optimize the frequency response, and also limit the ionization current. In one embodiment of the present invention, the fourth resistor 44 has a resistance value of 330 k ohms resulting in an ionization current bandwidth of up to twenty kilohertz.

The current mirror circuit 30 is used to isolate the detected ionization current $I_{ION}$ and the output circuit. The isolated mirror current $I_{MIRROR}$ (illustrated in FIG. 8 with a dash-dot-dot line) is equal to, in other words, a mirror of the ionization current $I_{ION}$. The isolated mirror current $I_{MIRROR}$ flows from the second node 48 through the second pnp transistor 36 and the third resistor 40 to ground. To produce a isolated mirror current signal $I_{MIRROR}$ which is identically proportional to the ionization current $I_{ION}$, the first and second pnp transistors 34 and 36 must be matched, i.e., have the identical electronic characteristics. One way to achieve such identical characteristics is to use two transistors residing on the same piece of silicon. The isolated mirror current signal $I_{MIRROR}$ is typically less than 300 microamps. The third resistor 40 converts the isolated mirror current signal $I_{MIRROR}$ into a corresponding output voltage signal which is labeled as $V_{OUT}$ in FIG. 8. The resistance value of the third resistor 40 is selected to adjust the magnitude of the output voltage signal $V_{OUT}$. The second diode 42 protects the mirror transistors 34 and 36 by biasing on and providing a path to ground if the voltage at node 38 crosses a threshold. A third transistor can also be used to protect the mirror transistor.

FIG. 9c illustrates an output voltage signal $V_{OUT}$ resulting from a normal combustion event. The portion of the output voltage signal $V_{OUT}$ from time=$t_5$ and beyond can be used as diagnostic information regarding combustion performance. To determine the combustion performance for the entire engine, the ionization current in one or more combustion chambers of the engine can be measured by one or more circuits 10 respectively.

In the present circuit 10, the ignition current $I_{IGN}$ and the ionization current $I_{ION}$ flow in the same direction through the secondary winding 18 of the ignition coil 12. As a result, the initiation or, in other words, the flow of the ionization current as well as the detection of the ionization current is quick. In the present circuit 10, the charged capacitor 28 operates as a power source. Thus the circuit 10 is passive or, in other words, does not require a dedicated power source. The charged capacitor 28 provides a relatively high bias voltage from both ionization detection and the current mirror circuit 30. As a result, the magnitude of the mirrored, isolated current signal $I_{MIRROR}$ is large and, thus, the signal-to-noise ratio is high.

Section C: A Method of Detecting Cylinder ID Using In-Cylinder Ionization for Spark Detection Following Partial Coil Charging Current cylinder identification (ID) detection schemes using in-cylinder ionization detection have a number of issues: Noise, Vibration and Harshness (NVH) problems when combusting on the exhaust stroke, cold-start hydrocarbon (HC) emissions problems, and delay due to fuel puddling effects at cold temperatures.

This feature relates to a vehicle that has an internal combustion engine with at least two cylinders, a spark plug with an electrode gap, and an in-cylinder measurement of ionization level that does not use the camshaft sensor for variable cam timing.

Numerous prior art systems relate generally to ionization current, but most deal with detection of misfire and knock, and control of engine variables such as EGR and spark placement, or circuitry.

Some prior publications deal directly with detecting cylinder ID from ionization current. For example, U.S. Pat. No. 5,563,515 A1 uses misfiring cylinders to detect the cylinder.

Further, U.S. Pat. No. 6,029,631 A1 describes a method that uses the voltage level produced across the spark gap to determine the cylinder ID. As discussed below, this method has a number of drawbacks.

Figure 10:
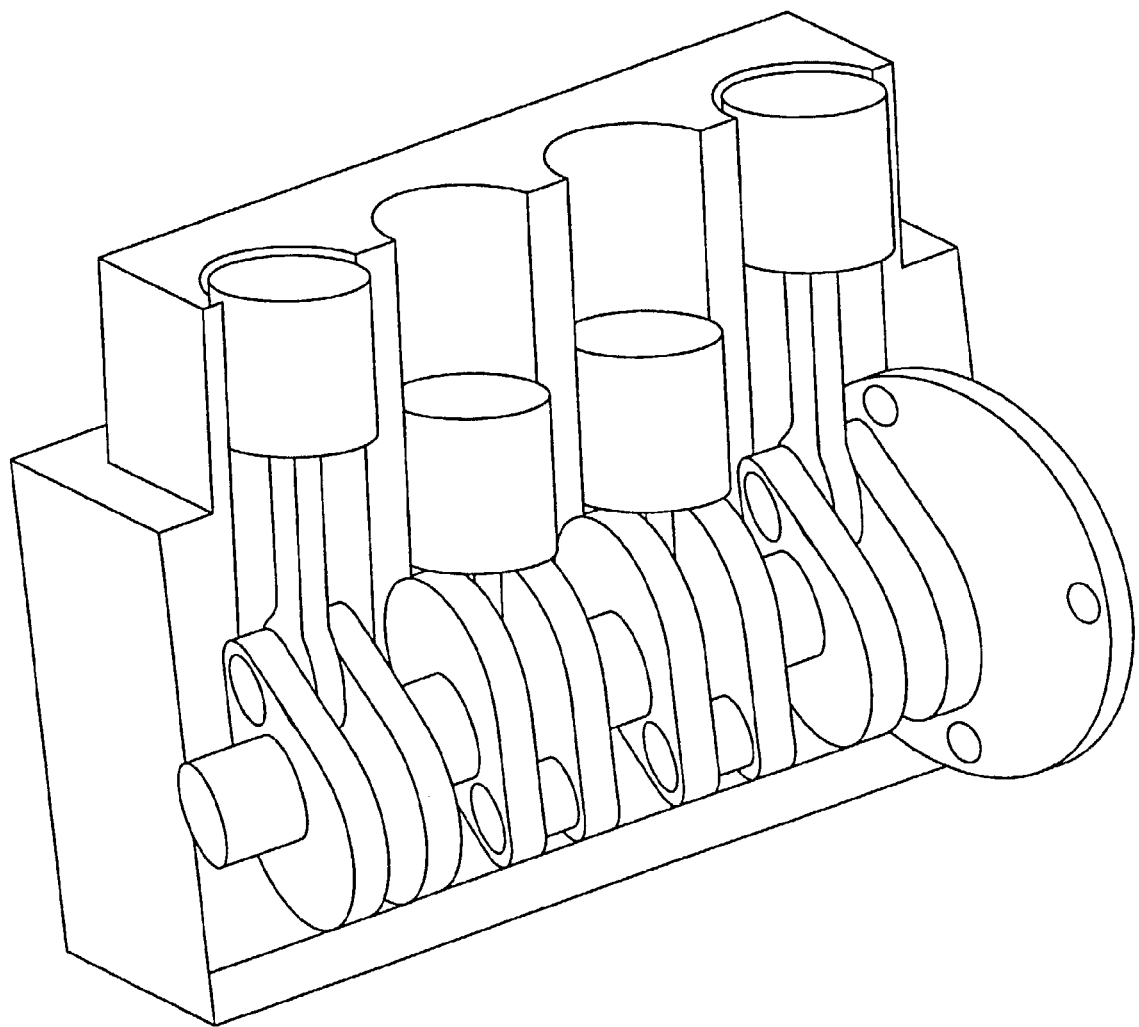
FIG. 10 shows a typical setup for an inline four-cylinder engine.

The vast majority of automobile internal combustion engines are of the reciprocating piston driven type. The reciprocating engine is a machine that converts fuel energy to a rotating motion, which is commonly measured as horsepower. In the engine, gasoline is added to the air as it passes through the carburetor (or fuel injectors) on its way to the cylinder. This mixture is then burned in the cylinder, which generates heat, which creates pressure. This pressure pushes the piston down in the cylinder to turn the crankshaft. FIG. 10 shows a typical setup for an inline four-cylinder automobile engine.

Figure 11:
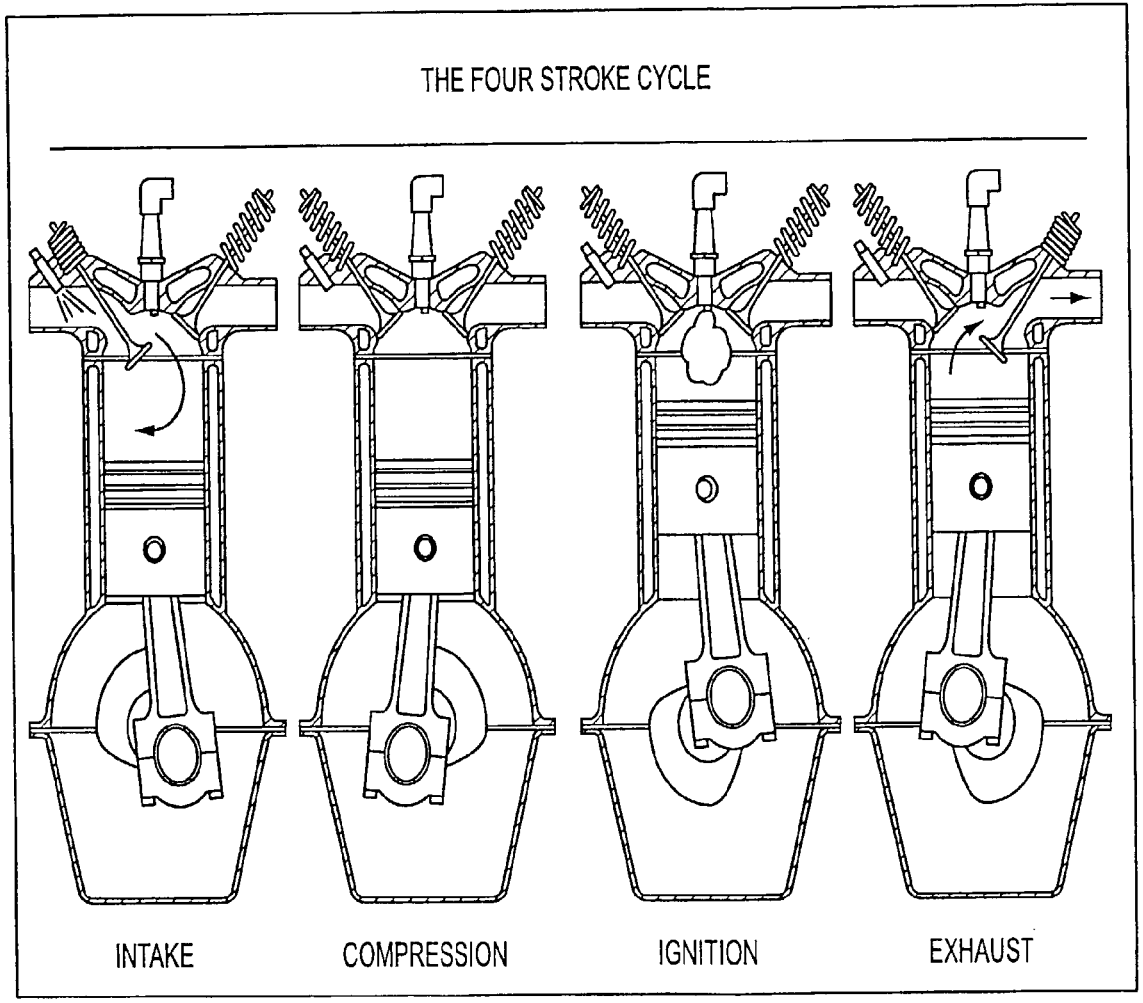
FIG. 11 illustrates the four stroke cycle operation of the modern automobile engine.

The vast majority of modern automobile engines use a four stroke or cycle operation (see FIG. 11). As the piston starts down on the intake stroke, the intake valve opens the air/fuel mixture is drawn into the cylinder (similar to drawing back the plunger on a hypodermic needle to allow fluid to be drawn into the chamber.) When the piston reaches the bottom of the intake stroke, the intake valve closes, trapping the air/fuel mixture in the cylinder.

In the compression stroke the piston moves up and compresses the trapped air/fuel mixture that was brought in by the intake stroke. The amount that the mixture is compressed is determined by the compression ratio of the engine. The compression ratio on the average engine is in the range of 8:1 to 10:1. This means that when the piston reaches the top of the cylinder, the air/fuel mixture is squeezed to about one tenth of its original volume.

In the power stroke, the spark plug fires, igniting the compressed air/fuel mixture that produces a powerful expansion of the vapor. The combustion process pushes the piston down the cylinder with a great enough force to turn the crankshaft to provide the power to propel the vehicle. Each piston fires at a different time, determined by the engine firing order. By the time the crankshaft completes two revolutions, each cylinder in the engine will have gone through one power stroke.

In the exhaust stroke, with the piston at the bottom of the cylinder, the exhaust valve opens to allow the burned exhaust gas to be expelled to the exhaust system. Since the cylinder contains so much pressure, when the valve opens, the gas is expelled with a violent force (that is why a vehicle without a muffler sounds so loud.) The piston travels up to the top of the cylinder pushing all the exhaust out before closing the exhaust valve in preparation for starting the four-stroke process over again.

Figure 12:
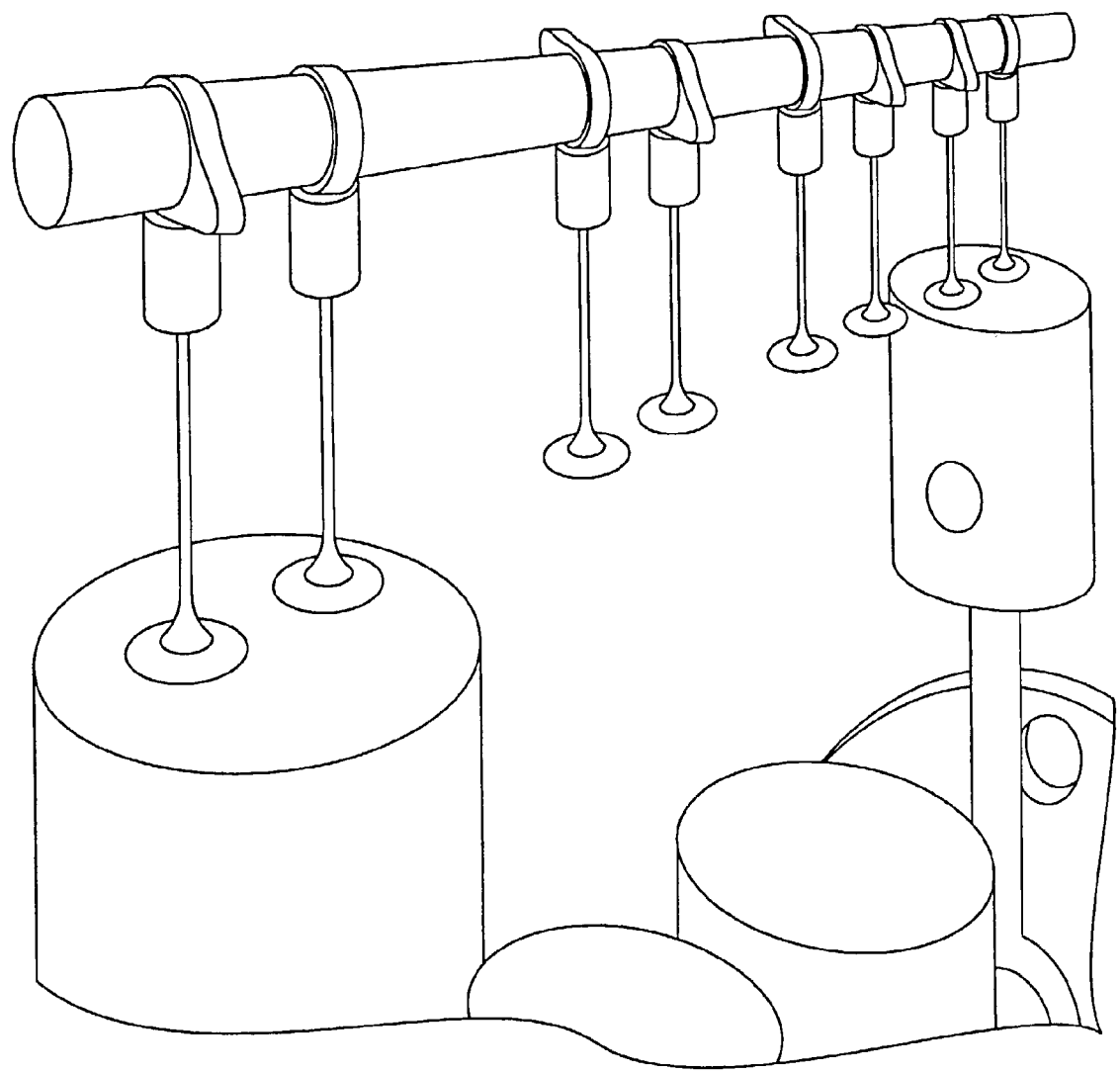
FIG. 12 illustrates the valve train of an engine.
Figure 13:
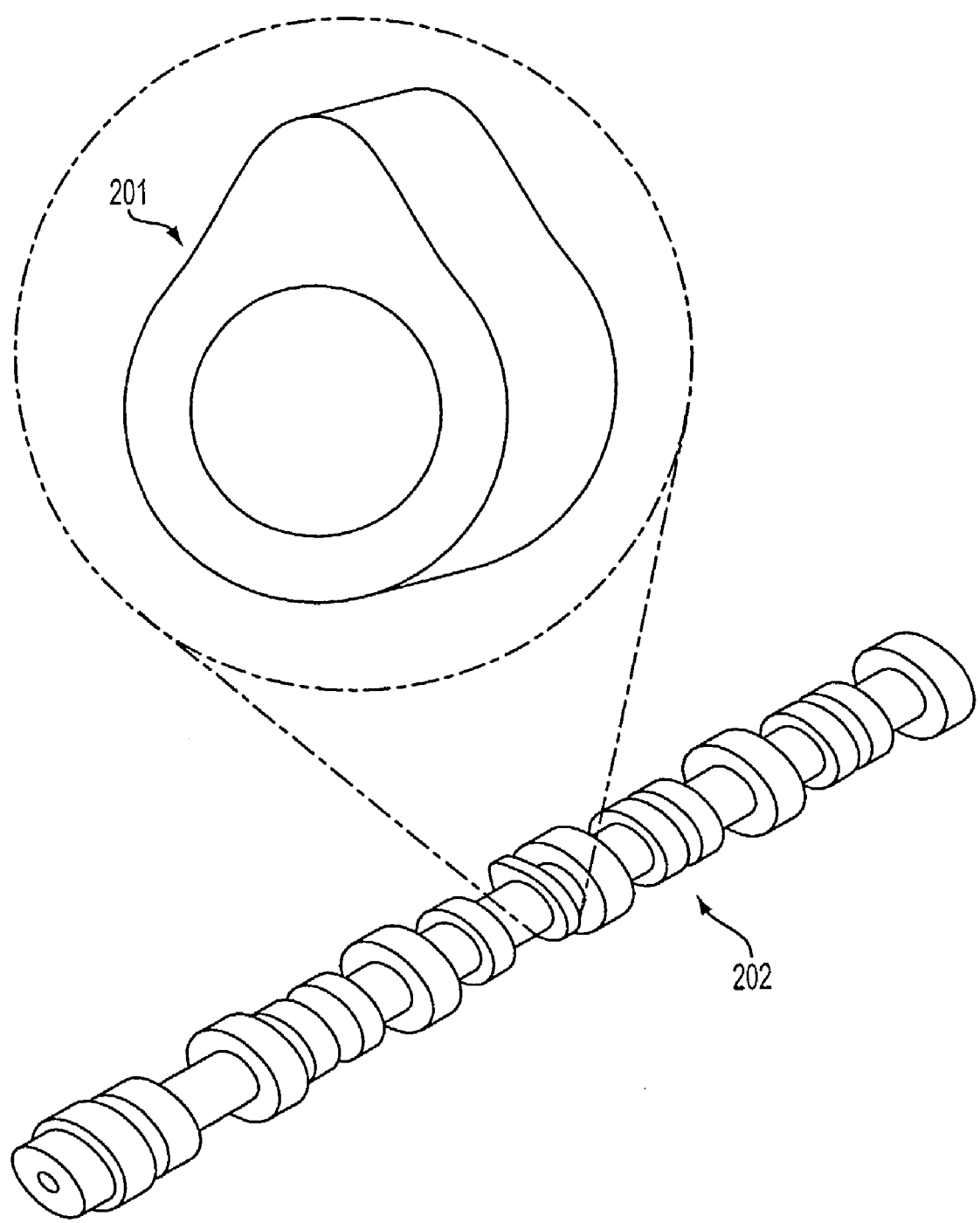
FIG. 13 illustrates the lobes mounted on a camshaft.

A cylinder naturally has only two strokes. To create the four strokes, valves are used that control the air entering and leaving the cylinder. The lobes 201 on the camshaft 202 determine the opening and closing of the valves, referred to as valve timing (see FIGS. 12 and 13).

The camshaft does not turn at the same rate as the crankshaft, since the valves do not open and close with every cylinder stroke. Instead, the camshaft is geared to turn at one-half the rate of the crankshaft.

Figure 14:
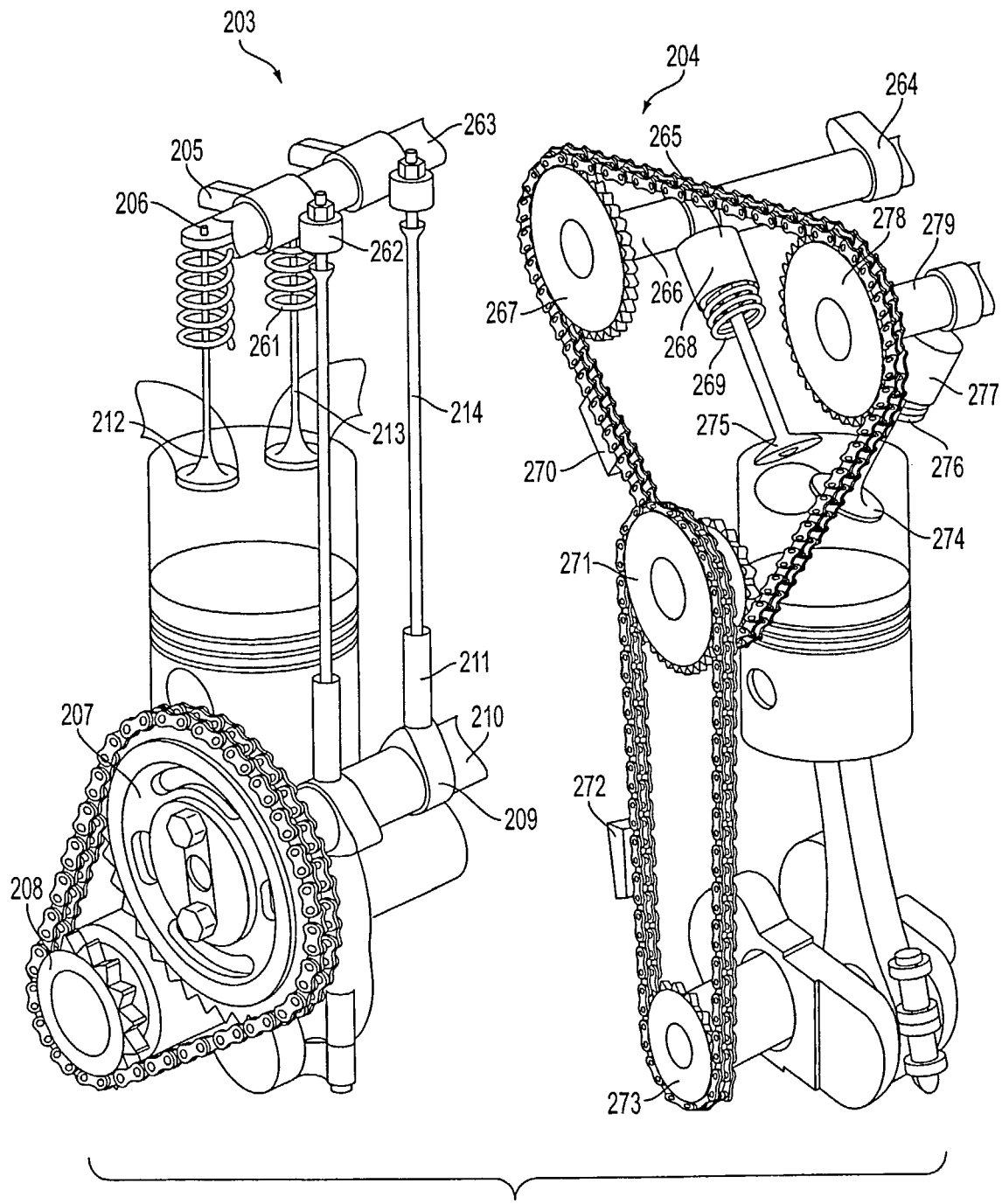
FIG. 14 illustrates the push rod valve gear and the overhead camshaft.

FIG. 14 illustrates the push rod valve gear 203 and the overhead camshaft 204. The push rod valve gear comprises a rocker 205, a tappet clearance 206, a camshaft which rotates at half of the engine speed (twice as many teeth as the sprocket) 207, a crankshaft sprocket 208, a cam 209, another camshaft 210, a tappet 211, an inlet valve 212, an exhaust valve 213, a push rod 214, a spring 261, a lock nut for adjusting the valve clearance 262 and a rocker shaft 263. The overhead camshaft 204 comprises a cam 264, a valve which is opened by the revolving cam 265, a camshaft 266, a camshaft sprocket 267, a bucket tappet 268, a valve spring, a tensioner 270, a sprocket 271, another tensioner 272, a crankshaft sprocket 273, an exhaust valve 274, an inlet valve 275, a valve spring 276, a bucket tappet 277, a sprocket, and another camshaft 279.

Cylinder ID is defined as the process of determining at which stroke an engine's cylinder is at. Because the valves, and not the cylinder position, determine the stroke, it is difficult to use the crankshaft angle to tell which stroke a cylinder is in. From the crankshaft sensor we can tell when a cylinder is all the way up, but it is desirable to know if it is in the compression stroke or the exhaust stroke.

When a cylinder is all the way up, it can be either in the compression stroke, stroke 2, or in the exhaust stroke, stroke 4. Conversely, if a cylinder is all the way down, it can be either in the intake stroke, stroke 1, or in the ignition stroke, stroke 3. Thus, although the crankshaft angle can be used to identify the position of the cylinder, it is desirable to know if it is in the compression stroke or the exhaust stroke.

Figure 15:
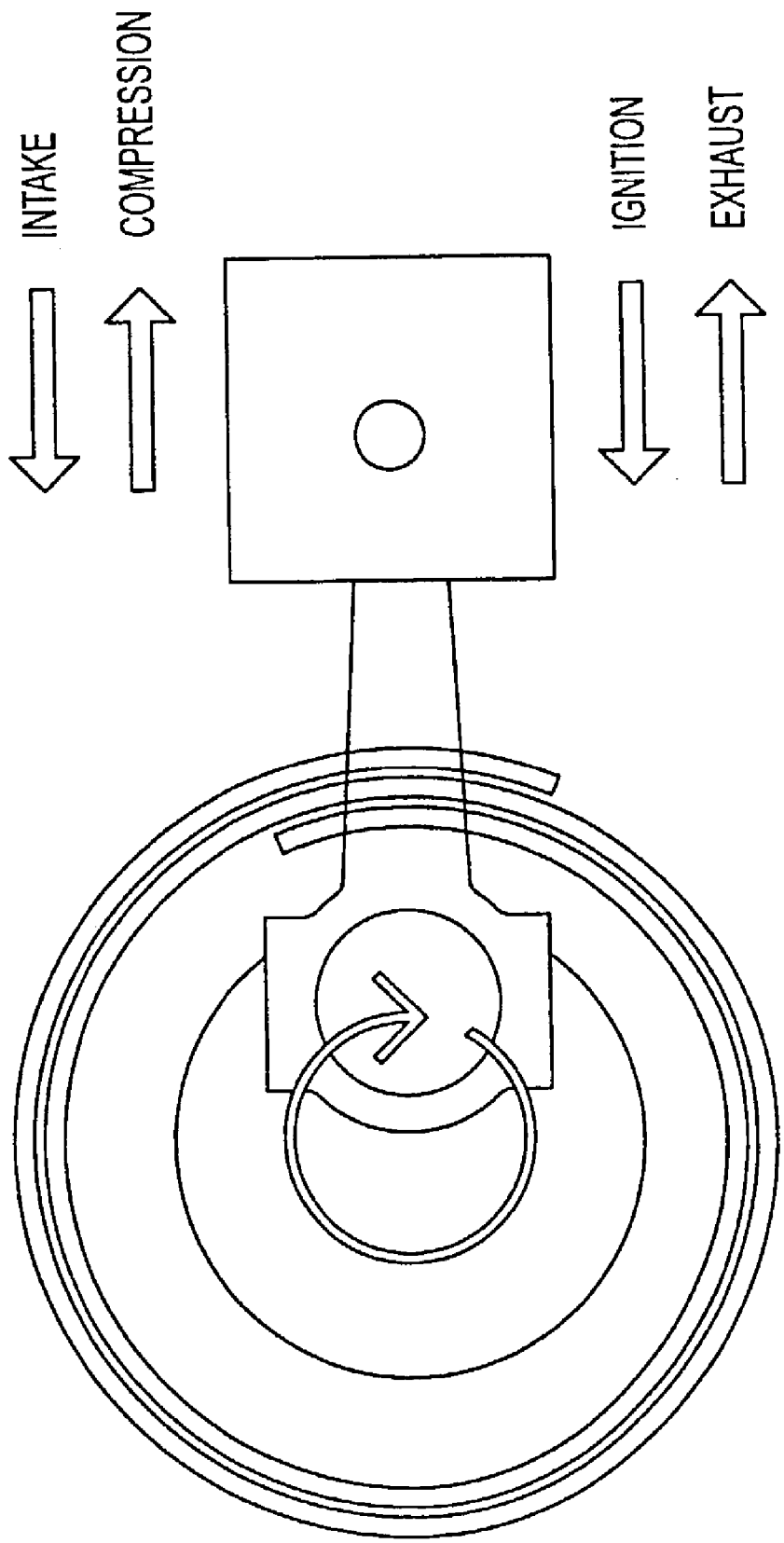
FIG. 15 illustrates the four stroke overlap on the engine crankshaft.

State-of the-art engines without ionization sensors determine cylinder ID from a special camshaft sensor and toothed wheel located on the camshaft. This adds cost and complexity to an engine. In addition, because the sensor only indicates the position of one cylinder (for example, top dead center TDC of cylinder one during compression), an engine crankshaft must rotate up to two times to identify its stroke, depending on its orientation when it came to a stop. FIG. 15 illustrates the valve timing overlap of the four strokes on the engine crankshaft. In reality, the number of rotations is often more, since the most typical type of sensor (the Variable Reluctance Sensor) will not work at low speeds and might be missed on the first rotation or two until the speed reaches a minimum threshold. It is therefore desirable to be able to use the ionization sensor to determine the cylinder ID very quickly and to be able to eliminate the camshaft sensor and wheel.

In a Spark Ignition (SI) engine the spark plug is already inside of the combustion chamber, and can be used as a detection device without requiring the intrusion of a separate sensor. During combustion, a lot of ions are produced in the plasma. $H_3O^+$, $C_3H_3^+$, and $CHO^+$ are produced by the chemical reactions at the flame front and have sufficiently long exciting time to be detected. If a bias voltage is applied across the spark plug gap, these free ions are attracted and will create a current.

Figure 16:
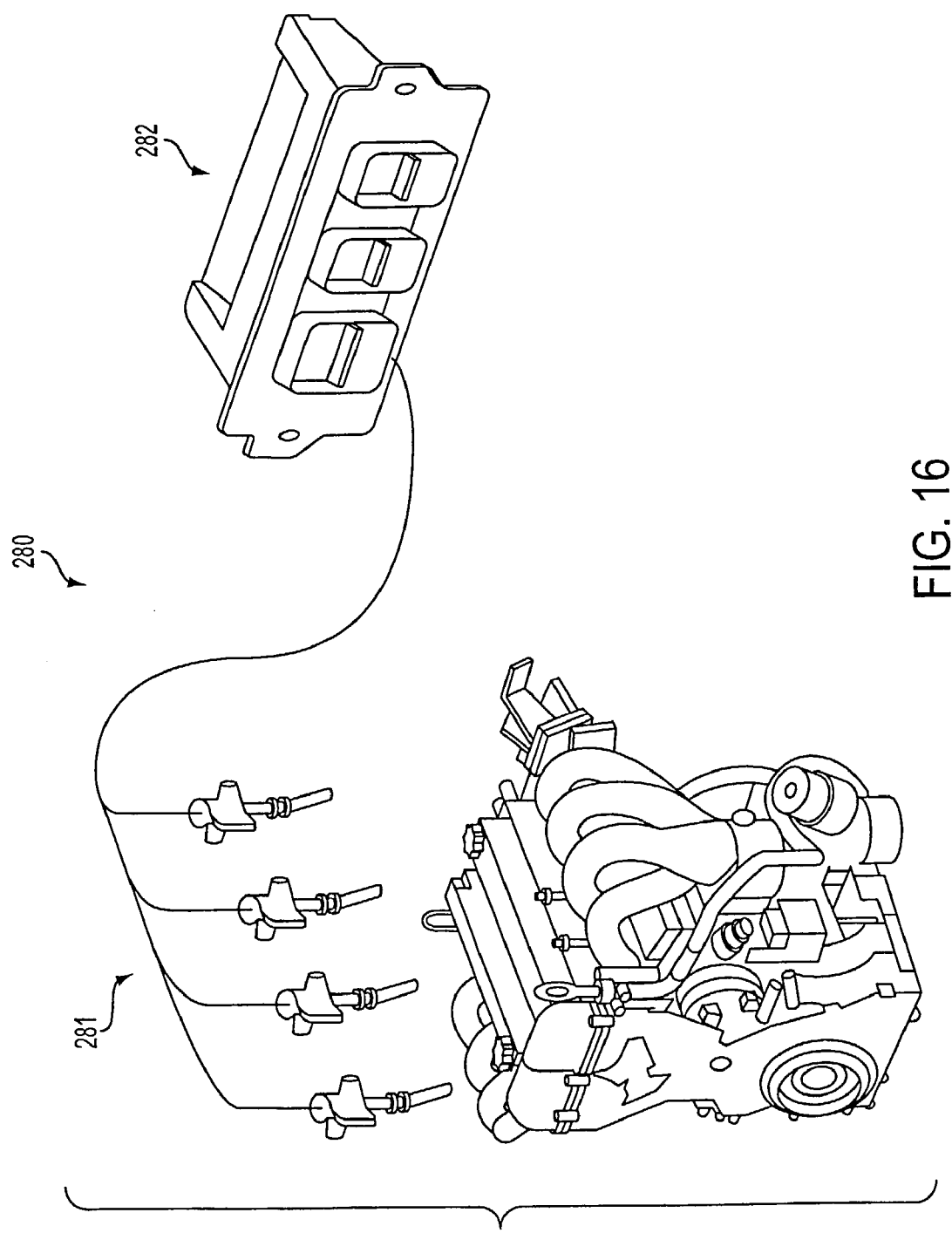
FIG. 16 illustrates a production ionization current detection setup.

An ionization detection setup 280 consists of a coil-on-plug arrangement, with a device in each coil to apply a bias voltage across the tip when the spark isn't arcing. The current across the spark plug tip is isolated and amplified prior to being measured (see FIG. 16). The coils 281 (with ion detection) are attached to a module 282 (with ion processing).

A spark plug ionization signal measures the local conductivity at the spark plug gap when combustion occurs in the cylinder. The changes of the ionization signal versus crank angle can be related to different stages of a combustion process. The ion current typically has three phases: the ignition or spark phase, the flame front phase, and the post-flame phase. The ignition phase is where the ignition coil is charged and later ignites the air/fuel mixture. The flame front phase is where the flame (flame front movement during the flame kernel formation) develops in the cylinder and consists, under ideal circumstances, of a single peak. The current in the flame front phase has shown to be strongly related to the air/fuel ratio. The post-flame phase depends on the temperature and pressure development in the cylinder and generates a current whose peak is well correlated to the location of the peak pressure.

The ionization signal represents ionization current after ignition. During ignition, it represents the combined ignition current and ion current (i.e., ionization current). This is because in the present invention, the ionization current and the ignition current flow in the same direction. Before ignition, the ion signal represents the second winding current fluctuation caused by the charge current of the primary winding.

Figure 17:
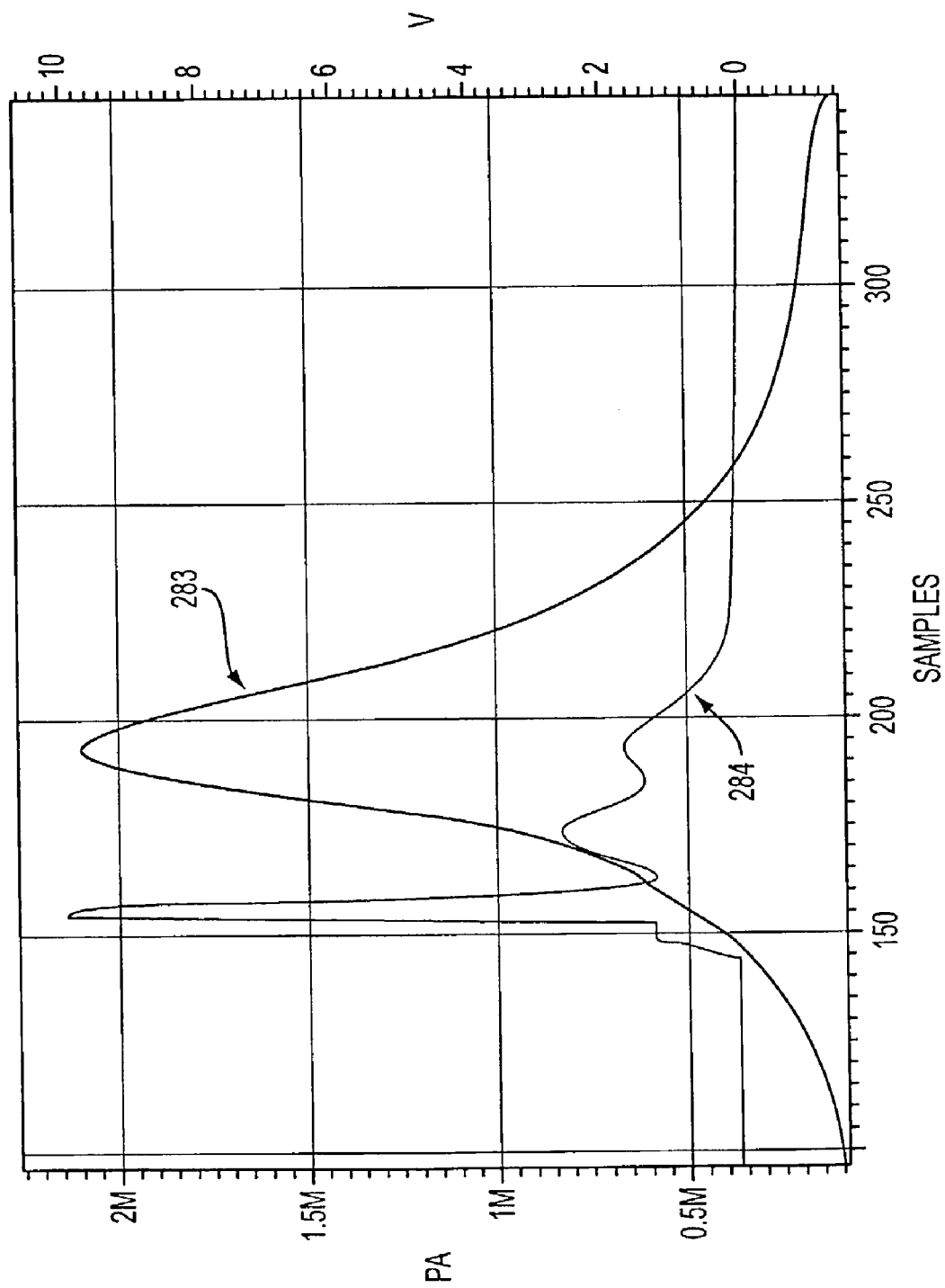
FIG. 17 illustrates a typical ionization signal.

FIG. 17 illustrates a typical ionization signal showing the pressure 283 and ionization signals 284 for cylinder #1. The present method of detecting cylinder ID uses the spark phase of the signal. When the air in a cylinder is compressed, the resistance between the spark plug electrodes will increase. This is because air is a natural insulator, with its own breakdown voltage based on a number of different factors (density, humidity, temperature, etc). This increased resistance will result in a couple of discernable effects.

The duration of a spark (or spark duration) on a compression stroke will be shorter than one without compression. It will take longer for the voltage to build up before the spark arcs, and as the energy is dissipated, the spark will end sooner as the voltage drops. There are several problems with this method. The first is that it generally requires the use of edge detection to determine the spark duration, since sampling at a resolution of one sample/degree (typical) will not provide sufficient accuracy to an event of this short duration, especially at lower engine speed. In addition, there are other variables that can contribute significant noise to this reading, especially since the difference in the duration of the spark is small enough that a good signal/noise ratio is useful.

The spark coils can be partially charged (instead of fully charging it) to a predetermined level. Next, a determination is made as to which coil(s) failed to fire or spark. The cylinders that failed to fire are on the compression stroke, because the resistance is high enough that the partially charged coils are unable to deliver the voltage required to break down the gas between the spark plug gap.

The increased resistance will also affect the secondary voltage peak. A higher secondary side voltage will be required to arc a spark across the gap. This can be measured on the primary side through the induced current flow. Problems with this method are that the IGBT (Insulated Gate Bipolar Transistor) generally used to turn on and off the primary side current has voltage protection that inhibits voltages above 400V (typical). This can render this peak detection method of minimal use.

Therefore, an improved method of using the ionization current sensor to determine cylinder ID is proposed. In one embodiment, the spark coils are partially charged (instead of fully charged) to a predetermined level. Next, the coils are observed to determine which coil(s) failed to fire. The cylinders that contain the coils that failed to fire are on the compression stroke. The coils failed to fire because the gas mixture is high enough that the partially charged coils are unable to deliver the voltage required to break down the resistance at the spark plug gap.

Thus, this embodiment involves the determination of which cylinders to apply a spark to and when; dwell time calculation; and determination of which cylinder is in compression by observing ionization current after the IGBT is turned off.

In another embodiment, the present invention involves the determination of which cylinders to apply a spark to and when; calculation of the spark durations; and determination of which cylinder is in compression.

Figure 18:
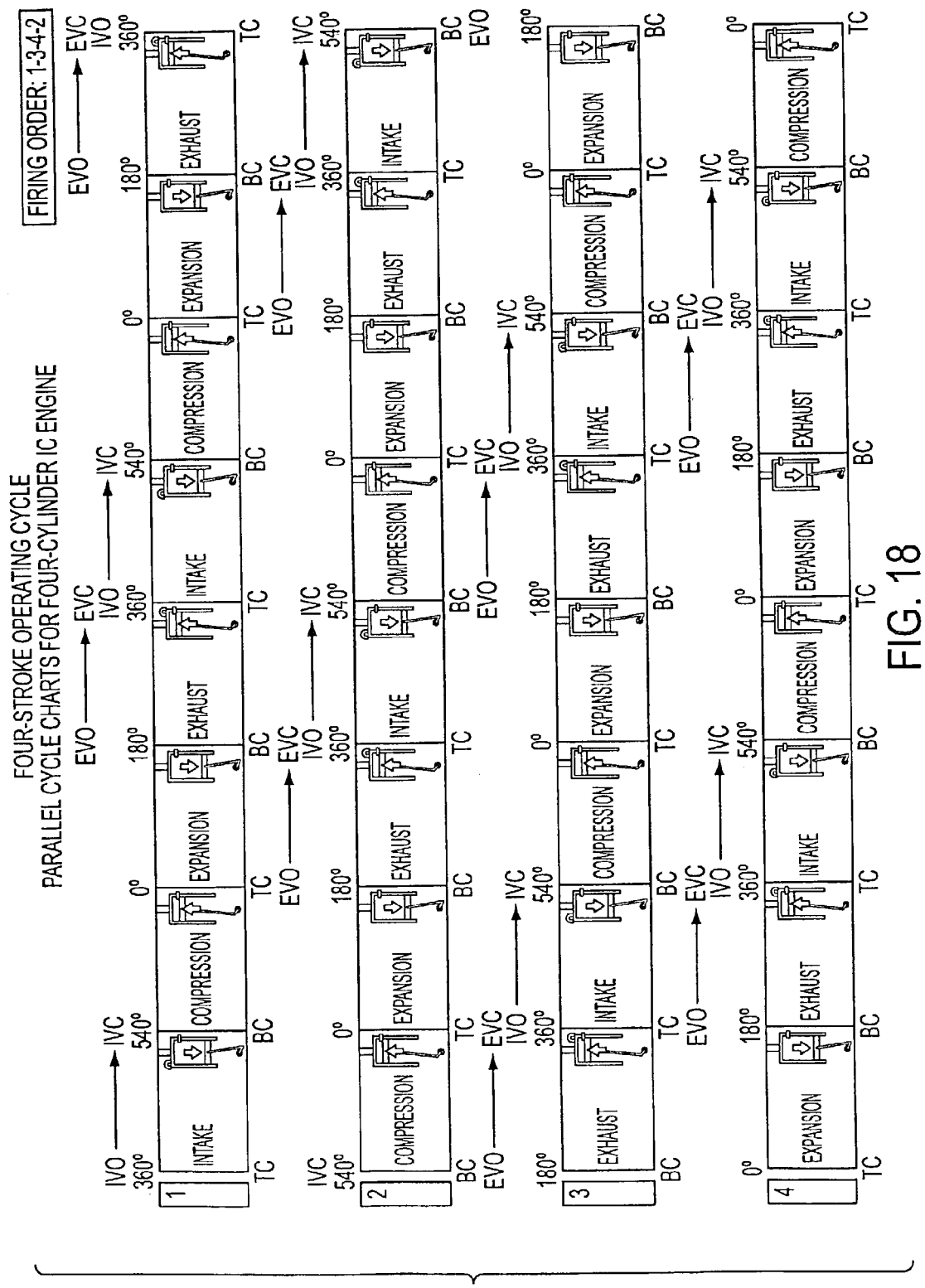
FIG. 18 illustrates stroke vs. crank angle (in degrees) for a four-cylinder engine's operating cycle.

First, it is determined which cylinders to spark and when. This will be calibrated information specific for a particular engine. For a four cylinder engine (shown in FIG. 18) with firing order (one, three, four, two), a determination where 0 degrees is on the crankshaft requires up to one full rotation of the engine crankshaft, until the missing tooth (typically used) is found. At that point, cylinders one and four are sparked at 0 degrees (their top dead center (TDC)-locations). If the determination fail (i.e., none of the spark coils fail to fire), cylinders three and two will be fired at 180 degrees to determine which one is in compression. This would continue until the cylinder ID is determined.

The method is nearly identical for eight cylinder engines, except that four cylinders may be sparked simultaneously to increase the chances of successful detection. In four, six, and ten cylinder engines the process is similar, with pairs of cylinders being sparked at different crank angles. Three and five cylinder engines are slightly different in that the strokes on opposing cylinders are completely opposite. The results will be the same, since only one cylinder will misfire because it is at top dead center TDC of the compression stroke.

Figure 19:
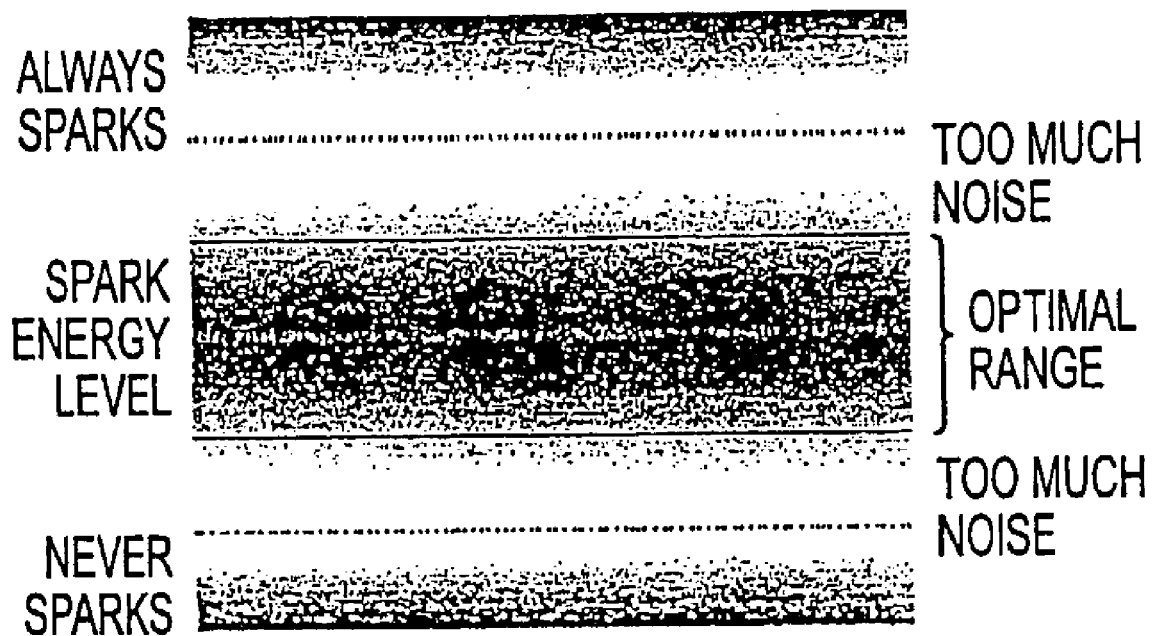
FIG. 19 illustrates the optimal spark energy level.
Figure 20A:
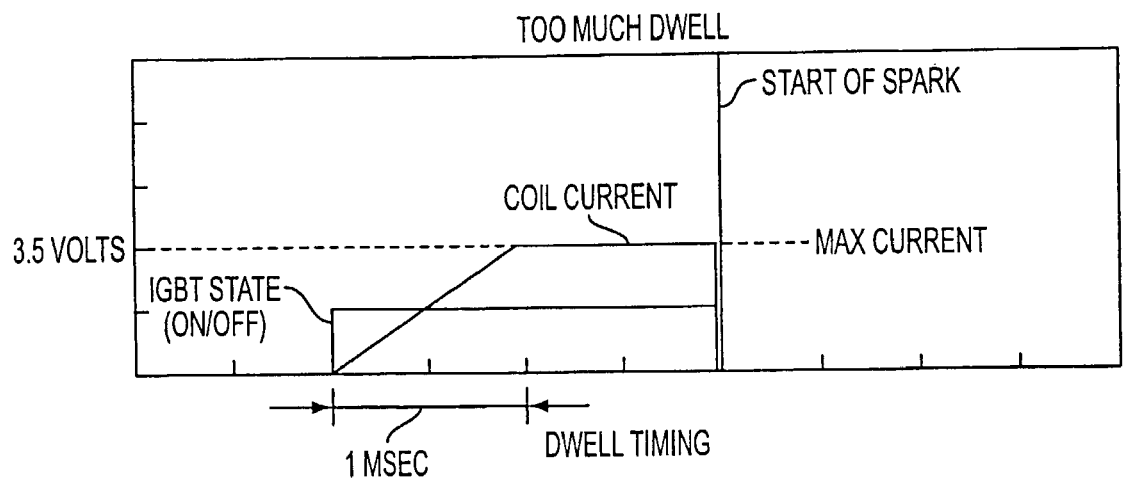
FIGS. 20 a–c illustrate dwell timing.
Figure 20B:
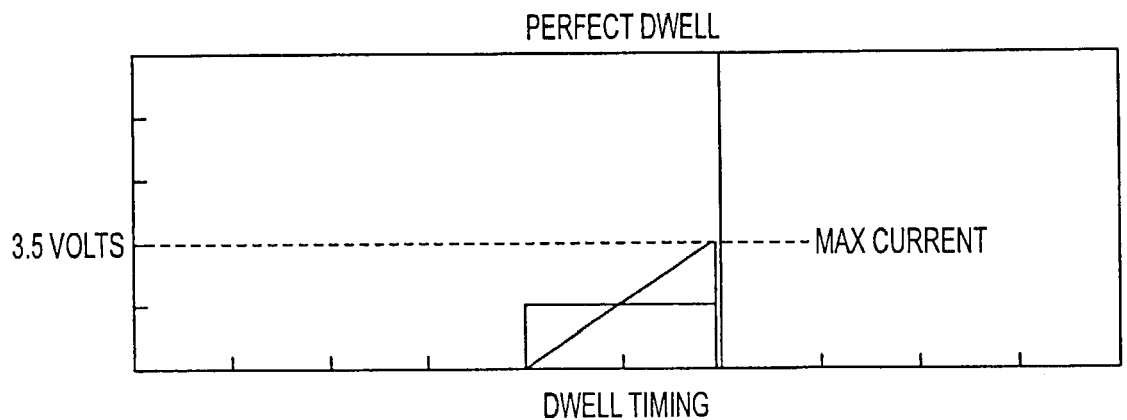
Figure 20C:
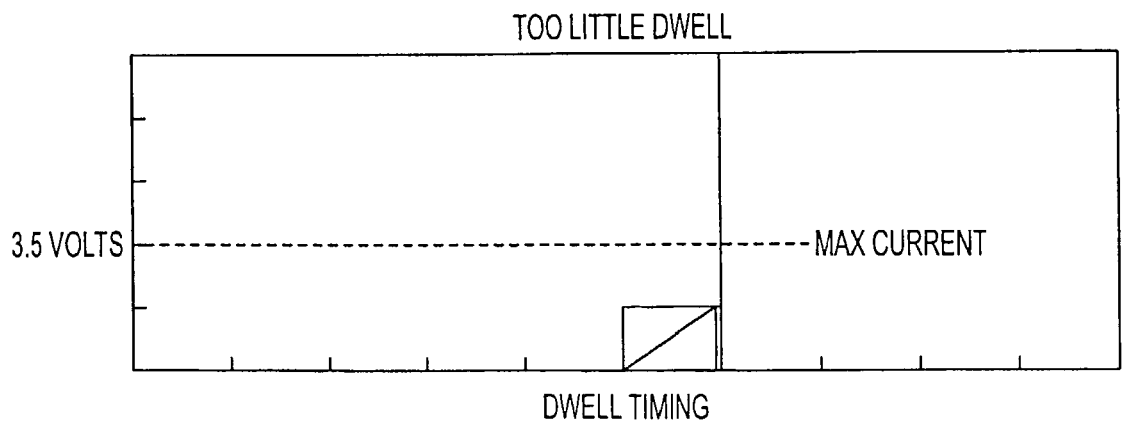

The calculation of the amount of energy used to charge the spark coils is dependant upon a number of variables such as engine speed, load, etc. Applying too much energy may spark all cylinders, regardless of the stroke, and fail to detect the cylinder in compression. Too little energy may spark none of the cylinders, and fail to detect the cylinder in compression. Therefore proper spark energy level is used for detecting the cylinder in compression. This is illustrated in FIGS. 19 and 20.

The actual spark energy is related to the dwell time that is set for the spark plug timing. The higher the current that is flowing through the coil, the higher the stored energy the coil will contain. When the engine control module ECU turns on the IGBT, the coil starts to charge. When the engine control module ECU turns off the IGBT, it creates inductive flyback, and the spark will occur if there is enough energy in the coil to create the breakdown voltage. Because spark timing is fixed (IGBT off-time), the IGBT "on" time is the control (output) for the dwell calculation. During normal engine operation, the engine control module ECU tries to calculate the IGBT turn on time such that the coil is fully charged by the time the spark occurs and the IGBT is then turned off. If there is too much dwell time, energy is wasted and excess heat is generated in the coil. If there is too little dwell time, the coil will not be fully charge, which may result in a misfire or partial burn due to a missing or degraded spark. Because the spark timing is important and shouldn't be changed, the ECU will tend to overcharge the coil (too much dwell) to guarantee accurate spark timing.

As stated above, an ionization signal measures the local conductivity at the spark plug gap when combustion occurs in the cylinder. The reason is that as the gas in the cylinder is compressed during the compression stroke, the gas density increases and the resistance of the gas to current flow increases. Therefore, the resistance between the spark plug electrodes increases.

Typically, 12 volts DC is applied for 1 msec to the primary winding of the ignition coil. This voltage is stepped up to more than 30 kVolts on the secondary winding. This high voltage is required to break down the air gap between the spark plug gap and generate a spark arc. This is illustrated in FIG. 20a. FIG. 20a illustrates that the voltage is proportional to the coil current (sloped part of curve) until maximum current is reached.

When a cylinder is compressed, the gas density between the spark plug electrodes may be too high to generate an arc when the ignition coil is not fully charged.

By varying the dwell time (the amount of time that the voltage is applied to the primary coil), the available energy applied to the spark plug electrodes is also varied. The shorter the dwell time, the less the available energy. As stated previously, the dwell time is controlled by the "on" time of the IGBT.

The failure of a spark plug to spark is reflected in the ionization signal. That is, the ionization signal shows a sequence of pulses, see FIG. 21, after dwell is completed, a ringing effect when the energy stored in the secondary coil is consumed. Thus, the ionization signal can be used to determine whether a cylinder is in compression stroke. The present method reduces the amount of dwell time used to charge a coil in a cylinder. Thus, the energy that will be applied across the spark plug electrodes will be reduced. The specific dwell time is selected so that the spark plug located in a cylinder that is not in compression will spark, while a spark plug in a cylinder that is in compression won't spark. In a preferred embodiment, the dwell time is reduced to between 30 to 50% of the typical 1 msec dwell time.

The present invention uses reduced dwell time (as compared to normal coil charging). As is indicated by the following equation, the dwell time is a function of several variables, each affecting the energy required to cause a spark to occur in a compressed cylinder:

$$T_{on} = T_{off} - f(ACT, ECT, MAP, N)$$

where $T_{off}$ represents Spark Timing (the time the IGBT is turned off), ACT represents Air Charge Temperature, ECT represents Engine Coolant Temperature, MAP represents Manifold Air Pressure, and N represents Engine Crank Speed.

The spark timing is selected to maximize the gas density difference of the selected two cylinders to spark. Therefore, the best spark timing for cylinder identification is at the TDC location of selected pair of the cylinders. For a four cylinder engine with firing order one, three, four, and two, the first pair (cylinders one and four) will be at the next available crank degree of either zero or 360 crank degrees, and the second pair (cylinders three and two) will be at either 180 or 540 crank degrees.

There are other factors, such as humidity, which also have an effect on the process. Their effect is generally negligible. To reduce the calibration burden, some variables may be eliminated in the above calculation, although the minimum necessary formula would be:

$$T_{on} = T_{off} - f(N)$$

In a preferred embodiment, which cylinder is in compression is determined by observing the ionization current after the IGBT is turned off, and determining whether a spark has occurred or not.

Figure 21:
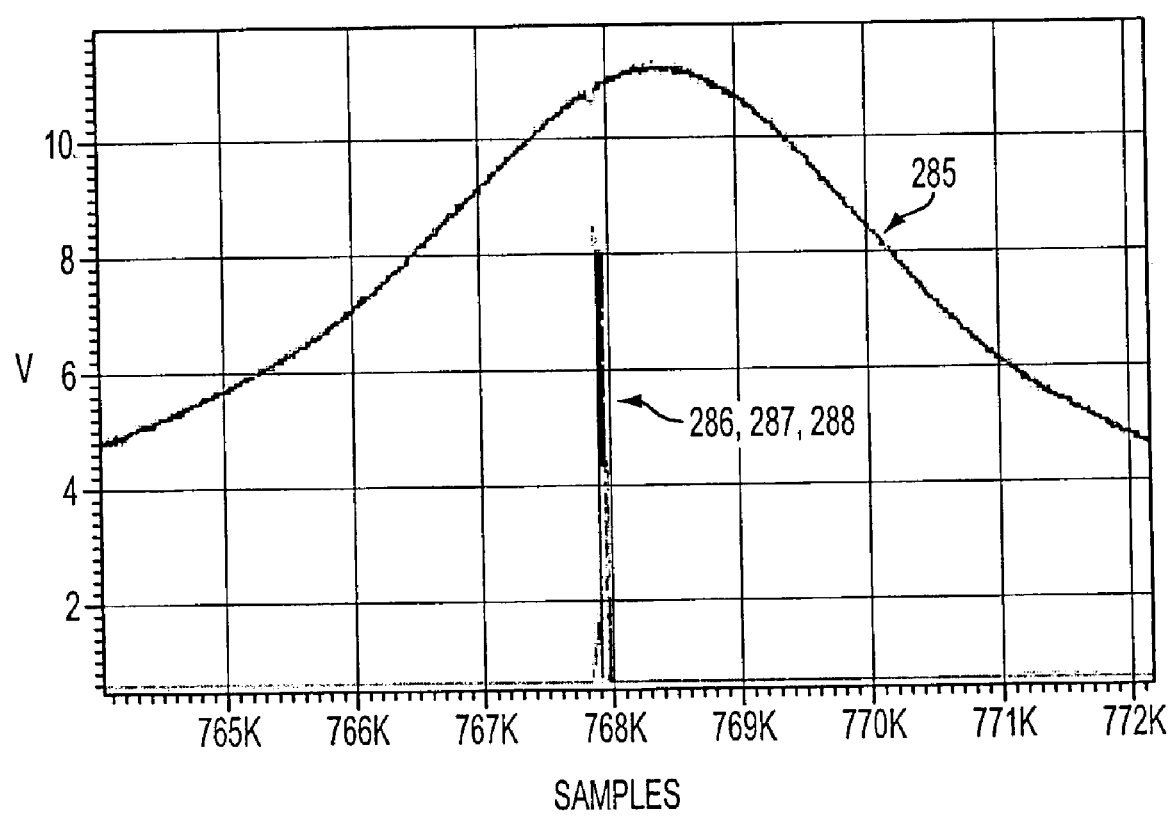
FIG. 21 illustrates spark timing with respect to cylinder pressure.

FIG. 21 illustrates the process of firing all the coils in the three cylinders of a three-cylinder engine near the cylinder one Top Dead Center position when cylinder one is nearing the end of its compression stroke. The top curve 285 represents cylinder #1 pressure. The bottom curve represents all coils firing at the same time at each cylinder firing 286, 287 and 288. This example is shown to display the differences between the cylinders in compression and those that are not in compression. Actual firing schemes will be the result of the engine configuration and were discussed above.

Figure 22:
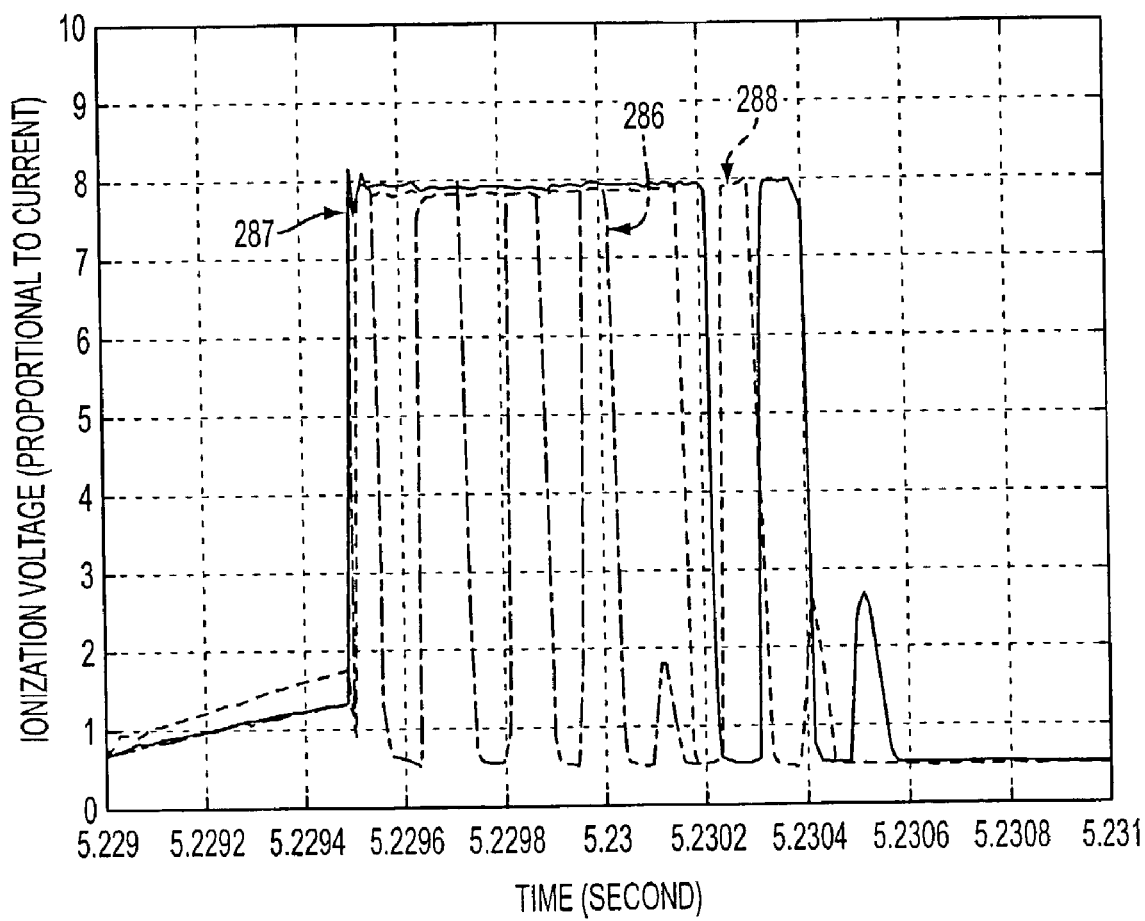
FIG. 22 illustrates ionization cylinder identification using partial charge.

FIG. 22 displays the results, showing that two of the cylinders sparked (saturating the ionization current signal), while cylinder one didn't break down due to lack of the higher voltage required, resulting in "ringing". The dot-dash curve 286 represents cylinder one which had no spark due to higher gas density in compression stroke. The solid curve 287 represents cylinder two, which sparked due to relatively low gas density (not in compression). The dash—dash curve 288 represents cylinder three, which sparked due to relatively low air density (not in compression).

FIG. 22 also illustrates the difference between ionization signals detected from different cylinders. The secondary coil voltage of cylinder one is not high enough to break down the gas gap and the voltages of cylinders two and three breaks down their gas gaps. For cylinder one, the gas between the spark plug gap was not broken down and a spark was not generated. The width of the first ionization pulse after the completion of dwell has a much shorter duration than the ionization signals of cylinders two and three. The ionization signals of cylinders two and three, where break-down occurred, have much longer pulse widths. Thus, by measuring the duration of the ionization signal pulses from each cylinder, one can detect which cylinder is in compression.

Those skilled in the art can immediately see a number of methods to provide a yes/no answer to the question of whether a spark event has occurred, several of which are listed below.

Figure 23:
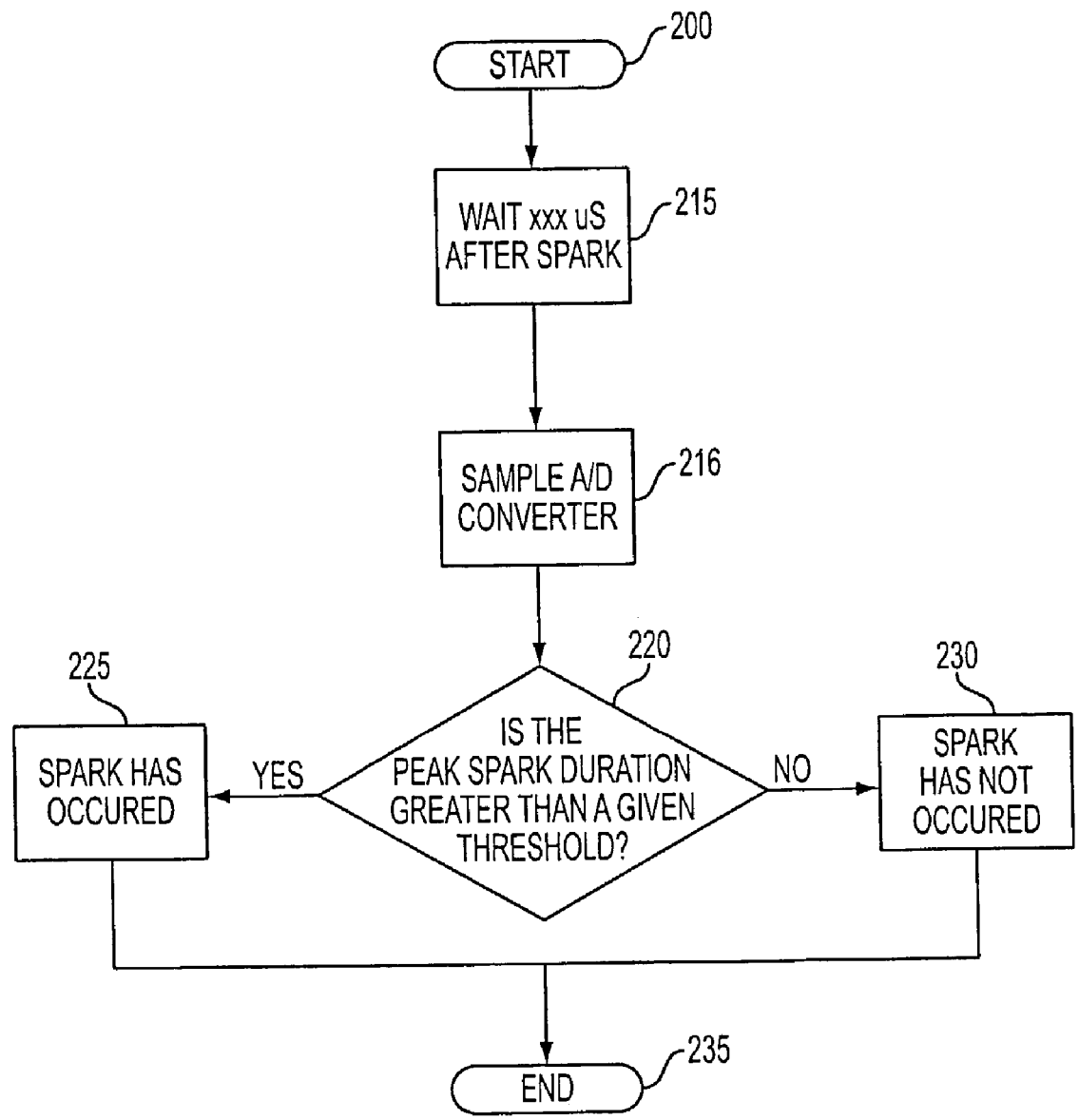
FIG. 23 illustrates a sampling method of determining whether a spark occurred.

In the case where ringing associated with the circuit does not cause saturation with the ion voltage/current levels that the microprocessor is measuring, it is possible to take a measurement during the expected spark window. If the peak magnitude of the measured pulse sequence is greater than a threshold, then a spark has occurred. Otherwise, a spark has not occurred. The reason is that the peak ringing current in the secondary coil is relatively smaller than the spark current. FIG. 23 illustrates a sampling method of determining whether a spark occurred.

Figure 24:
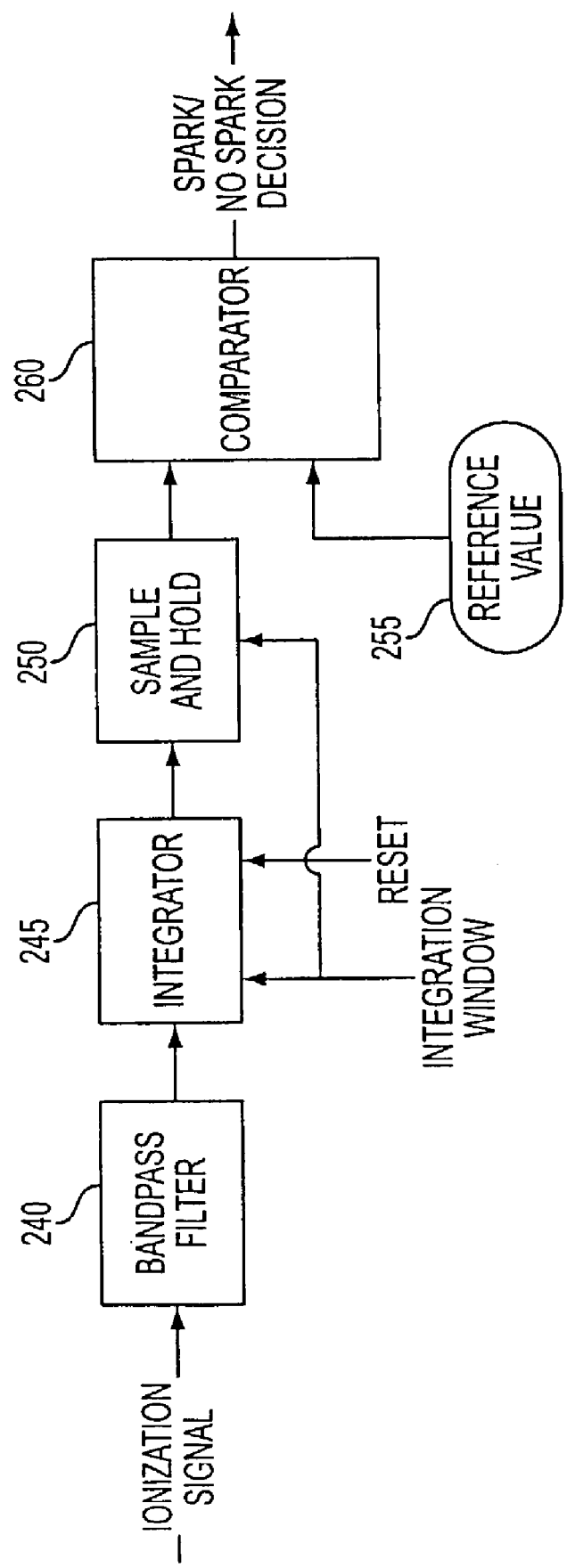
FIG. 24 illustrates an energy integration apparatus to determine whether a spark occurred.
Figure 25:
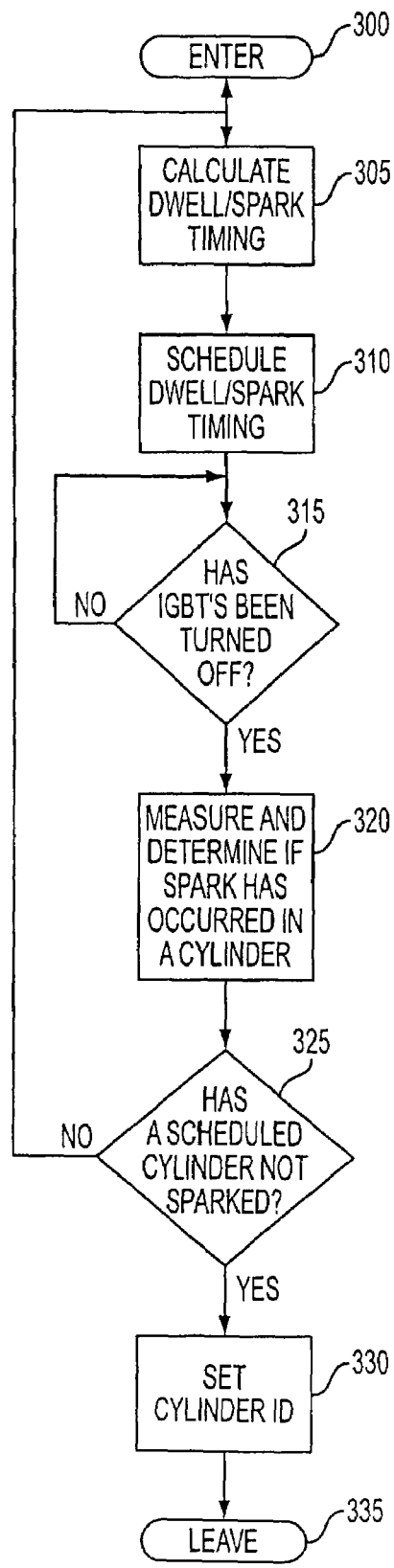
FIG. 25 is a flowchart of the steps taken when determining whether a spark occurred in a cylinder.
Figure 26:
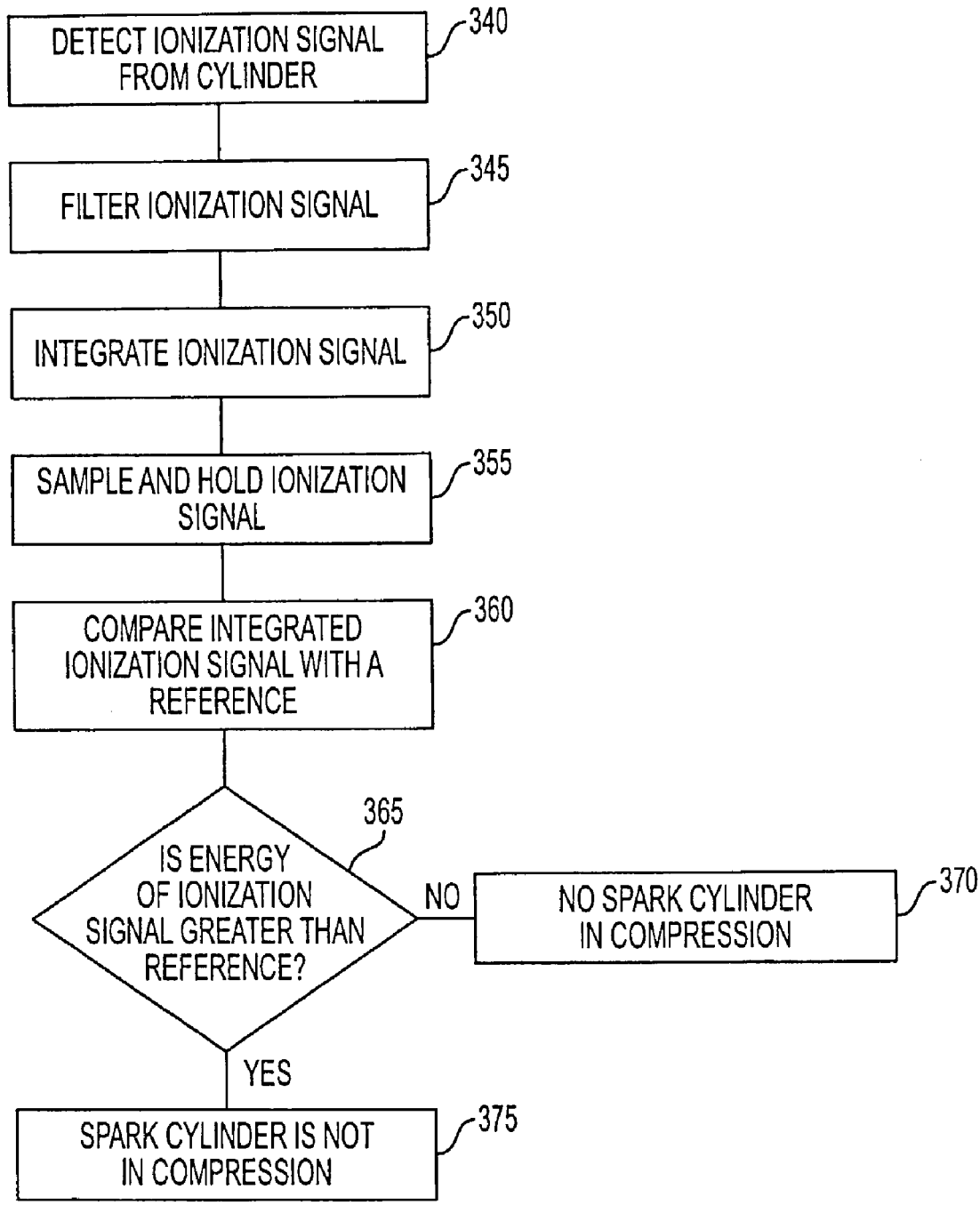
FIG. 26 is a flowchart of the steps taken in the energy integration apparatus for determining whether a spark occurred.

If the ringing saturates, a method that doesn't depend on absolute measurement values is used. One method is to convert the current to voltage, integrate the signal, and then use a comparator to determine if the integrated ionization signal over the spark window is above a certain threshold. If so, then a spark has occurred. Otherwise, a spark has failed to occur. FIG. 24 illustrates a spark energy integration apparatus for determining whether a spark occurred, where the spark energy is defined as the integrated ionization voltage over the spark window An overall flowchart showing the logic used in determining whether a spark occurred in a cylinder is shown in FIG. 25. As shown in the flowchart of FIG. 26, the values from all ionization signals are detected (340), filtered (345), and integrated (350). The integrated ionization signal is then sampled and held (355) and compared with a reference value (360). If the energy is below this reference, then no spark occurred (365, 370). If the integrated value in the cylinder exceeds a reference value or threshold, then a spark occurred (365, 375). The energy is defined as the ionization voltage during ignition integrated over the ignition window. Typically, the spark energy can be approximated by using the formula $E = V^{2} * (t/R)$, where E represents Energy, $V_{ION}$ represents ionization voltage proportional to ionization current, R represents Resistance, and t represents time.

Since resistance R is assumed to be constant due to the ionization measurement circuit, and it is known that the circuit saturates during a spark event, multiplying $V_{max}^{2}$ by the time results in a representative figure. A typical figure might be $(5V^{2}) * 0.5$ msec, which is proportional to the actual spark energy. The 0.5 msec represents a typical integration window at some engine speed (the actual window varies with engine speed), and the 5V represents the maximum value that the ionization measurement circuit produces. The typical reference value or threshold is set at 75% of this energy. These steps are illustrated in the flowchart shown in FIG. 26.

Figure 27:
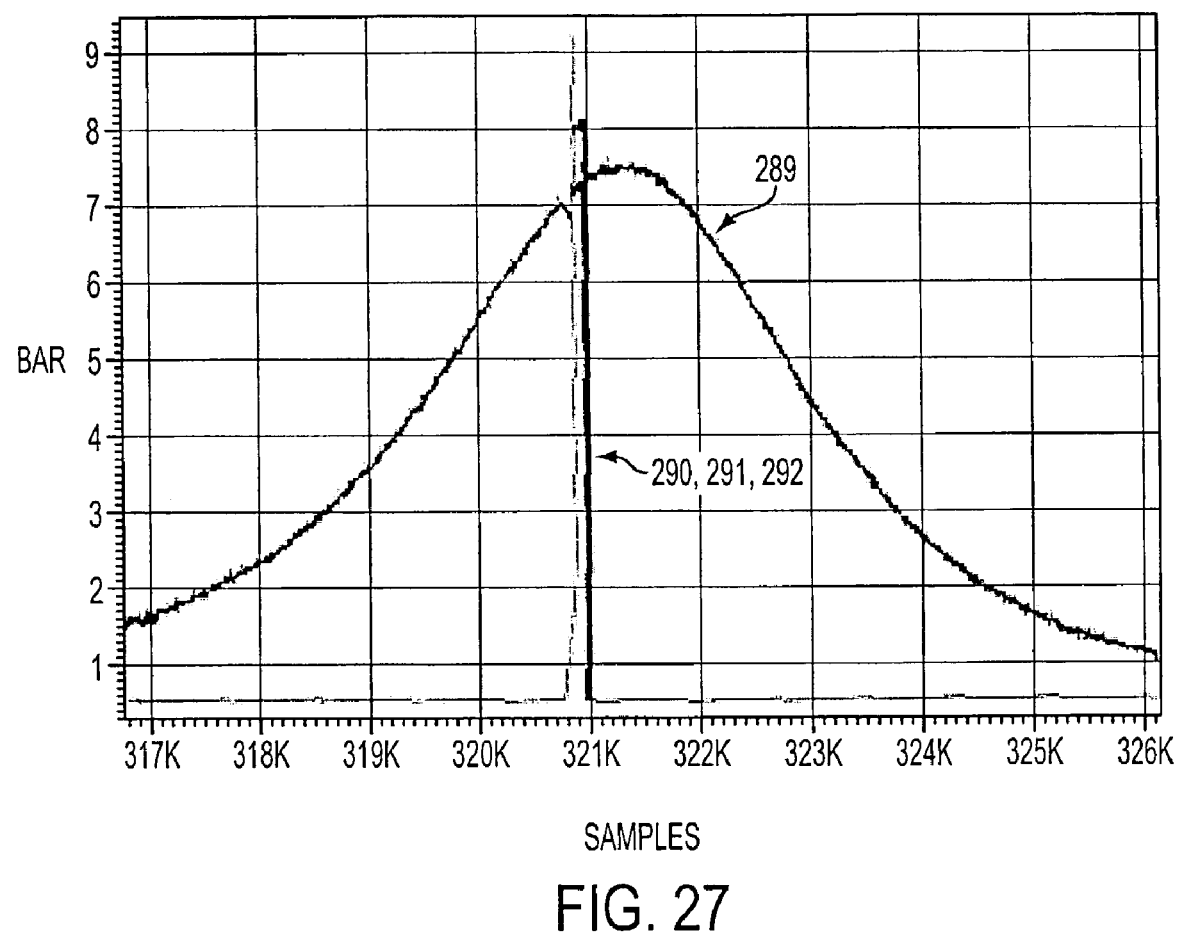
FIG. 27 illustrates all multiple cylinders being sparked at a given location on the crankshaft, where only one cylinder is actually in compression.

Section D: A Method of Detecting Cylinder ID Using In-Cylinder Ionization to Measure Spark Duration As discussed above, the cylinder (CID) detection process involves the calculation of spark timing from the ion signal. The procedure of determining which cylinders to spark and when is unchanged with respect to the procedure disclosed in Section C. FIG. 27 illustrates all multiple cylinders being sparked at a given location on the crankshaft, where only one cylinder is actually in compression. The broad curve 289 represents cylinder #1 pressure. The narrow curve 290, 291, 292 which passes through the broad curve at around the 321K sample represents all coils firing near top dead center TDC of each cylinder. The spark with the shortest duration is the cylinder under compression.

Figure 28:
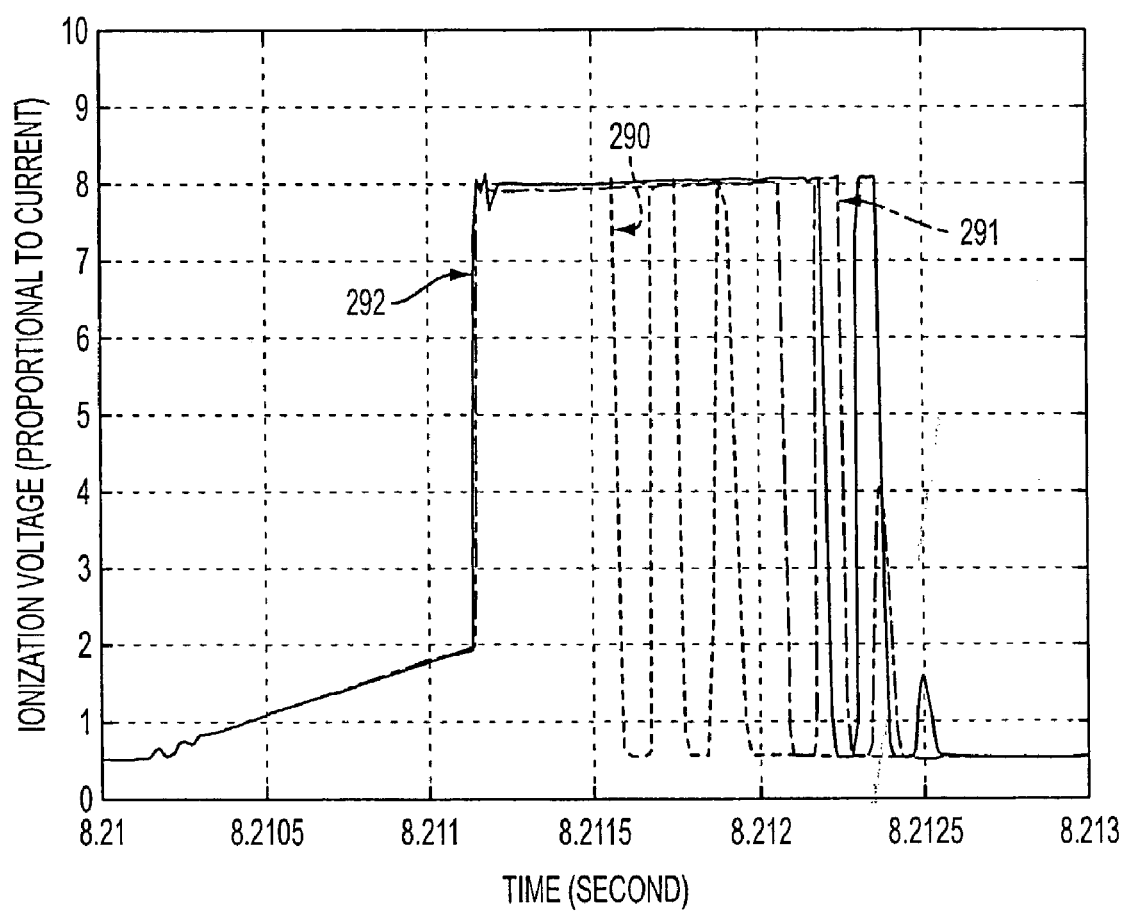
FIG. 28 illustrates ionization cylinder identification using spark duration.

FIG. 28 shows a close-up of the resulting spark durations, as relayed by the ionization voltage proportional to ionization current. It is clear that one of the three cylinders has a much shorter duration. This is the cylinder under compression. Note the "ringing" effect after the sparks end, which complicates detection efforts slightly. The dash—dash curve 290 represents cylinder one which had the shortest spark duration. The dot-dash curve 291 represents cylinder two which had a longer spark duration. The solid curve 292 represents cylinder three which had a longer spark duration.

It is clear that a factor used to determine which cylinder is in compression is linked to the ability to measure the duration of the spark. Two methods used to time this duration are described below.

Figure 29:
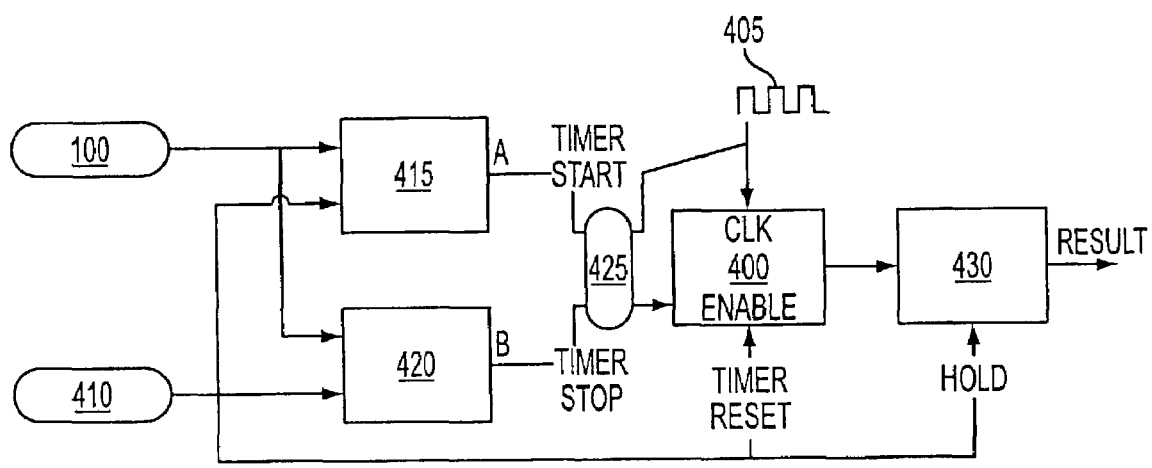
FIG. 29 illustrates an edge based timer with sample and hold circuit.
Figure 30:
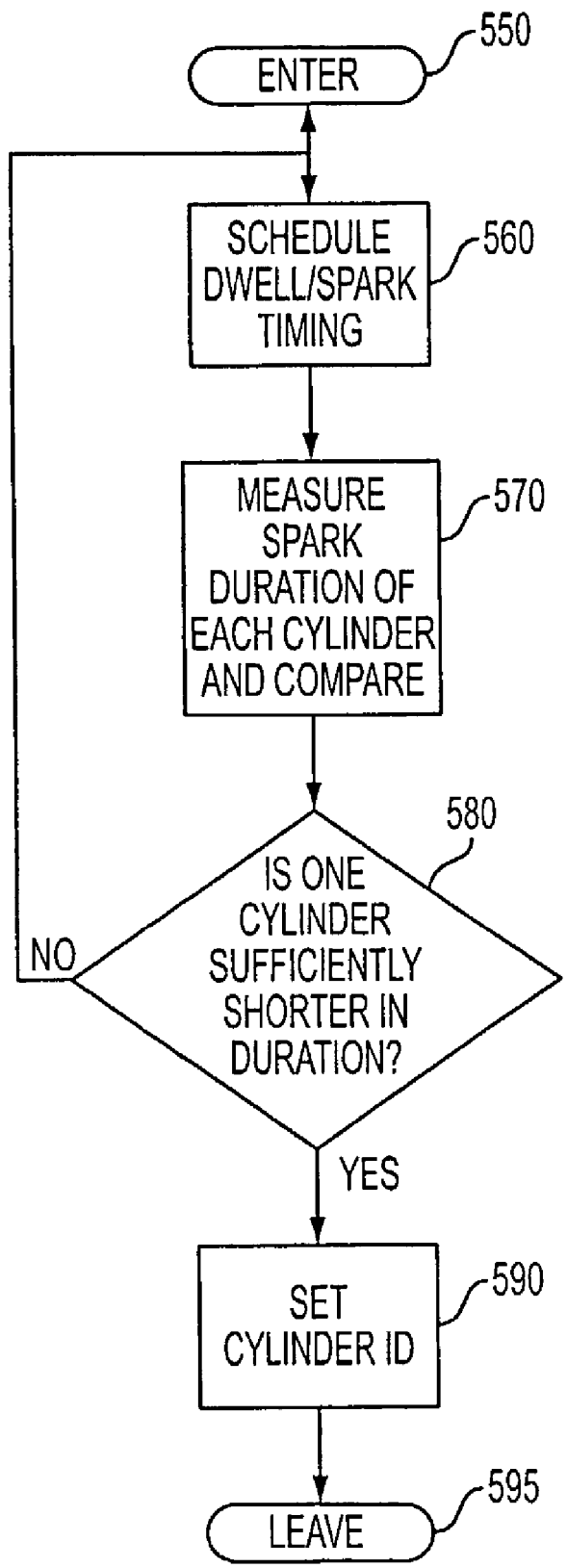
FIG. 30 is a flowchart of the steps used when determining spark duration using edge detection.

First, it is possible to use edge detection techniques to determine the amount of spark duration. Shown in FIG. 29 is a case where a timer 400 is turned on and off by the rising and falling edges of the spark event as seen through an ionization circuit. An ionization signal 100 and a window signal 410 are input to a rising edge detector 415 and a falling edge detector 420. The rising and falling edges toggle a flip-flop 425 operably connected to the enable pin of the timer 400. Note that since there is "ringing" in the circuit after the spark event, in a preferred embodiment the edge detectors 415, 420 used are one-shot. The outputs of multiple timing circuits would be held in a sample and hold circuit 430 and compared to see which event was shortest in duration. A clock signal 405 drives the timer 400 and flip-flop 425. FIG. 30 is a flowchart of the steps used when determining spark duration using edge detection.

Figure 31:
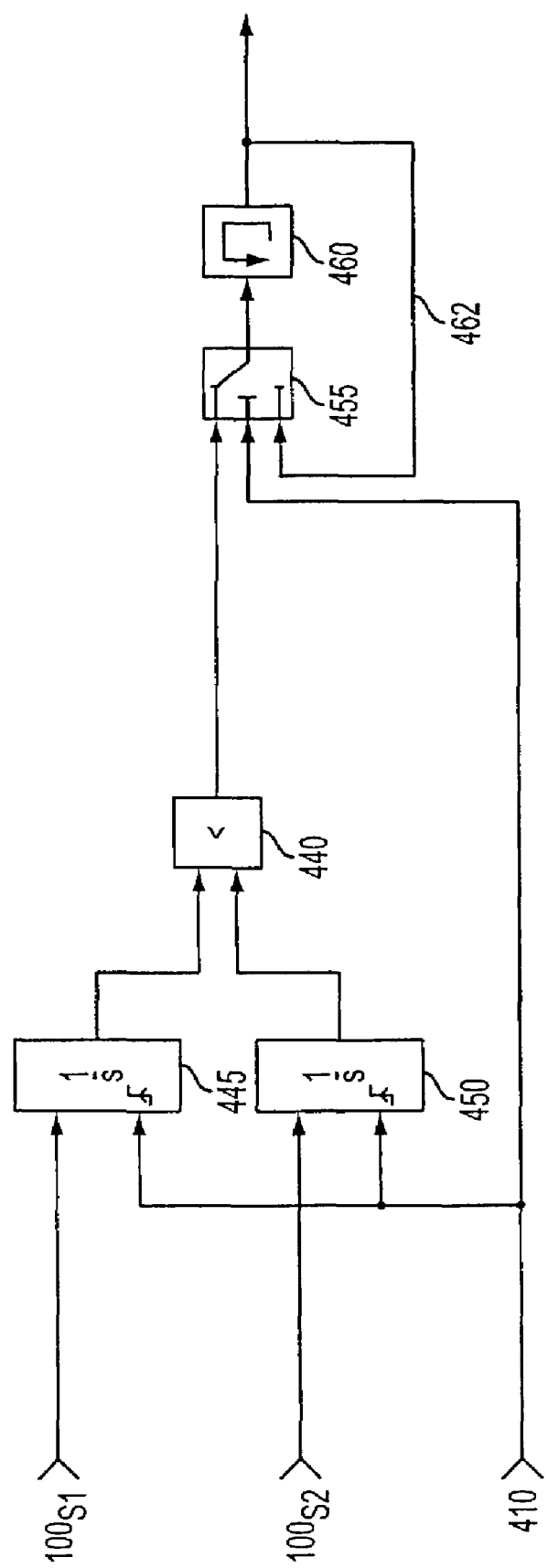
FIG. 31 illustrates a compare and integrate circuit.
Figure 32:
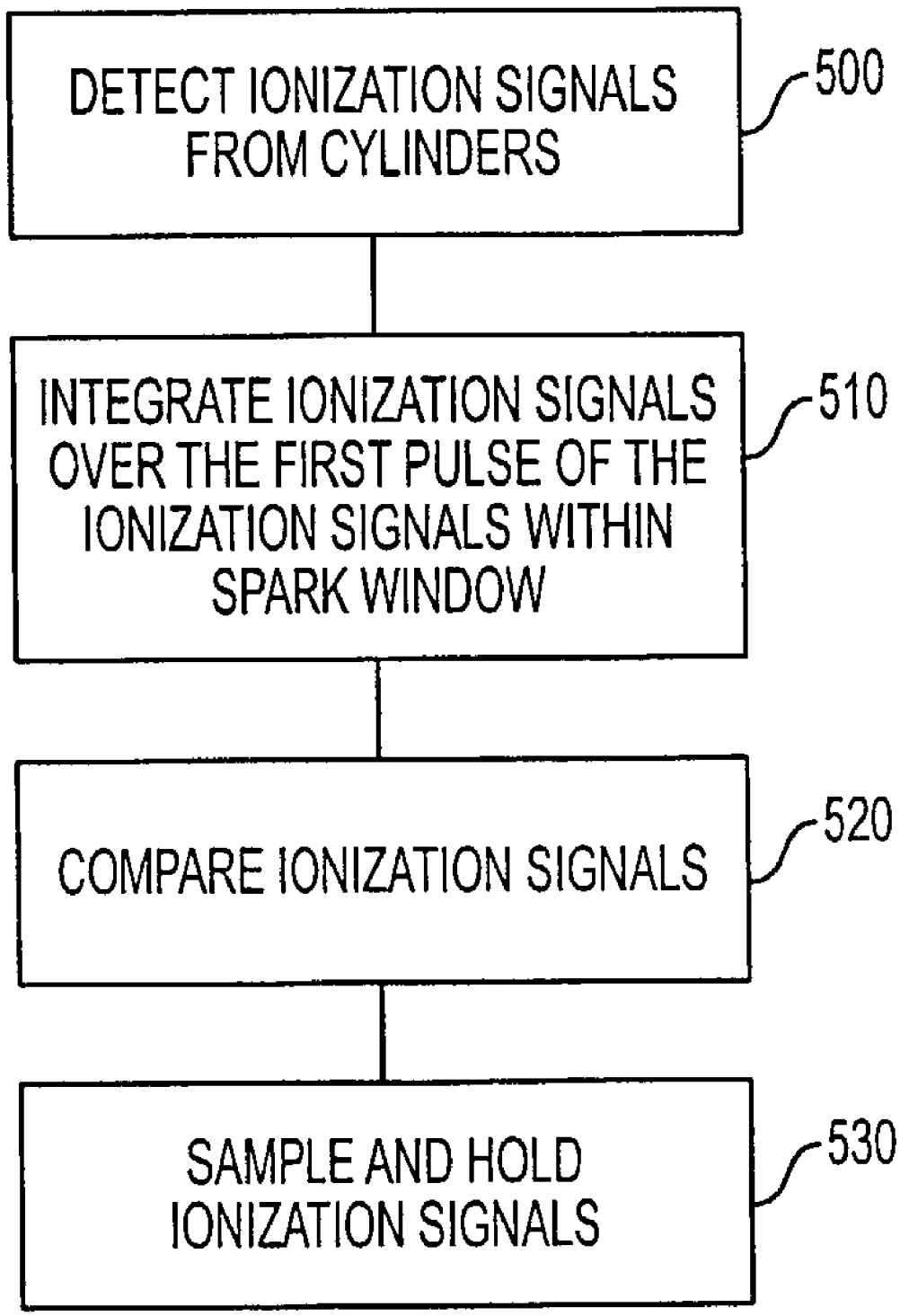
FIG. 32 is a flowchart of the steps taken in the compare and integrate circuit.

A different method for timing the spark duration would be to integrate the ionization signal. The circuit with the least amount of integrated energy would be the cylinder in compression. FIG. 31 illustrates a comparator circuit 440 using integration to compare two cylinder signals. The energy from two ionization signals $100_{S1}$, $100_{S2}$ are detected (500), integrated (510) in integrators 1 and 2 (445, 450) and compared (520). The result is sampled and held (530). The switch 455 and the memory circuit 460 together act as a sample and hold circuit 462, which is triggered by the window signal 410. The comparator 440 is used to indicate which of the two signals $100_{S1}$ or $100_{S2}$ is higher. The cylinder in compression would output the signal with the lower amount of energy. The energy is proportional to the ionization voltage during ignition integrated over the ignition window. These steps are illustrated in the flowchart shown in FIG. 32.

Section E: Ignition Coil with Integrated Coil Driver and Ionization Detection Circuitry Internal Combustion Engine (ICE) on-plug ignition coils with transistor drivers located in ECMs or other remote locations are prone to high EMI emissions and are subject to interference from other components due to long connecting wires. Ionization detection circuits have even greater EMI problems because of their very low signal current levels (microamperes). The solution is to integrate both the coil driver transistor and ionization detection circuits into the on-plug ignition coil (FIG. 33).

In a preferred embodiment, parts rated at 140 degrees centigrade are used in both the coil driver transistor and the ionization detection circuit which are integrated into the coil package to address temperature and thermal shock concerns. Additionally, parts rated at 20G are used in both the coil driver transistor and the ionization detection circuit to address vibration concerns.

Figure 33A:
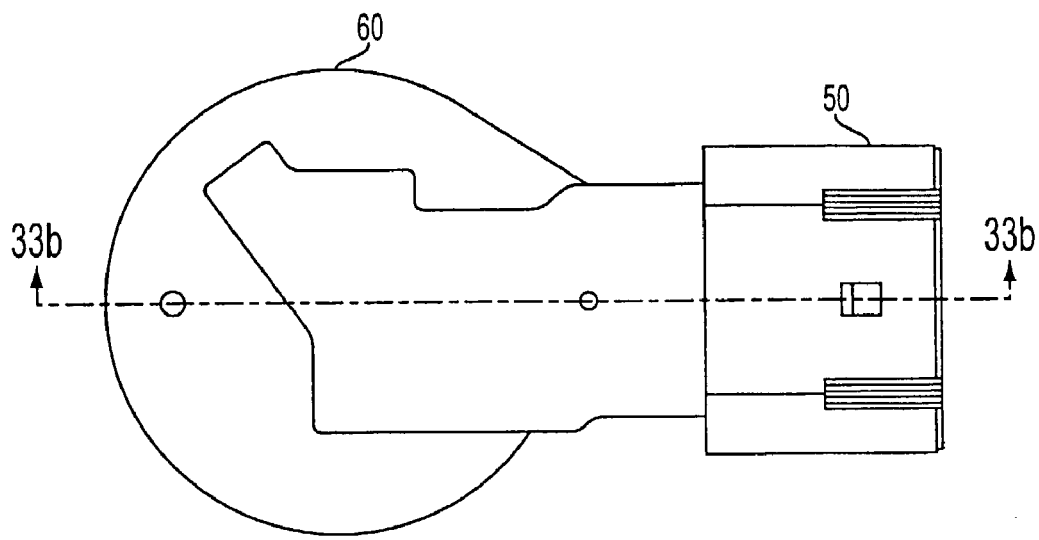
FIG. 33a is a top view of the ignition coil with integrated coil driver and ionization detection circuitry with the circuitry placed on the top of the coil.
Figure 33B:
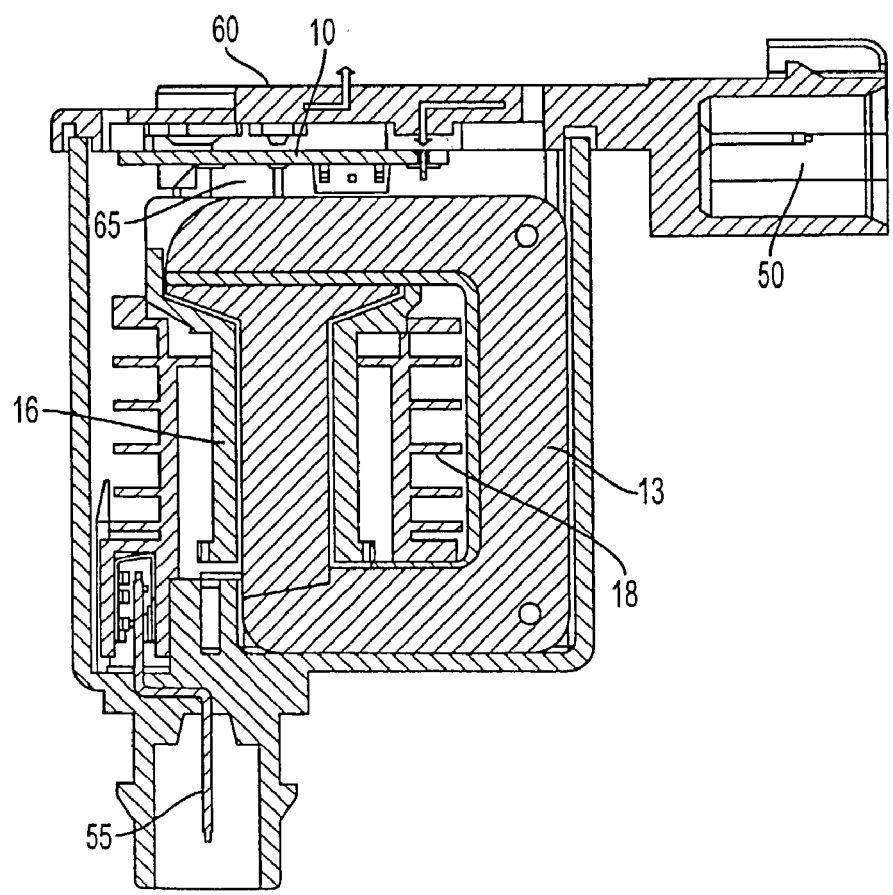
FIG. 33b is a side view of the ignition coil with integrated coil driver and ionization detection circuitry with the circuitry placed on the top of the coil.
Figure 34:
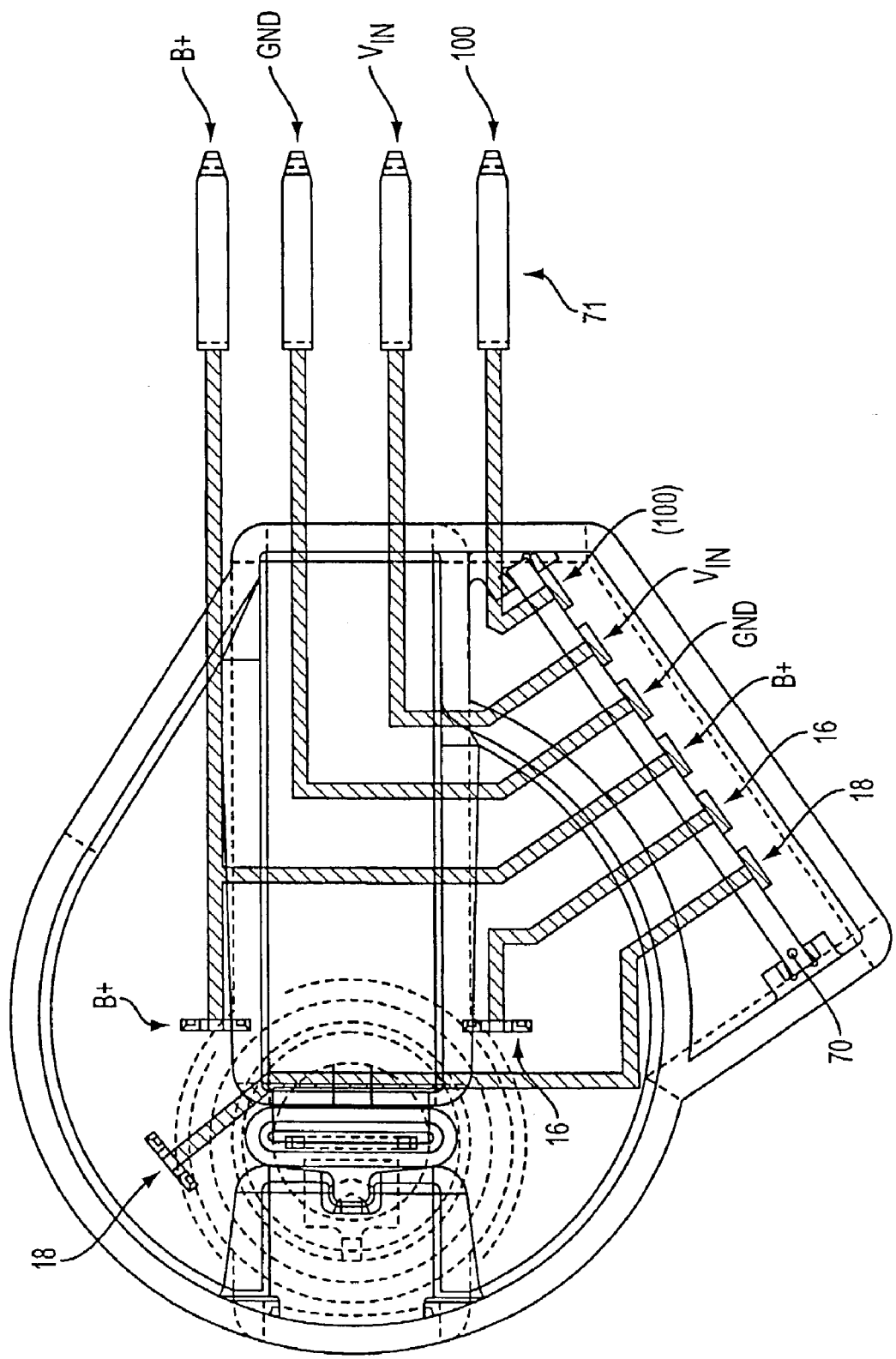
FIG. 34 is a view of the ignition coil with integrated coil driver and ionization detection circuitry with the circuitry placed on the side of the coil.

By placing the circuit on top of the coil or on the side of the coil, the connection distance from the circuit to the secondary winding is minimized (see FIGS. 33a and 33b for the top of the coil embodiment). Thus, the circuit is less susceptible to noise. Another advantage is that the placement is easy to assemble. The driver and ion circuit board simply clips on to the ignition coil assembly. Therefore, use of clip connectors 65 is another advantage provided by the layout. The top view 33a illustrates the cover 60 used to protect the driver and ionization circuit board 10 and the connector 50 operably connected to the powertrain control module PCM. The side view 33b illustrates primary winding 16, the core 13, the secondary winding 18, the driver and ionization circuit board 10, the clip connector 65, the cover 60, the connector 55 operably connected to the spark plug, and the connector 50 which is operably connected to the powertrain control module PCM. In FIG. 34, the circuit is placed on the side of the coil. The ionization signal 100, gate drive signal Vin, ground Gnd, power B+, coil primary feed 16 and coil secondary 18 inputs located on a printed wire board 70 are illustrated. The power B+, ground Gnd, gate drive Vin and ionization signal 100 signals are also located on four connector blades 71.

Section F: A Method for Reducing Pin Count of an Integrated Ignition Coil with Driver and Ionization Detection Circuit by Multiplexing Ionization and Coil Charge Current Feedback Signals The combustion process of a spark ignited (SI) engine is governed by in-cylinder air/fuel (A/F) ratio, temperature and pressure, exhaust gas recirculation (EGR) rate, ignition time, duration, etc. Engine emission and fuel economy are tightly dependent on its combustion process. For homogenous combustion engines, most often, the engine A/F ratio is controlled in a closed loop using a heated exhaust gas oxygen (HEGO) or universal exhaust gas oxygen (UEGO) sensor. The exhaust gas recirculation EGR rate is controlled with the help of Δ pressure measurement. Due to unavailability of a low cost combustion monitor sensor, engine spark timing is controlled in an open loop and corrected by knock detection result. One of the low cost options for combustion sensing is ionization detection, which measures ion current generated during the combustion process by applying a bias voltage onto a spark plug gap. When moving the ignition driver on to the ignition coil (e.g., pencil and on-plug coils), it would be desirable to integrate both the ignition driver circuit and ionization detection circuit onto the ignition coil, see Section E of this application for details. One open issue is to use minimum pin count of the integrated package to cover both integrated driver and ionization detection circuits for reduced cost. This feature proposes to multiplex the ignition coil charge current feedback signal with the ionization signal, and therefore, reduce the package pin count by one.

The conventional design for an integrated ignition coil with driver and ionization detection circuit consists of five pins: coil charge gate signal, charge current feedback signal, ionization current signal, battery power and ground. Each pin count increases ignition subsystem cost due to the ignition coil connector, the harness, and the engine control unit (ECU) connector. In order to reduce subsystem cost, this invention multiplexes both the primary charge current feedback and the ionization current signals. This is possible because the primary coil charge and combustion events occur sequentially.

It is desirable to integrate the ignition coil driver electronics onto the ignition coil (e.g., pencil or coil-on-plug), see Section E, mainly to get rid of high current pins between powertrain control module PCM and ignition coils and to reduce electrical and magnetic interference. A design for an integrated ignition coil with driver consists of four pins: Ignition coil primary winding charge gate signal; Primary winding charge current feedback signal; Battery power supply B+; and Battery ground.

With the integration of an ionization detection circuit onto the ignition coil with integrated driver, an additional output pin is required to send the detected ionization current signal back to the powertrain control module PCM. Therefore, the ignition coil with integrated driver and ionization circuit requires a five-pin connector.

In order to reduce cost and make coil packaging easier, this invention proposes to multiplex both the ionization and driver current feedback signals into one signal so that the ignition coil with integrated driver and ionization circuit has the same pin count number as the driver on coil design.

FIG. 35 shows a diagram of an integrated coil driver and ionization detection sub-system 72 which illustrates multiplexing the ionization signal and the charge current or driver current feedback signals. The sub-system consists of a coil driver circuit 75, an ionization detection circuit 80, and an amplifier 85. The driver circuit 75 charges the primary winding 16 of the ignition coil 12 when the charge is enabled. Next, the ionization detection circuit 80 applies a bias voltage through the secondary winding 18 of the ignition coil 12 to the spark plug 14 and the resulting ionization current $I_{ion}$ is due to the ions produced during the combustion process. The amplifier 85 magnifies the detected signal for improved signal to noise ratio.

Figure 36A:
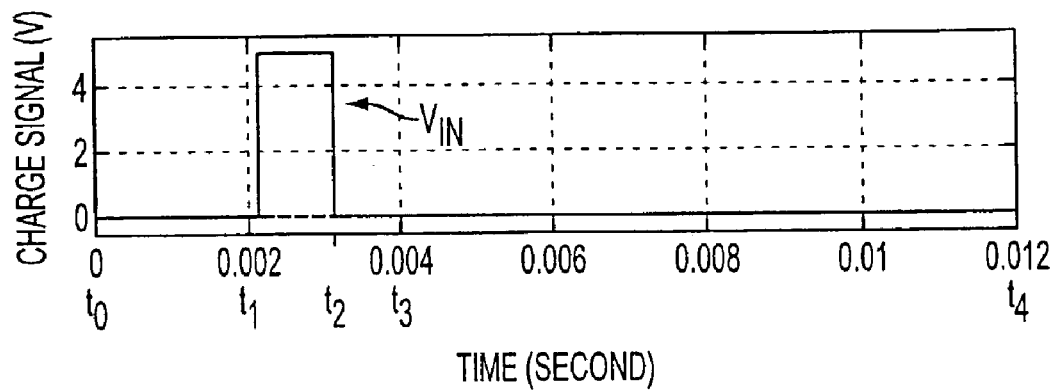
FIG. 36a illustrates the charge command $V_{in}$ signal.
Figure 36B:
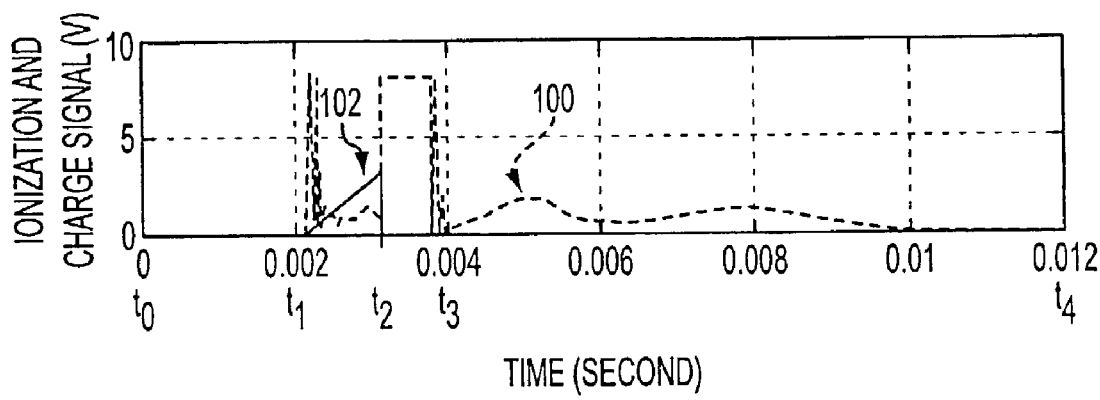
FIG. 36b illustrates the detected ionization voltage.
Figure 36C:
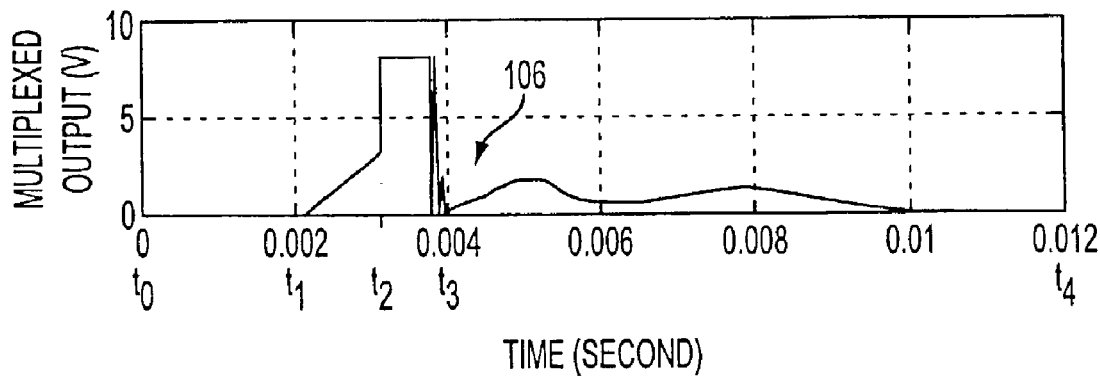
FIG. 36c illustrates the ionization voltage multiplexed with the charge current feedback signal.

FIGS. 36a–c shows the charge command $V_{in}$ signal (FIG. 36a), the detected ionization voltage or signal 100, represented by a dashed line, and the charge current feedback signal 102, represented by a solid line (FIG. 36b), and the ionization voltage or signal multiplexed with the charge current feedback signal 106 (FIG. 36c). Between $t_0$ and $t_1$ there is no combustion and the ignition coil 12 is at rest. The charge command $V_{in}$ becomes enabled at $t_1$ and disabled at $t_2$. During this period, the primary coil 16 is fully charged (600). This is a detection window for current feedback. The ignition of the air/fuel mixture occurs between time $t_2$ and time $t_3$ (610). The combustion process is completed between time $t_3$ and time $t_4$ (620).

The feasibility of multiplexing both the charge current feedback and ionization detection signals is shown in FIG. 36b. Since combustion 620 happens after ignition 610, the main ionization detection window occurs between time $t_2$ and time $t_4$. This sequencing of events makes it possible to multiplex both the ionization signal 100 and the charge current feedback signal 102.

In the present method, the multiplexed signal 106 first outputs the ionization detection signal 100 and replaces the ionization signal 100 with the charge current feedback signal 102 when the charge command $V_{in}$ is enabled, see FIG. 36a. FIG. 36b shows both charge current feedback 102 (solid) and ionization 100 (dash) signals. FIG. 36c shows the multiplexed signal 106.

During time $t_0$ and time $t_1$, the output is ionization signal 100. The switch SW1 is connected to the output of the ionization detection circuit (or the ion current node) 82. When the charge command $V_{in}$ is enabled between $t_1$ and $t_2$, the switch SW1 switches to the charge current feedback signal node 84 which is connected through driver circuit 75 to one end of the primary winding 16 of the ignition coil 12. Thus, the switch SW1 outputs the charge current feedback signal 102 (a voltage signal across resistor 24 that is proportional to primary charge current, see FIG. 35). After $t_2$, the signal 106 switches back to ionization signal 100. Note that between $t_2$ and $t_3$, the ionization signal 100 provides information regarding ignition process 104, i.e., the ignition current detected by the ion circuit, and between $t_3$ and $t_4$ information regarding combustion process (630).

Figure 37:
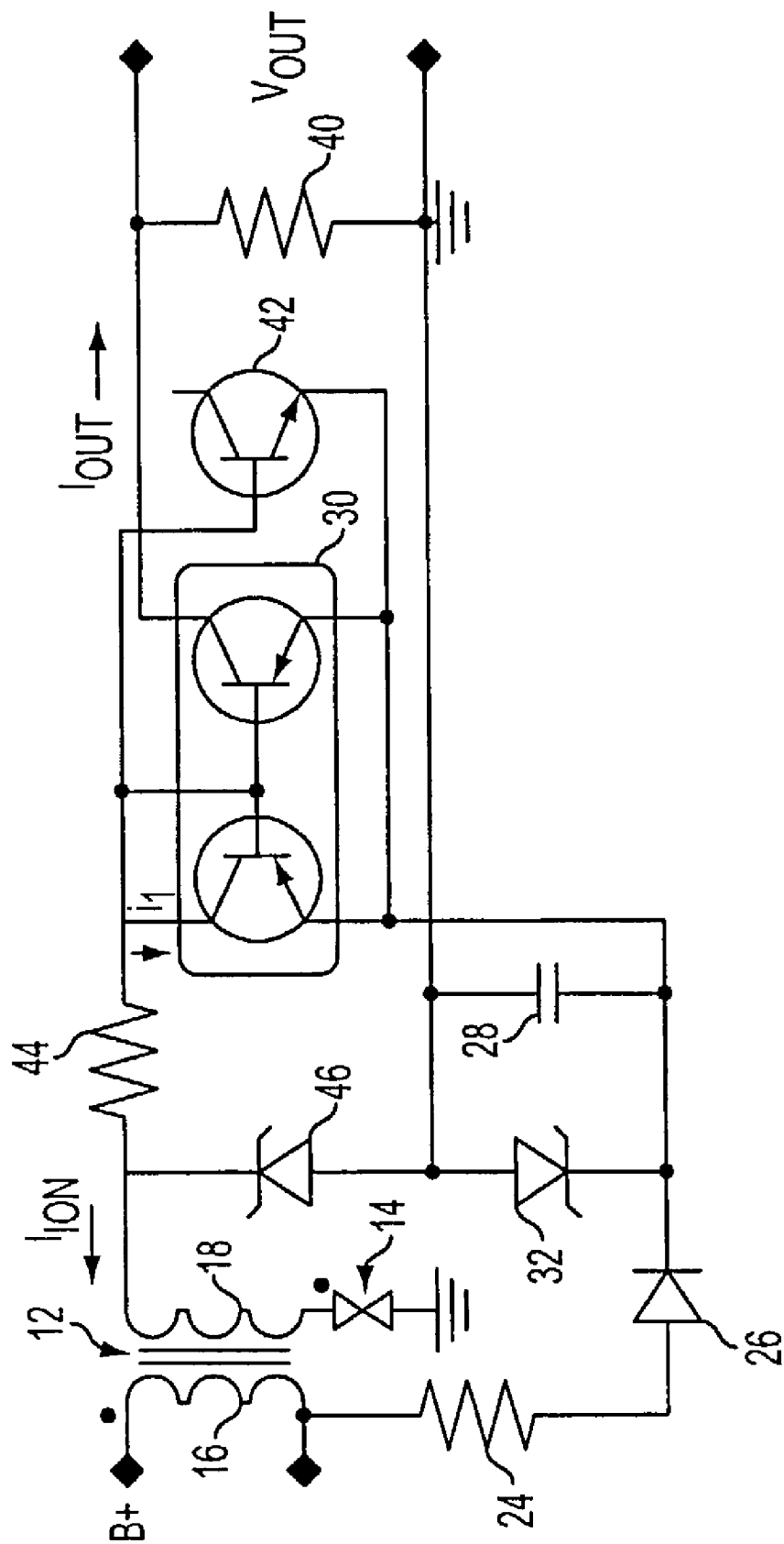
FIG. 37 shows a diagram of an integrated coil driver and ionization detection sub-system.

FIG. 37 shows a diagram of an integrated coil driver and ionization detection sub-system. The sub-system consists of ignition coil 12 and an ionization detection circuit 28, 30. A driver circuit charges the primary winding 16 of the ignition coil 12 when the charge is enabled Vin. Next, the ionization detection circuit 28, 30 applies a bias voltage through the secondary winding 18 of the ignition coil 12 to the spark plug 14. Ionization current is generated due to the ions produced during the combustion process. An amplifier is used to magnify the detected signal for improved signal to noise ratio.

Figure 38:
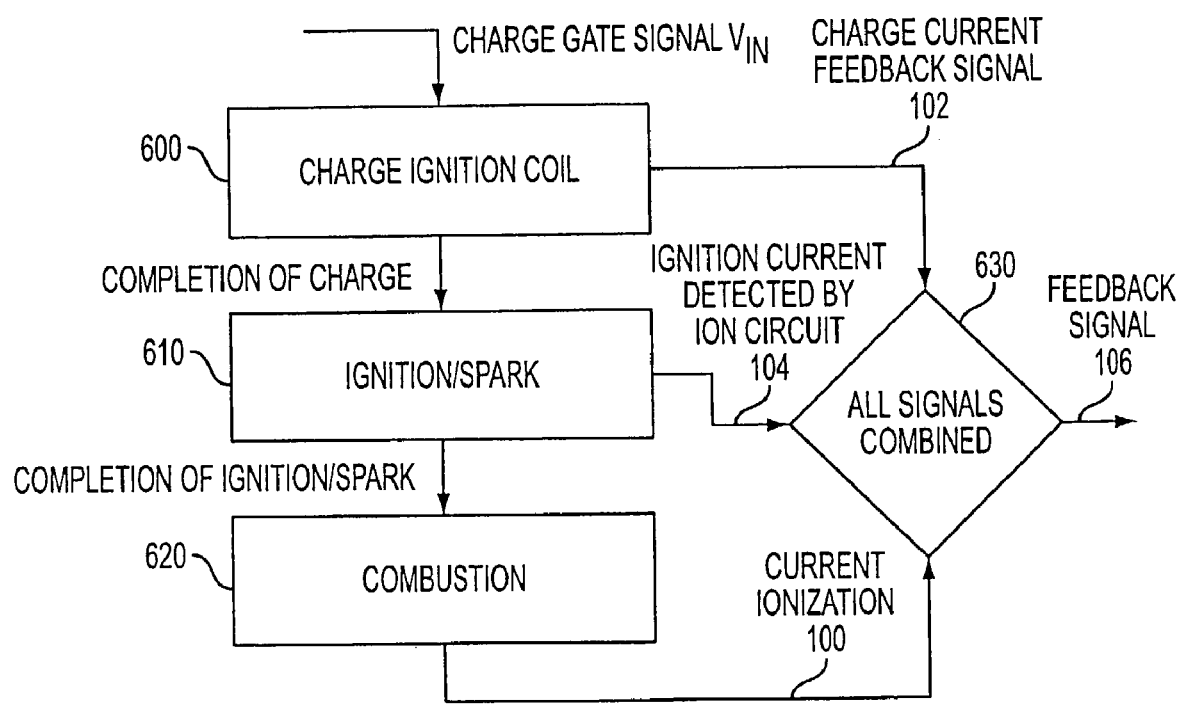
FIG. 38 is a flowchart illustrating the steps of the present embodiment of an integrated coil driver and ionization detection sub-system.

In summary, the multiplexed feedback signal 106 outputs the ionization feedback signal 100 and switches to charge current feedback signal 102 when the charge command $V_{in}$ is active. FIG. 38 is a flowchart illustrating the steps of the present embodiment of the integrated coil driver and ionization detection sub-system 72.

Figure 39:
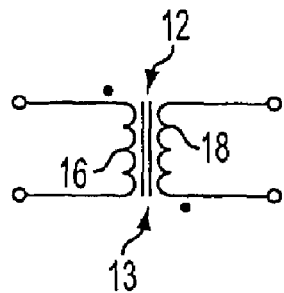
FIG. 39 is a schematic of an ignition coil.

Section G: A Device to Provide a Regulated Power Supply for In-Cylinder Ionization Detection by Using the Ignition Coil Fly Back Energy and Two-Stage Regulation This feature pertains to a device that provides a regulated power supply for in-cylinder ionization detection by harvesting the excess ignition coil leakage and magnetizing energy immediately following the turn off of the ignition coil IGBT. Spark ignition systems for internal combustion engines must deliver sufficient energy to a spark plug electrode air gap to ignite the compressed air-fuel mixture in the cylinder. To accomplish this, energy is stored in a magnetic device commonly referred to as an ignition coil 12. The stored energy is then released to the spark plug 14 air gap at the appropriate time to ignite the air-fuel mixture. A schematic diagram of a typical ignition coil is shown in FIG. 39. The coil 12, which is actually a flyback transformer, consists of primary 16 and secondary windings 18 that are magnetically coupled via a highly permeable magnetic core 13. The secondary winding 18 normally has many more turns than the primary winding 16. This allows the secondary voltage to fly up to very high levels during the "flyback" time.

Figure 40:
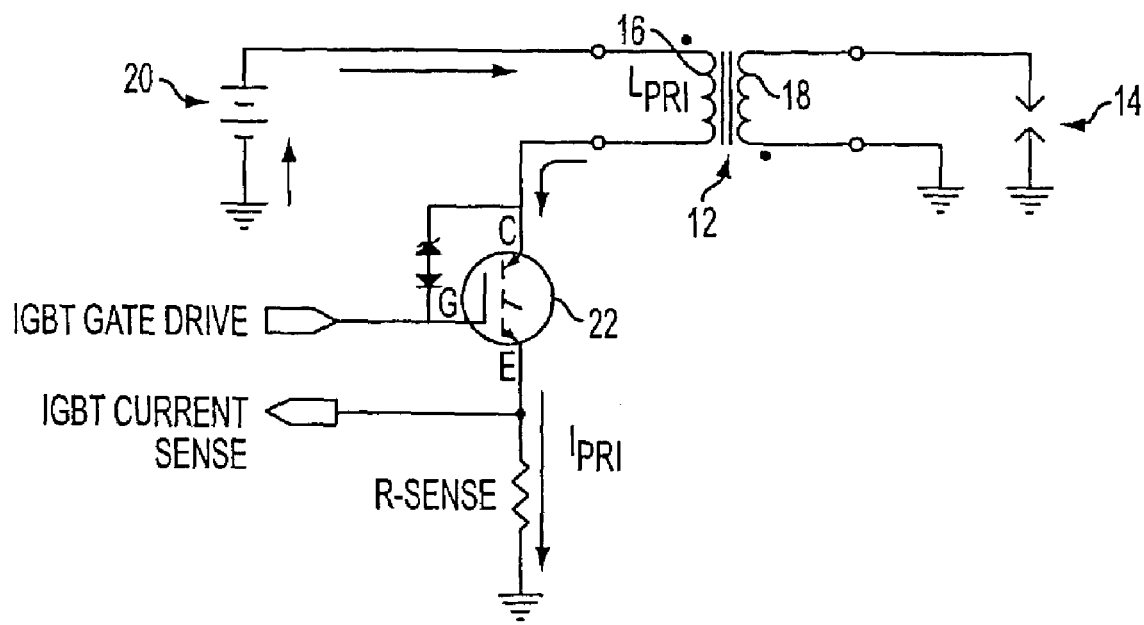
FIG. 40 illustrates the charging of an ignition coil.
Figure 41:
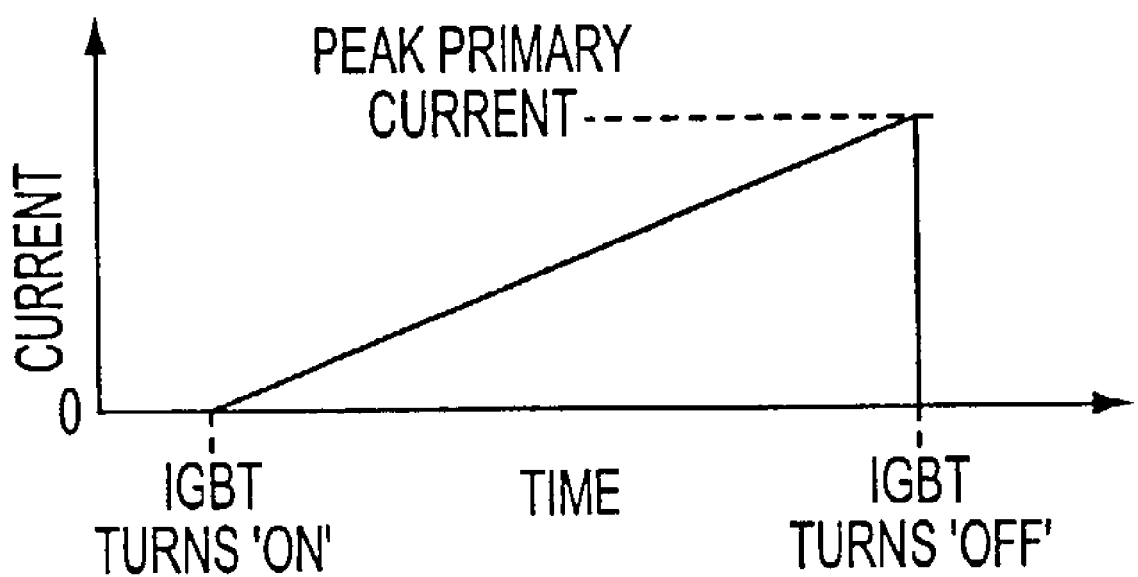
FIG. 41 is an ignition coil charging current profile.

Energy is stored in the coil by turning on a power switch, normally an Insulated Gate Bipolar-Junction Transistor (IGBT) 22, and applying battery voltage across the primary winding 16 of the ignition coil 12. With a constant voltage applied to the primary inductance ($L_{pri}$), primary current ($I_{pri}$) increases linearly until it reaches a predetermined level (FIGS. 40 and 41).

The energy stored in the coil is a square function of the coil primary current per the following equation:

$$\text{Energy} = \tfrac{1}{2} \times L_{pri} \times (I_{pri})^2$$

Figure 42:
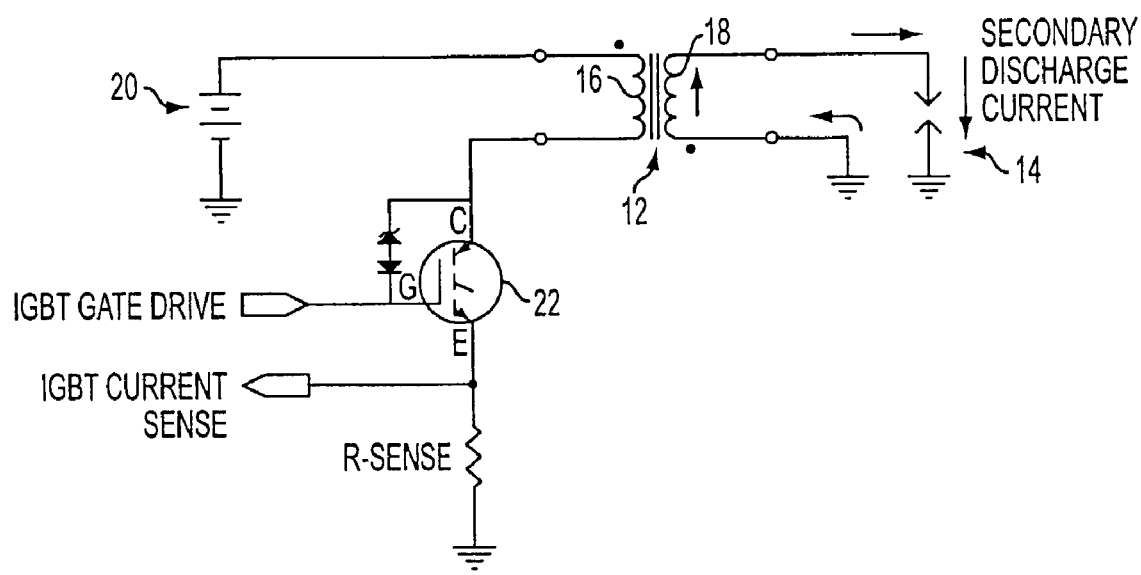
FIG. 42 illustrates an ignition coil discharging.

Once the primary current $I_{pri}$ has reached a predetermined peak level, the primary power switch IGBT 22 is turned off. When this occurs, the energy stored in the coil inductance $I_{pri}$ causes the transformer primary voltage to reverse and fly up to the IGBT clamp voltage, nominally 350 to 450 volts. Since the secondary winding 18 is magnetically coupled to the primary winding 16, the secondary voltage also reverses, rising to a value equal to the primary clamp voltage multiplied by the secondary to primary turns ratio (typically 20,000 to 40,000 volts). This high voltage appears across the electrodes of the spark plug 14, causing a small current to flow between the spark plug 14 electrodes through the electrode air gap. Though this current is small, the power dissipated in the air gap is significant due to the high voltage across the air gap. The power dissipated in the electrode air gap rapidly heats the air between the electrodes causing the molecules to ionize. Once ionized, the air/fuel (A/F) mixture between the electrodes conducts heavily, dumping the energy stored in the flyback transformer 12 in the spark plug 14 air gap (FIG. 42). The sudden release of energy stored in the flyback transformer 12 ignites the air/fuel (A/F) mixture in the cylinder.

In-cylinder ionization detection requires a regulated power supply to establish a bias voltage across the spark plug 14 electrodes. This voltage, which is generally in the 80 to 100 volt DC range, produces an ionization current ion that is nominally limited to a few hundred micro-amps. The resulting ionization current $I_{ion}$ is then sensed and amplified to produce a usable signal for diagnostic and control purposes.

Since the magnitude of the ionization current $I_{ion}$ is relatively small, it is desirable to locate the sensing and amplifying electronics close to the coil 12 and spark plug 14. It is also preferable to locate the high voltage power supply very close to the ionization electronics since bussing high voltages under a car hood is undesirable. Therefore, means are provided to create the high voltage locally.

One method of creating the ionization potential is to use a DC—DC converter to create an 80 to 100 volt power supply from the available 12 Volts DC at the ignition coil 12. This method, though straight forward and reliable, requires several components to implement and, therefore, may be cost and space prohibitive.

Another method is to charge a capacitor from the collector of the primary IGBT immediately following IGBT 22 turn off. The primary benefit of this technique is that it does not require a separate boost converter to create the ionization bias voltage. A second, and perhaps equally significant benefit is that it captures at least part of the energy stored in the transformer leakage inductance and transfers it to the energy storage capacitor. Normally, this energy would be dissipated on the IGBT 22 as heat, raising its operating temperature. An embodiment of this technique is shown schematically in FIG. 43. As previously described, the energy stored in the coil inductance $L_{pri}$ causes the transformer primary voltage to reverse and fly up to the IGBT clamp voltage (350 to 450 volts) when the IGBT 22 turns off. When this occurs, diode D1 is forward biased allowing a current to flow through D1 and the current limiting resistor R1 into capacitor C1. Zener diode D2 limits the voltage on C1 to approximately 100 volts.

A disadvantage of this method is that the energy storage capacitor, C1, stores energy at a relatively low voltage (100 volts) compared to the magnitude of the flyback voltage (approximately 400 volts). Since the energy stored in the capacitor C1 is a function of the square of the capacitor voltage, storing energy at a low voltage requires a much higher value of capacitance for a given amount of stored energy than if the capacitor was allowed to charge to a higher voltage. For example, to store 500 μ-joules at 100 volts requires a 0.1 μfd capacitor. To store the same energy at 200 volts requires only a 0.025 μfd capacitor. The capacitance is reduced by a factor of four by doubling the capacitor voltage.

A second disadvantage of this method is that the R1×C1 time constant must be short enough to allow a complete recharge of C1 in the short time between IGBT 22 turn off and spark plug firing (normally less than a micro-second). At the same time, C1 must be large enough to supply ionization current $I_{ion}$ without a substantial drop in the voltage on C1 under worst-case conditions (low rpm, fouled spark plug). This forces R1 to be a relatively small value (10's of ohms) and results in a relatively large capacitor charging current when the IGBT 22 turns off. Under nominal operating conditions (2000 to 3000 rpm, clean spark plug) the discharge on C1 due to ionization is moderate resulting in excess charging current being diverted into the zener diode (D2). The product of excess zener diode current and zener voltage constitutes energy wasted in the zener diode D2.

Figure 44:
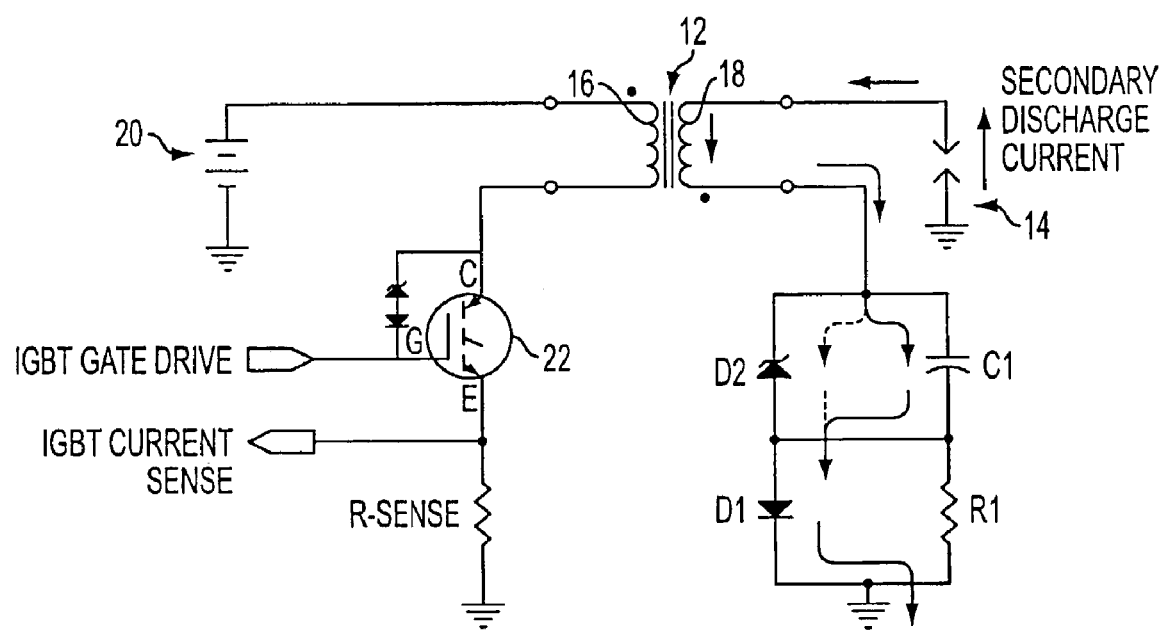
FIG. 44 illustrates an energy storage capacitor being charged from the secondary winding.

Another method is to charge an energy storage capacitor with the secondary ignition current by placing the capacitor in series with the secondary winding 18 of the flyback transformer 12. An embodiment of this technique is shown schematically in FIG. 44. Spark current flowing in the secondary 18 of the ignition coil 12 charges the energy storage capacitor C1 via diode D1. Once the voltage on C1 reaches the zener voltage, secondary current is diverted through the zener diode D1, limiting the voltage on C1 to approximately 100 volts.

Since C1 is in series with the secondary winding, it is not possible to harvest leakage energy to charge C1. A portion of the energy which would normally be delivered to the spark gap is now stored in C1. Therefore, the stored magnetizing energy in the transformer 12 must be increased to compensate for this energy diversion.

Figure 43:
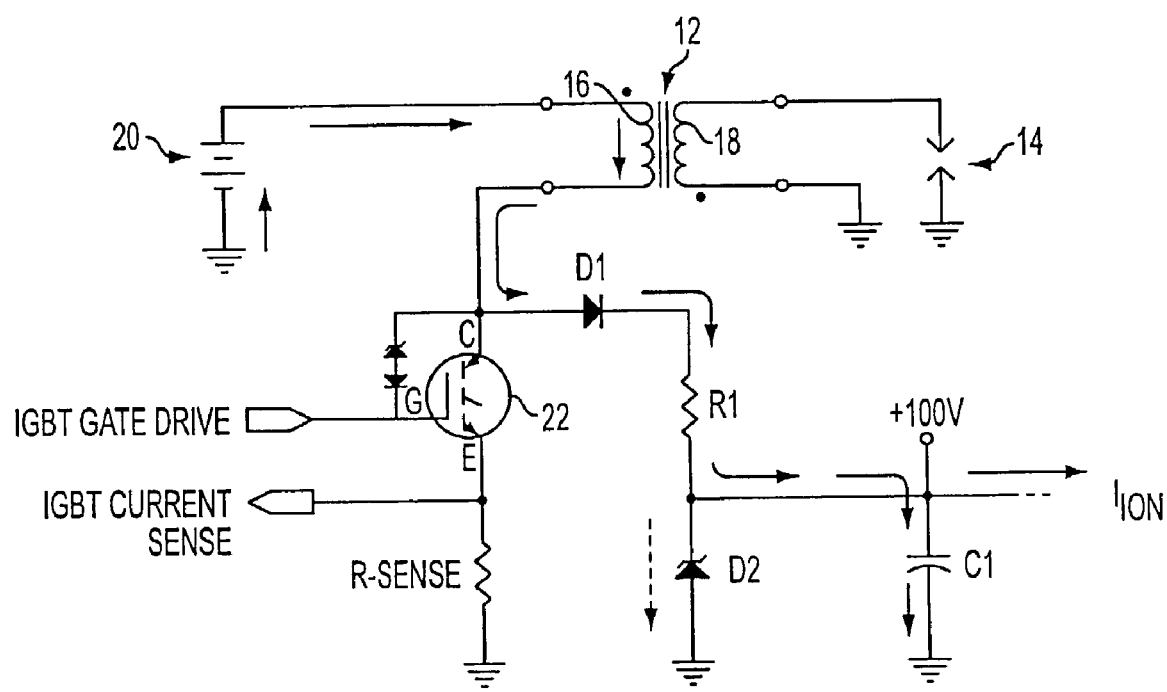
FIG. 43 illustrates an energy storage capacitor being charged from the primary winding.
Figure 45:
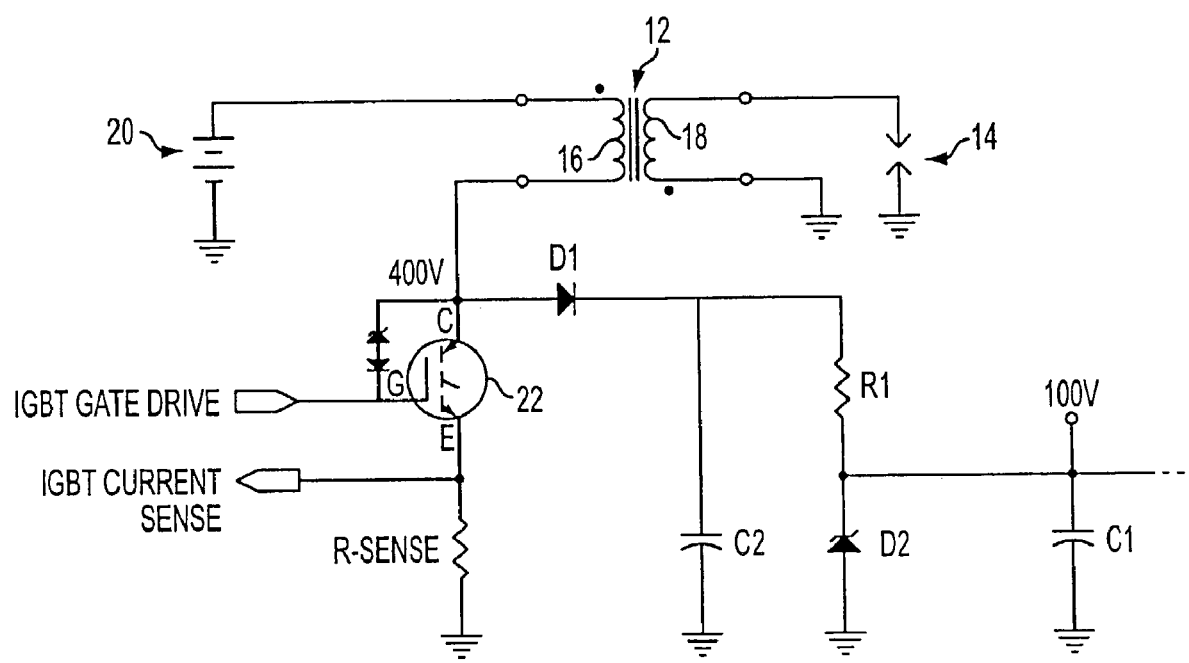
FIG. 45 is a schematic diagram of the circuit that provides a regulated power supply for in-cylinder ionization detection by harvesting the excess ignition coil leakage and magnetizing energy.

A method according to the present invention provides a regulated power supply for in-cylinder ionization detection by harvesting the excess ignition coil leakage and magnetizing energy in a manner which is more effective than the previously described techniques. FIG. 45 is a schematic diagram of the circuit that employs this method. At first glance, the circuit appears to be similar to the second circuit described supra in which an energy storage capacitor is charged from the primary winding (FIG. 43). There are novel and unobvious differences, however, that allow this new circuit to perform the energy storage and voltage regulation function in a fundamentally different and more effective manner.

Figure 46:
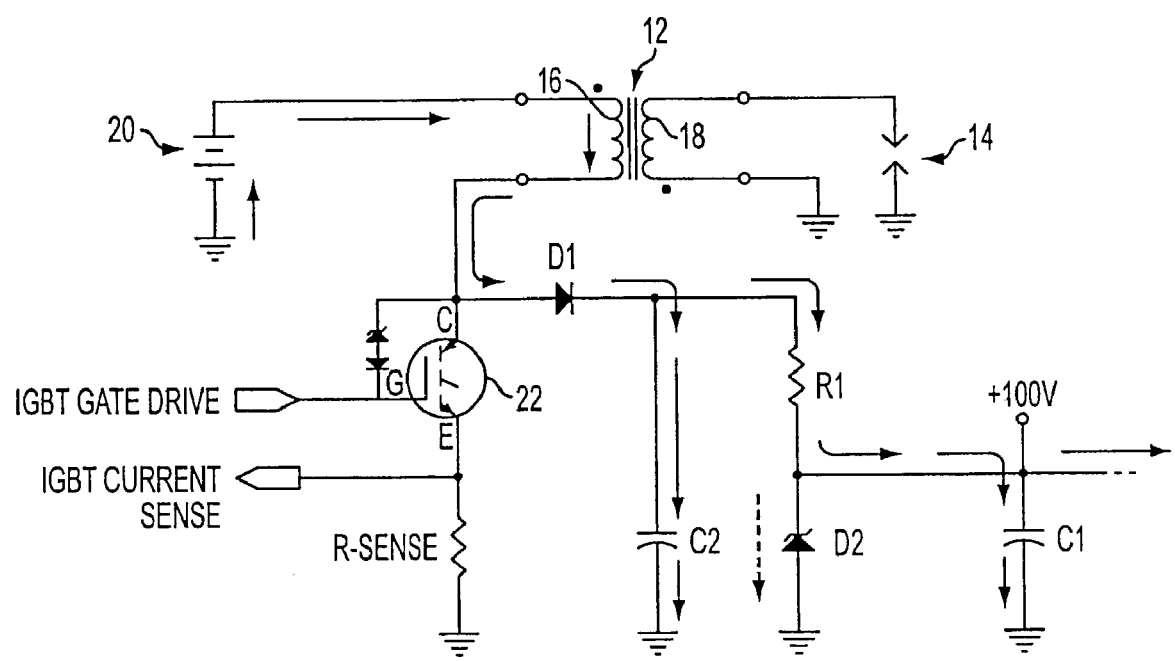
FIG. 46 illustrates the high voltage capacitor charging.

One difference is the addition of energy storage capacitor, C2, which replaces capacitor C1 as the primary energy storage device. As shown in FIG. 46, one terminal of capacitor C2 is connected to the cathode of D1 and the other terminal of capacitor C2 is connected to ground. Energy is stored in the coil by turning on a power switch (IGBT) 22, and applying battery voltage across the primary winding 16 of the ignition coil 12 (700). When the switch (IGBT) 22 turns off, the energy stored in the coil leakage and magnetizing inductances causes the transformer primary voltage to reverse. The collector voltage of the IGBT 22 increases rapidly until it exceeds the voltage on capacitor C2 by one diode drop, 0.7 Volts. At this point, diode D1 forward biases, allowing a forward current to flow through D1 into capacitor C2 (FIG. 46). When this occurs, energy that is stored in the transformer leakage inductance is transferred to capacitor C2 instead of being dissipated on the IGBT (710). Some transformer magnetizing energy may be transferred to capacitor C2 as well.

R1, which is now a much larger value (100's of kohms), is sized to supply enough current from the high voltage capacitor reservoir (C2) to satisfy the average ionization current requirements, and to provide adequate bias current to voltage regulator diode, D2. Because resistor R1 is such a large value, there is never a large excess current flow in D2. This significantly reduces the energy wasted on the voltage regulator diode compared to the other techniques previously described.

When the spark plug 14 fires, the secondary voltage collapses and the magnetizing energy stored in the transformer is delivered to the spark gap to ignite the air-fuel mixture in the cylinder. Simultaneously, the primary voltage collapses, reverse biasing D1 and ending the charging of capacitor C2. At this time, C2 is at its maximum voltage, typically 350 to 400 volts. Capacitor C2 now acts as the primary energy reservoir to maintain the charge on capacitor C1 while supplying current to the ionization circuits and the voltage regulator diode D1 (720).

Figure 47:
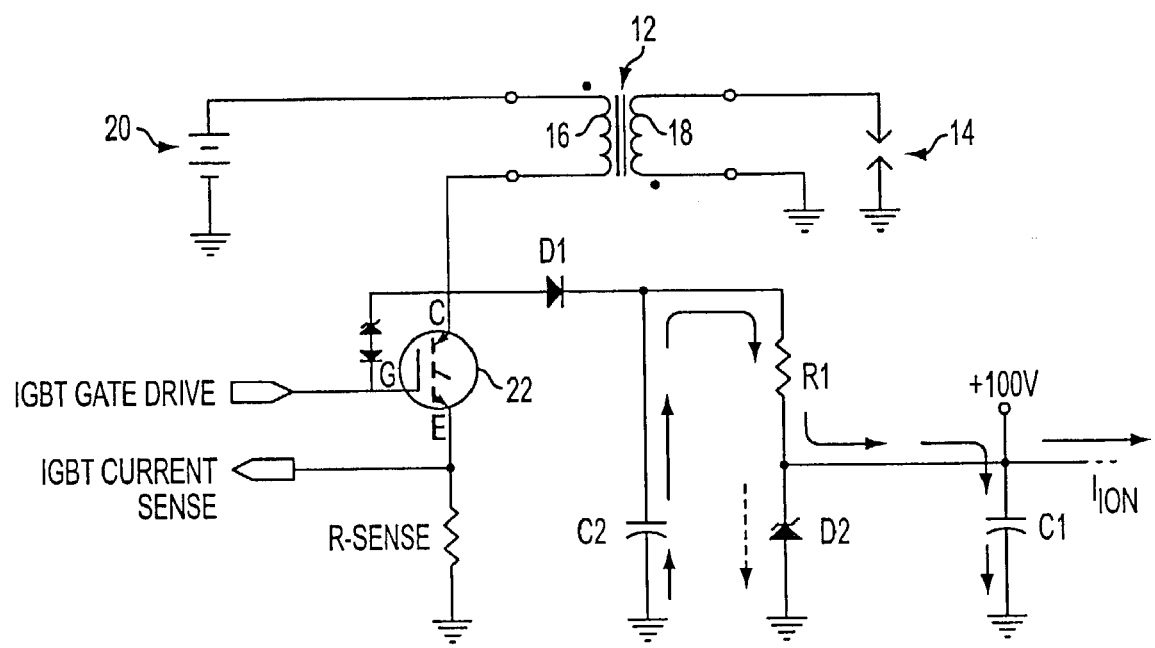
FIG. 47 illustrates the high voltage capacitor discharging.

Capacitor C2 is sized such that it can supply average ionization current under worst case conditions (600 rpm, fouled spark plug) while maintaining a sufficiently high voltage to regulate the ionization supply bus voltage at 100 volts (730) to lower voltage capacitor C1. Since capacitor C1 is no longer the primary energy storage element, it need only be large enough to limit the voltage drop on the ionization bus to acceptable levels while supplying transient ionization currents. Steady state currents are supplied by C2. The discharge current paths of C2 are shown in FIG. 47.

In a preferred embodiment, C1 and C2 equal 0.1 uF and R1 equals 1.8 Megohms. Rsense equals 40 milliohms. C1 is rated at 630 volts. The forward voltage drop for D1 is 0.7 Volts, while the avalanche voltage for zener diode D2 is 100 Volts. D1 is rated at 800 volts reverse voltage.

Thus, the present invention uses a two step method for charging the ionization detection circuit, as opposed to just one stage. Capacitor C2 is charged first, typically up to 400 Volts DC. C2 is then used as a reservoir to charge the second stage capacitor C1. Capacitor C1 will typically charge up to 100 Volts DC. This two stage method of charging produces a stable 100 volt output at capacitor C1. In the prior art, the voltage of capacitor C1 varies as energy is removed. In addition, by using two capacitors or stages, more energy is available to the ionization detection circuit.

Figure 48:
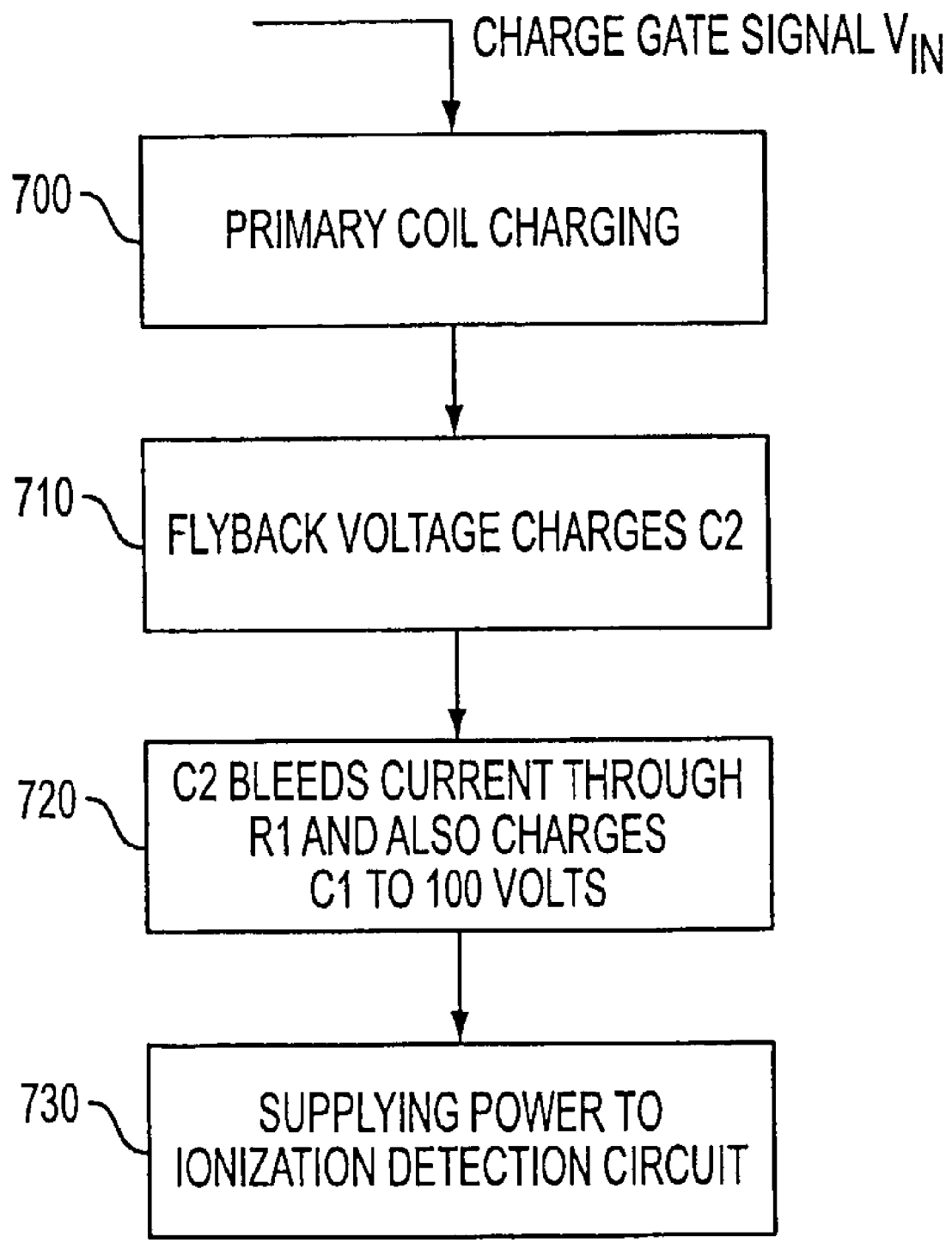
FIG. 48 is a flowchart which illustrates the steps taken in the present embodiment of a circuit that provides a regulated power supply for in-cylinder ionization detection by harvesting excess ignition coil leakage and magnetizing energy.

FIG. 48 is a flowchart which illustrates the steps taken in the present embodiment of a circuit that provides a regulated power supply for in-cylinder ionization detection by harvesting excess ignition coil leakage and magnetizing energy.

Non-limiting examples of some of the unique features of the Ionization Detection Bias Circuit include: (1) capturing all of the energy stored in the transformer leakage inductance and using it as an energy source for the ionization electronics circuits; (2) reducing the dissipation and resulting heating of the primary IGBT by diverting the leakage energy into the high voltage capacitor instead of allowing it to be dissipated on the IGBT; (3) storing energy at a high voltage to take advantage of the fact that energy stored in a capacitor increases as the square of the capacitor voltage allowing a physically smaller capacitor to be used to achieve the same stored energy; (4) reducing the energy wasted on the voltage regulator diode by increasing the value of the current limiting resistor such that the diode never sees large reverse currents; and (5) reducing the value of C1 to reflect the fact that C1 is no longer the main energy storage element for the ionization electronics and that C1 need only be large enough to limit the voltage drop on the ionization voltage bus to acceptable levels during ionization current transients.

Section H: A Method for Reducing Pin Count of an Integrated Ignition Coil with Driver and Ionization Detection Circuit by Multiplexing Ionization Current, Coil Charge Current Feedback, and Driver Gate Signals This feature of the present invention addresses many of the deficiencies noted in the discussion set forth above in Section F entitled "A method for Reducing Pin Count of an Integrated Ignition Coil with Driver and Ionization Detection Circuit by Multiplexing Ionization and Coil Charge Feedback Signals." This feature of the invention multiplexes the ignition driver gate signal with both the ignition coil charge current feedback signal and the ionization signal, and therefore, reduces the package pin count by two.

The conventional design for an integrated ignition coil with driver and ionization detection circuit consists of five pins: 1) coil charge gate signal, 2) charge current feedback signal, 3) ionization current signal, 4) battery power, and 5) battery ground. Each additional pin increases ignition sub-system cost due to the connections to the ignition coil connector, the harness and the engine control module (ECU) connector. In order to reduce subsystem cost, this invention multiplexes the ignition charge gate signal with both the primary charge current feedback and the ionization current signals. Therefore, the present invention has the following pin count: 1) battery power, and 2) battery ground, and 3) multiplexed coil charge gate signal, charge current feedback signal, and ionization current signal.

It is a goal to integrate the ignition coil driver electronics onto the ignition coil (e.g. pencil or coil-on-plug). In order to reduce or remove high current pins between the powertrain control module (PCM) and the ignition coil, a design for an integrated ignition coil with driver consists of four pins: an Ignition coil primary winding charge gate signal, a Primary winding charge current feedback signal, a Battery power supply B+, and a Battery ground.

With the integration of an ionization detection circuit onto the ignition coil with an integrated driver, an additional output pin is required to send the detected ionization current signal back to the powertrain control module PCM. Therefore, the ignition coil with an integrated driver and an ionization circuit requires a five-pin connector.

In order to reduce cost and make coil packaging easier, this feature of the invention multiplexes the ignition primary charge gate signal with both the ionization and the driver current feedback signals so that the ignition coil with an integrated driver and an ionization circuit has a pin count number as few as three.

Figure 49:
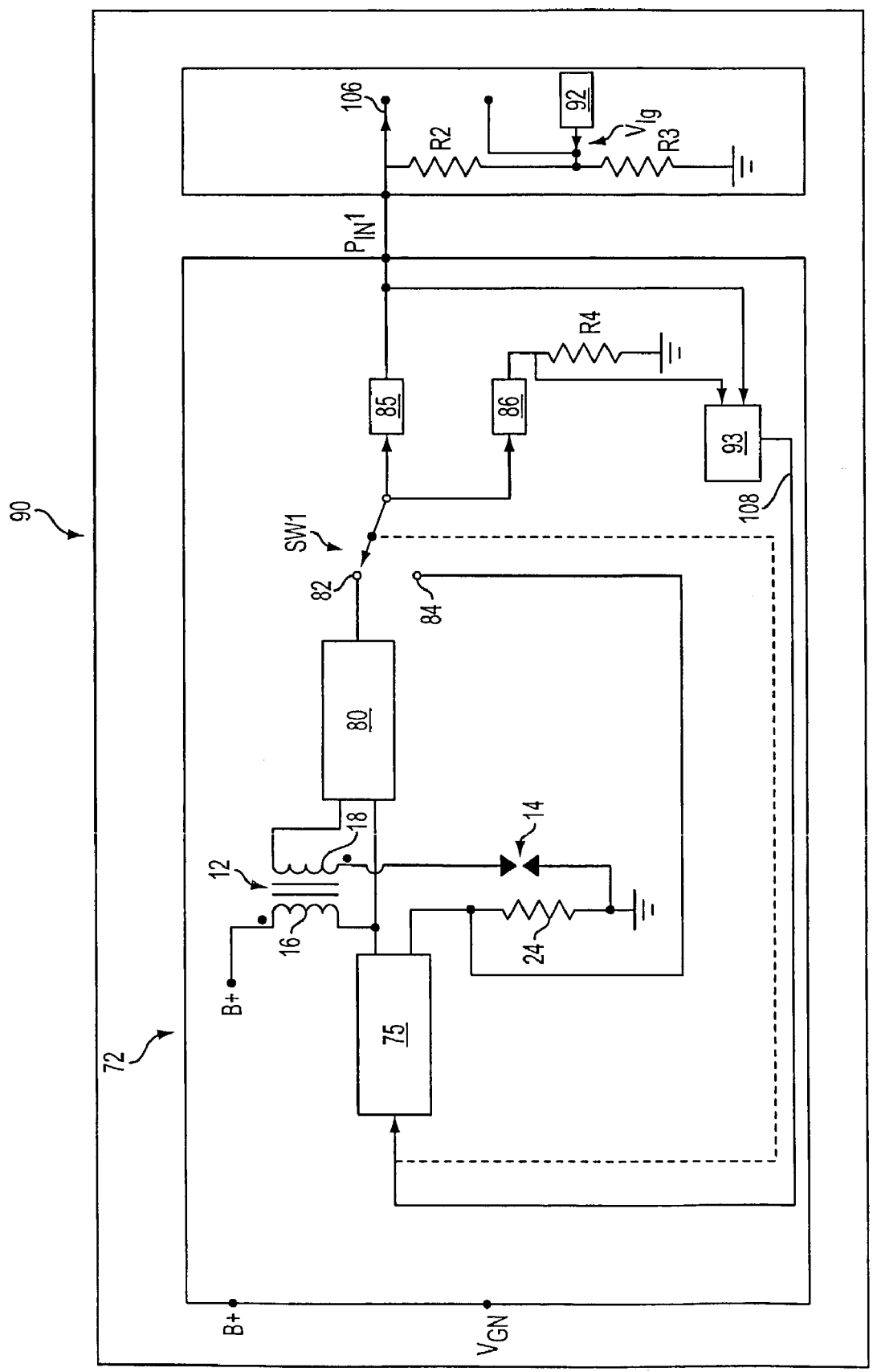
FIG. 49 shows a diagram of an integrated coil driver and ionization detection sub-system which multiplexes ionization and charge current.

FIG. 49 shows a diagram of an integrated coil driver with driver and ionization detection sub-system 90. The integrated ignition coil sub-system 90 consists of a coil driver circuit 75, an ionization detection circuit 80, dual amplifiers 85, 86, and a gate signal regeneration circuit 92. The ignition coil has a primary 16 and a secondary winding 18. Since the two amplifiers 85, 86 are identical current sources, the voltage difference between the two inputs of the difference comparison circuit 93 reflects the charge gate signal $V_{in}$ assuming resistance R4 is equal to the sum of resistors R2 and R3. When the difference is greater than a given threshold, the output 108 of difference comparison circuit 93 remains high, generating a primary charge gate signal $V_{in}$. The driver circuit 75 charges a primary winding 16 of an ignition coil 12 when the charge command signal $V_{in}$ is enabled. The ionization detection circuit 75 applies a bias voltage through a secondary winding 18 of the ignition coil 12 to the spark plug 14. A resulting ionization current $I_{ion}$ is generated due to the ions produced during the combustion process. Finally, the top amplifier 85 magnifies the detected signal for improved signal to noise ratio.

Figure 50A:
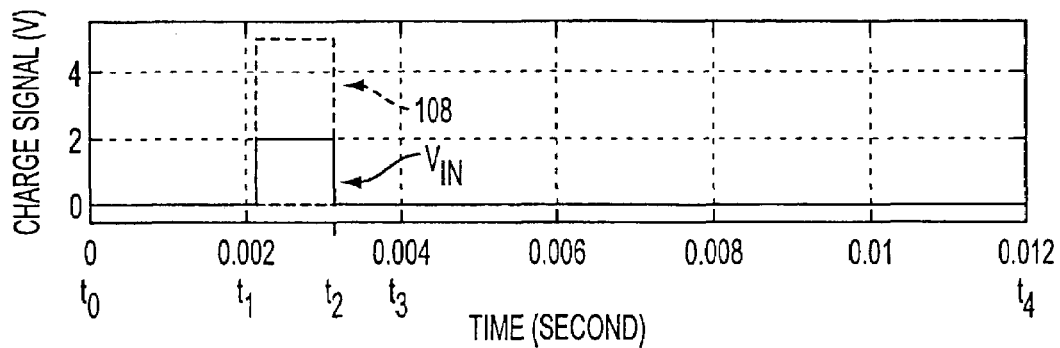
FIG. 50a illustrates the charge gate signal and the differential comparison gate signal.
Figure 50B:
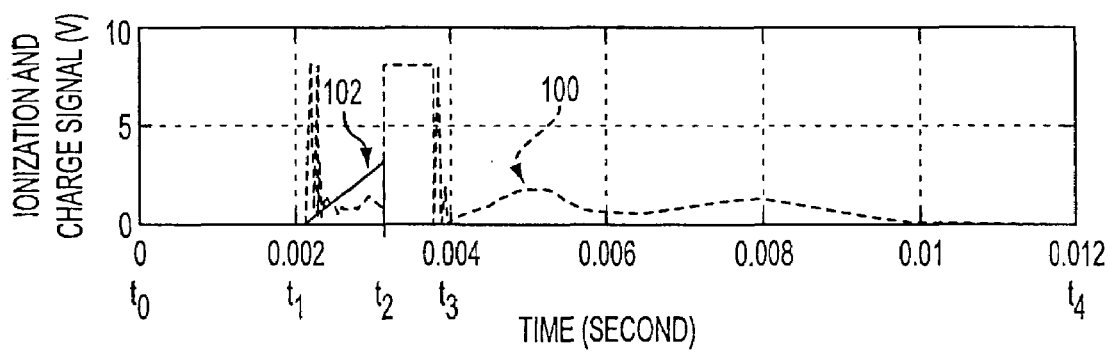
FIG. 50b illustrates the detected ionization and the charge current feedback signal.
Figure 50C:
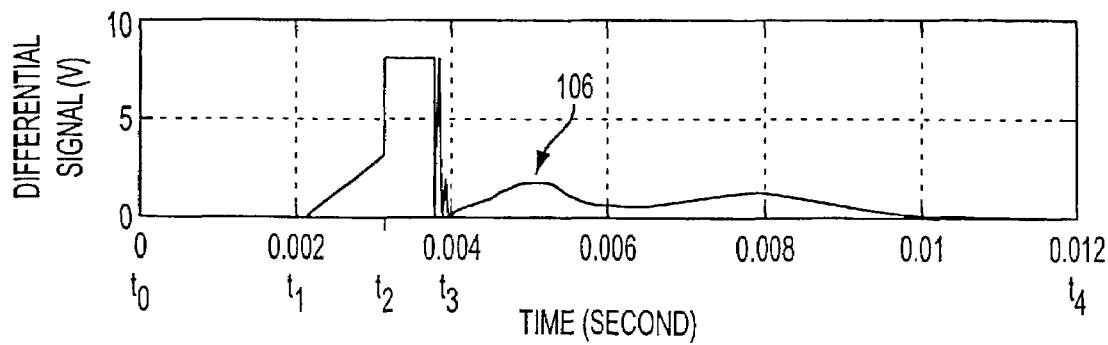
FIG. 50c illustrates the differential ionization signal multiplexed with the charge current feedback signal.

FIG. 50 illustrates multiplexing the ionization, the charge gate and the current feedback signals. FIG. 50 shows the charge gate signal Vin (solid line) and the differential comparison gate signal command 108 (dashed line) (FIG. 50a), the detected ionization signal 100 (dashed line) and the charge current feedback signal 102 (solid line) (FIG. 50b), and the differential ionization signal (ionization signal multiplexed with the charge current feedback signal 106, see FIG. 50c). Between times $t_0$ and $t_1$ there is no combustion and the ignition coil 12 is at rest. The switch SW1 is connected to the ionization current node 82 and outputs the ionization current $I_{ion}$ through the top amplifier 85 to $P_{IN}1$. The output of the top amplifier 85 is also connected to a first input of a difference comparison circuit 93. It is seen from FIG. 49 that the node pin 1 connected to the output of the top amplifier 85 acts as an output node $P_{IN}1$ for the ion current signal and the charge current feedback signals 102. The powertrain control module PCM charge gate signal $V_{in}$ becomes enabled at time $t_1$ and disabled at time $t_2$. At this time, charge gate current Ig flows from the charge gate signal generator 92 through resistor R3 to ground causing gating voltage to appear at a second input of the difference comparison circuit 93.

The reason that this happens is that the charge gate signal generator 92 is a current source. The current flows through resistor R3 because resistor R2 is much greater than resistor R3. Thus the voltage $V_{Ig}$ appearing at the junction of resistors R2 and R3 is R3(Ig). The voltage appearing at the output node of the top amplifier 85 is V2=I1(R2+R3)+R3 (Ig), where I1 is either the ionization signal 100 or the charge current feedback signal 102. The voltage appearing across resistor R4 is V1=I1(R2+R3), where R4 was selected to equal R2+R3. In a preferred embodiment, R4=180 ohms, R2=150 ohms and R3=30 ohms.

In a preferred embodiment, the difference comparison circuit 93 is a comparator with two inputs and one output. The difference between the two input signals is V2−V1=R3 (Ig) (800). Its function is to apply the charge command signal 108 to the coil driver circuit 75 (810). Due to the additional current applied at R3 when the powertrain control module PCM charge gate signal $V_{in}$ becomes enabled, the voltage difference between R4 and R3 is large enough so that the output 108 of the difference comparison circuit 93 remains high during this period, and the primary coil 16 charges fully (820). When the gate command signal $V_{in}$ is not activated, V1=V2=I1(R2+R3) and the output of the difference comparison is low. Thus, although two pins have been eliminated, the charge gate signal $V_{in}$ can still be used to charge the coil 12. In addition, the time period $t_1$ to $t_2$ is a detection window for current feedback.

The air/fuel mixture is ignited between times $t_2$ and $t_3$ (830), and the combustion process is completed between times $t_3$ and $t_4$ (840). The feasibility of time multiplexing between the charge current feedback and ionization signals is shown in FIG. 50b. The switch SW1 switches its input from the ionization current node 82 to a charge current feedback node 84 which is connected to one end of a primary winding 16 of the ignition coil 12 through the coil driver circuit 75. Since combustion happens after ignition, the main ionization detection window is between $t_2$ and $t_4$. This make it possible to multiplex both the ionization signal 100 and the charge current feedback signal 102. The multiplexed signal 106 outputs the ionization detection signal and replaces the ionization signal 100 with the charge current feedback signal 102 when the charge command Vin is enabled, see FIG. 50c. FIG. 50b shows both charge current feedback and ionization signals, and FIG. 50c shows the multiplexed signal. During times t0 and t1, the output multiplexed signal 106 is the ionization signal 100. When the charge command is enabled between times $t_1$ and $t_2$, the output switches to the charge current feedback signal 102 (a voltage signal proportional to primary charge current) see FIG. 50c. After time $t_2$, the multiplexed signal 106 switches back to the ionization signal 100. Note that between times $t_2$ and $t_3$, the ionization signal 100 provides information regarding the ignition process, and between $t_3$ and $t_4$ information regarding the combustion process (850).

In summary, the multiplexed signal 106 outputs the ionization signal 100 and switches to charge current feedback signal 102 when the charge command is active, i.e., between times $t_1$ and $t_2$.

Figure 51:
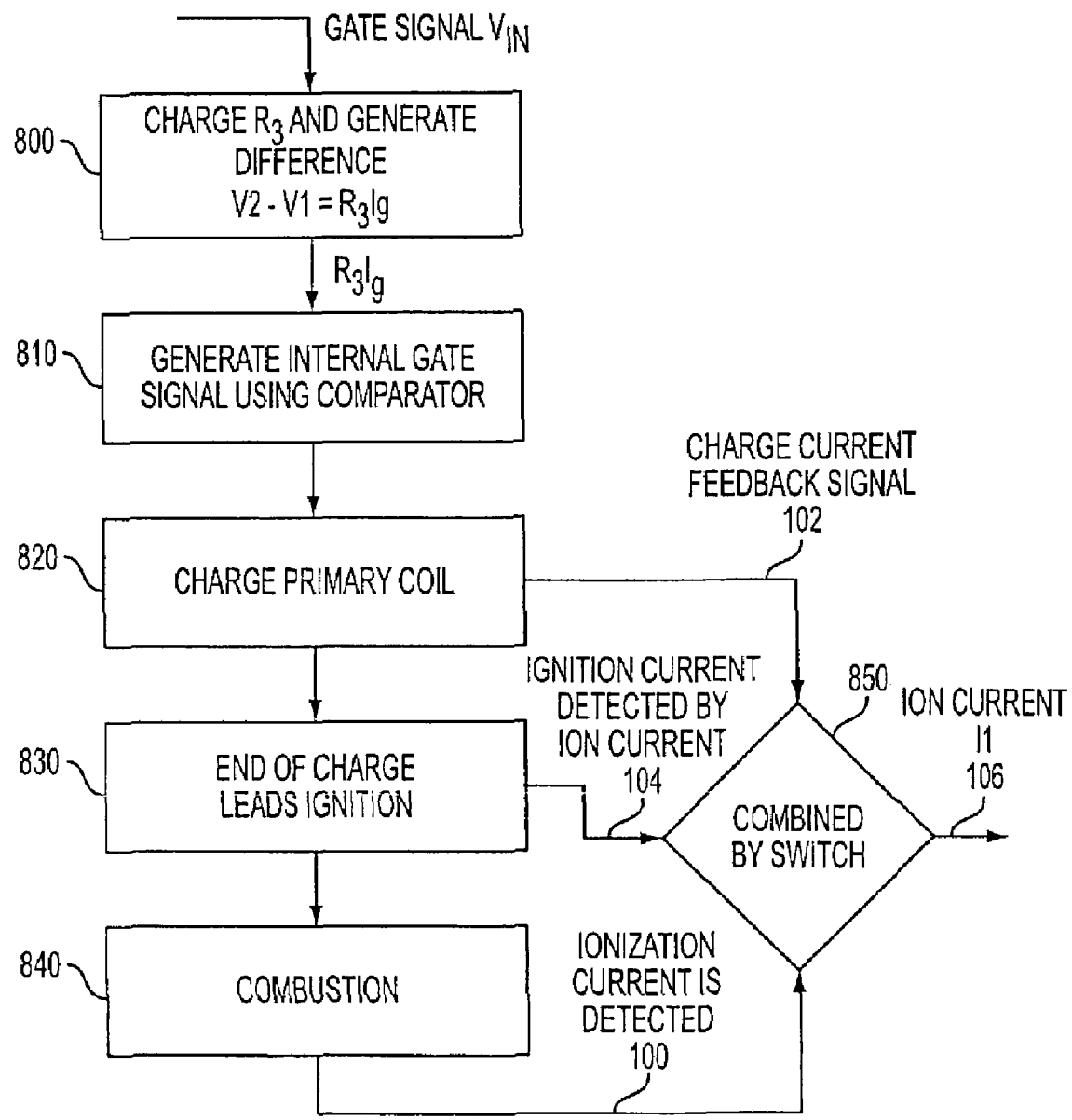
FIG. 51 is a flowchart disclosing the steps taken with the present embodiment of the integrated coil driver and ionization detection sub-system 90 in which package pin count is reduced by two.

FIG. 51 is a flowchart disclosing the steps taken with the present embodiment of the integrated coil driver and ionization detection sub-system 90 in which package pin count by two.

Section J: A Device for Reducing the Part Count and Package Size of an In-Cylinder Ionization Detection System by Integrating The Ionization Detection Circuit and Ignition Coil Driver Into a Single Package Note that the Section I designation has been intentionally not included in this application.

Ignition coil control is currently realized using an IGBT residing inside of a powertrain control module (PCM). Biasing the secondary side 18 of the ignition coil 12 with a predetermined voltage and reading the varying level of current flowing between the electrodes of the spark plug 14 accomplishes ionization detection. The level of current flow is low requiring the signal to be amplified. The electronics for ionization detection can reside either inside the powertrain control module PCM or in a separate module outside of the powertrain control module PCM. Two embodiments are disclosed, an ASIC and a single electronic package. The ASIC defined within this disclosure integrates the IGBT and the ionization detection electronics into one silicon device. The single electronic package defined within this disclosure combines the IGBT and the ionization detection electronics in discrete form into one electronic package.

The following describes two embodiments of an integrated ionization detection circuit and ignition coil driver according to the present invention, an ASIC and a single electronic package. The devices described within this disclosure reduce the cost and complexity of an in-cylinder ionization detection system by combining like functionality into one ASIC or electronic module easing packaging constraints.

Ionization detection is accomplished by biasing the secondary side 18 of the ignition coil 12 with a predetermined voltage and reading the varying level of current flowing through the secondary coil 18 and spark plug 14 circuit. The level of current flow is low therefore requiring amplification to increase the noise immunity of the signal. The circuitry used to bias the coil 12 and accomplish the amplification is made up of devices that can easily be placed into silicon.

One advantage of packaging the circuit on one piece of silicon is that the properties of silicon allow for the creation of "smart" IGBTs that can return a current proportional to the current flowing across the IGBT without creating the heat of sense resistors. A second advantage is that the current signal can also be scaled to match the ionization current signal allowing them to be passed back as one signal.

The Ignition Control Ion Sense ASIC (ICIS) device is a combination of the ionization detection circuitry 80 and the ignition control circuitry 75 into one ASIC. The ionization detection circuitry 80, composed of devices that can be duplicated in silicon, combined with the already available "smart" IGBT silicon designs creates ICIS in one silicon device. This includes single chip as well as multiple chip (chip on chip or chip by chip) solutions. ICIS can be located within the powertrain control module PCM, outside of the powertrain control module PCM as a separate module (see DICIS), or in/on the ignition coil 12.

The Discrete Ignition Ion Sense package (DICIS) is a combination of the ionization detection circuitry 80 and the ignition control circuitry 75 into one electronic package. The ionization detection circuitry 80, in its discrete form, combined with either a "smart" IGBT, "dumb" IGBT, or "dumb" IGBT with additional control and protection creates DICIS in one electronic package. This includes single substrate as well as multiple substrate designs. DICIS can be located in/on the ignition coil 12, near the ignition coil 12, or in other package friendly locations within the vehicle.

FIG. 35 illustrates a circuit which has only 4 pins and which allows the charge current feedback signal 102 and the ionization signal 100 to be passed back as one signal on one pin through the use of time multiplexing.

Figure 52:
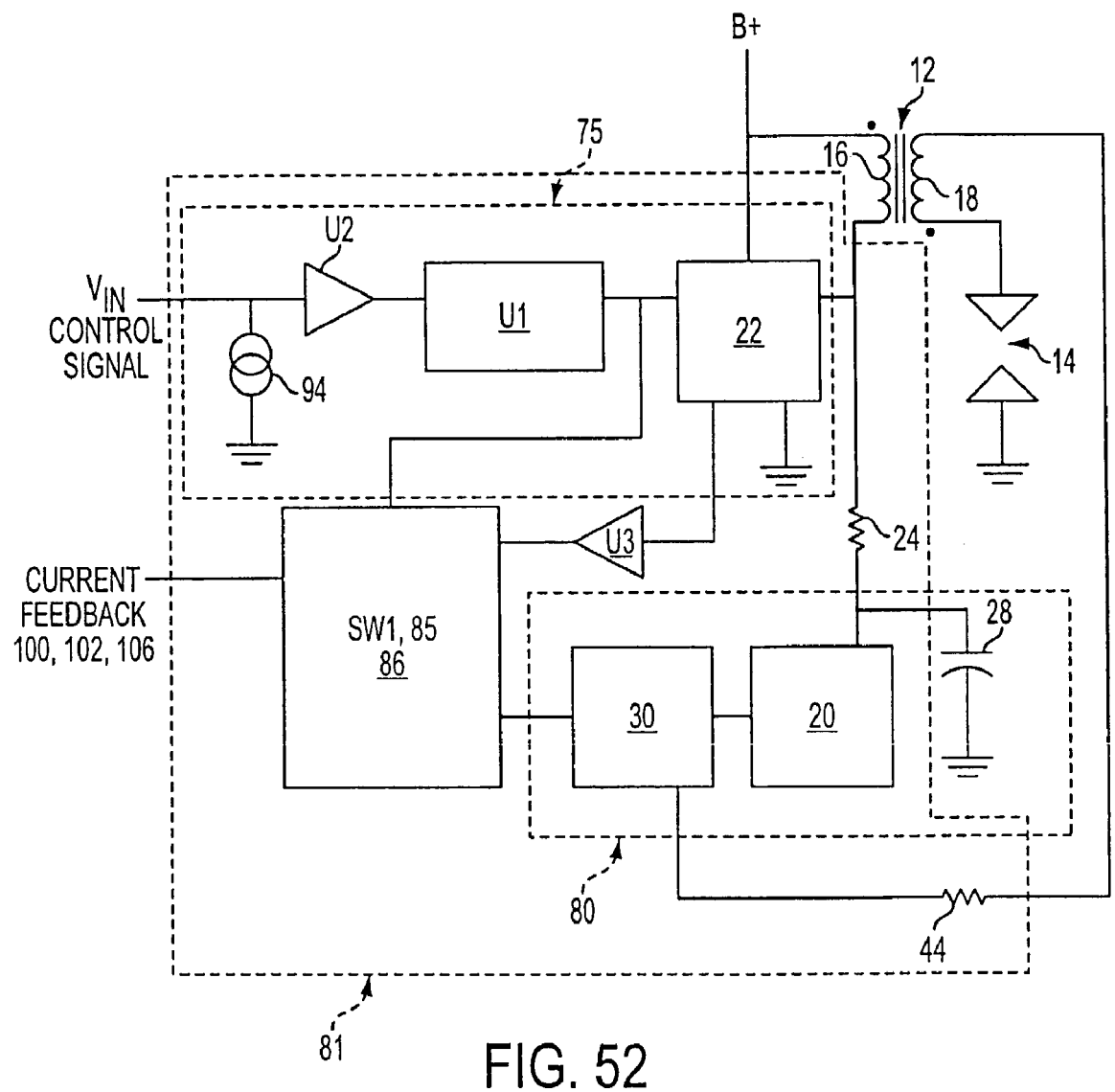
FIG. 52 is a logic block diagram of the present invention for the ASIC (ICIS) option.
Figure 53:
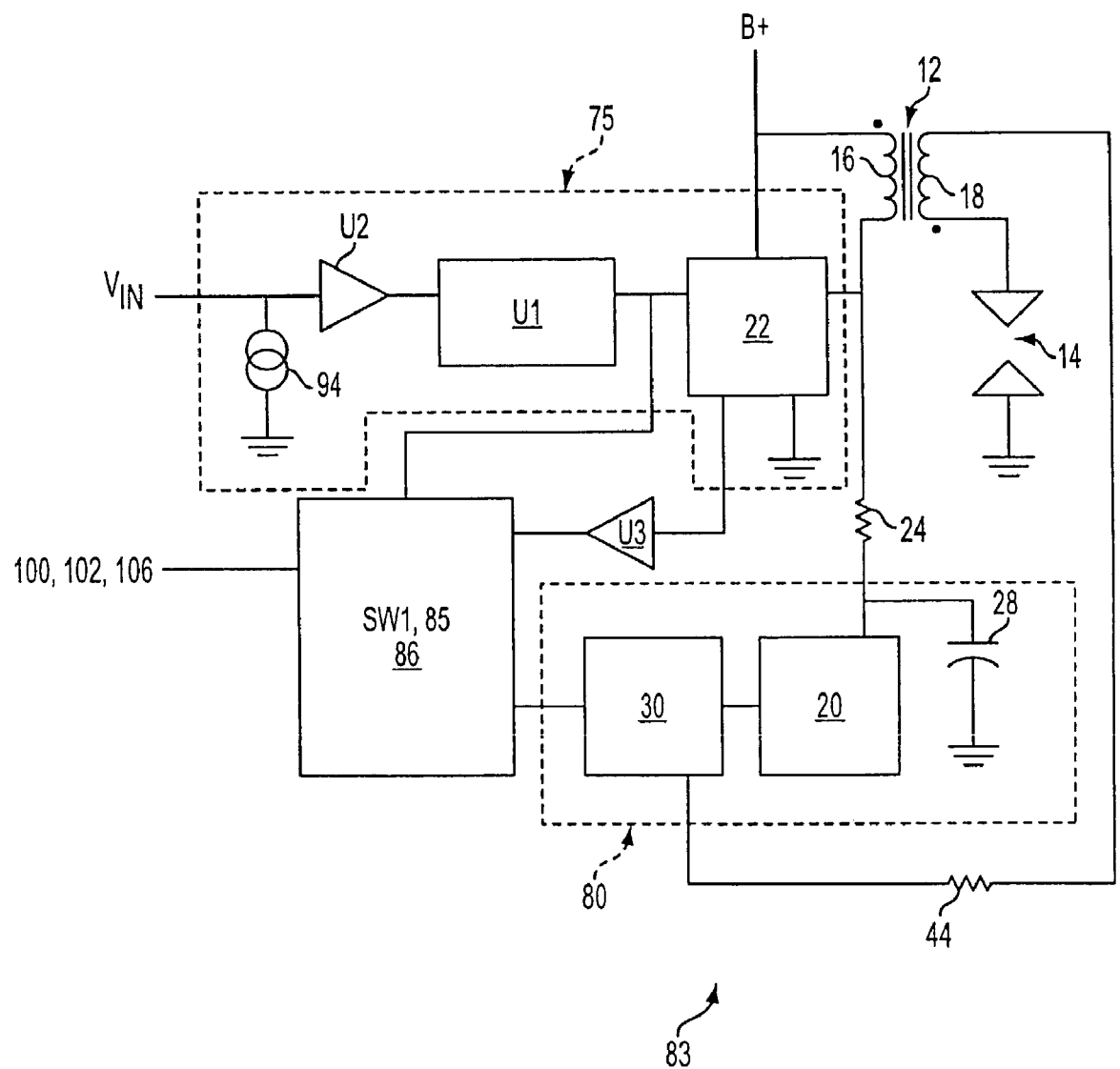
FIG. 53 is a logic block diagram of the present invention for the Single Electronics Package option (DICIS)

FIGS. 52 and 53 are logic block diagrams of the present invention for both the ASIC (ICIS) (FIG. 52) and the single electronics package options (DICIS) (FIG. 53). Shown in both FIGS. 52 and 53 is the coil driver circuit 75 comprising a current sink 94, protection limitation U1, amplifier U2, and a base IGBT 22. In addition an ionization detector 80 comprising current mirror 30, power supply 20 and capacitor 28 is shown. Also shown are resistors 24 and 44, spark plug 14, ignition coil 12 with primary winding 16 and secondary winding 18, amplifier U3, and analog multiplexer buffer 86. The current sink 94 removes noise in the form of voltage spikes. The voltage spikes are high voltage, but of short duration. The current sink prevents these spikes from turning on the IGBT. However, the current sink 94 allows the IGBT command signal to pass.

Figure 54:
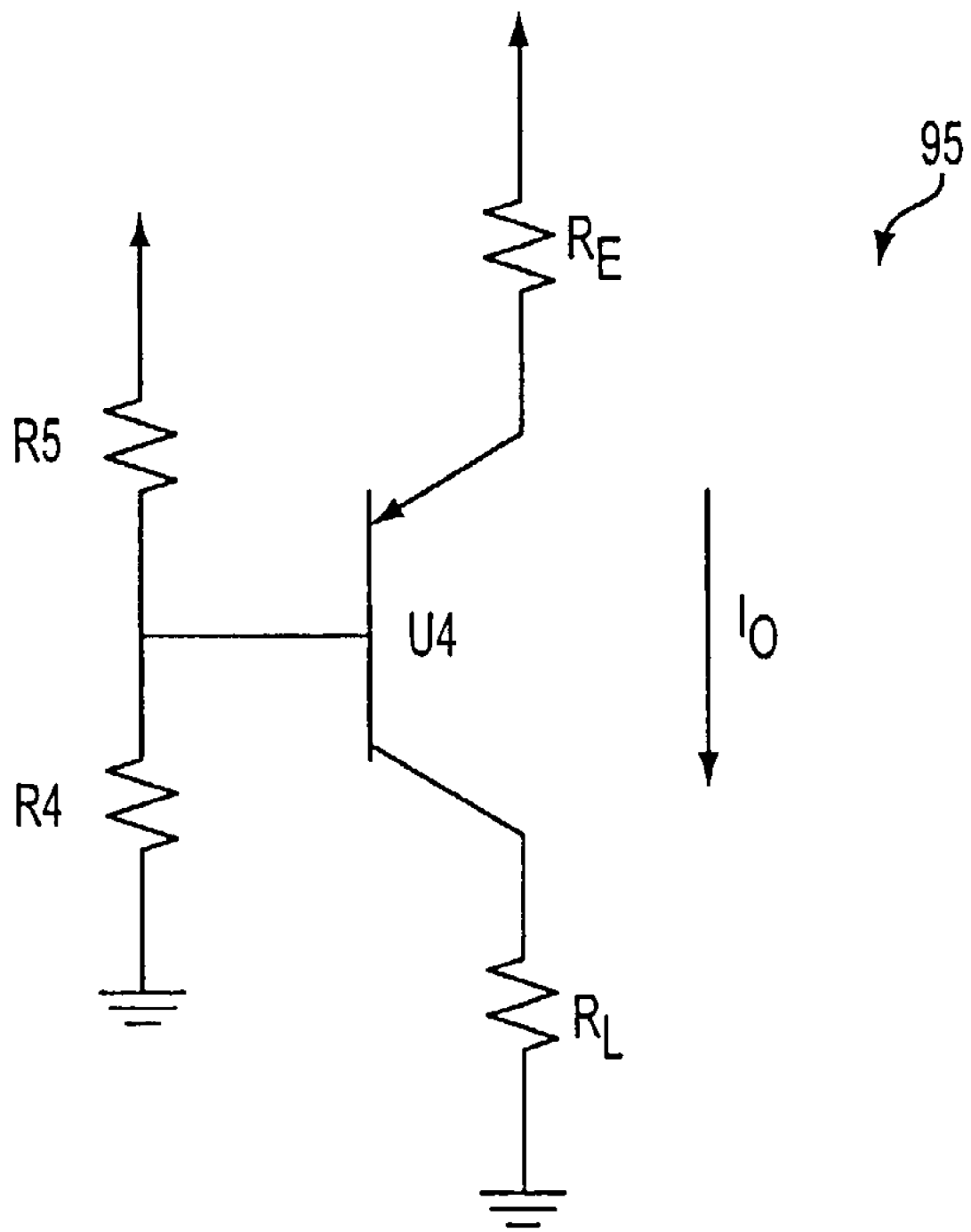
FIG. 54 is a circuit diagram of a current sink 95.

FIG. 54 is a circuit diagram of a current sink 94.

ASIC Option

The Ignition Control Ion Sense ASIC (ICIS) package 81 features an integral IGBT driver, IGBT driver control, and ion sensing current feedback circuitry. All the active circuitry is contained in one silicon device integrated into the ignition coil. The ICIS ASIC can be placed on the coil, near the coil, or within the powertrain control module PCM in place of the current coil driver IC.

The combustion monitoring coil (CMC) has a four pin interface: 1) Power—B+, 2) Control ($V_{IN}$)—Controls IGBT on/off and the source of the current feedback signal, 3) Current Feedback (100, 102, 106)—When IGBT is on, indicates coil current. When IGBT is off, indicates ion current, and 4) Ground.

Single Electronics Package Option

The Discrete Ignition Control Ion Sense (DICIS) package 83 features an integral IGBT driver and ion sensing current feedback. All the active circuitry is discrete and contained in one electronic package. The package can be placed on the coil or near the coil.

The combustion monitoring coil (CMC) has a four pin interface: 1) Power—B+; 2) Control—($V_{IN}$) Controls IGBT on/off and the source of the current feedback signal; 3) Current Feedback (100, 102, 106)—when IGBT is on, indicates coil current—when IGBT is off, indicates ion current; and 4) Ground.

Section K: A Device to Provide a Regulated Power Supply for in Cylinder Ionization Detection by Using a Charge Pump The ionization current of an internal combustion engine can be used for diagnosing engine misfire, knock, ignition timing and duration, etc. Through sophisticated signal conditioning processing, the individual cylinder combustion properties can also be obtained. Therefore, the engine combustion process can be precisely monitored and controlled in closed loop. To detect in-cylinder ions generated during the combustion process, a DC bias voltage needs to be applied between the spark plug gap. There are two ways to generate the DC bias: conventional DC power supply (large electronics) and capacitor charges by primary or secondary flyback voltage (high voltage capacitor). Both approaches can not meet the requirement to integrate the ionization circuit on the ignition coil (see Section E) due to the size of DC power supply and reliability of high voltage capacitors. This feature of the invention uses a high voltage charge pump to provide enough DC bias voltage for measuring ionization Typically, flyback voltage is used to charge the capacitor which supplies current to the ionization detection circuit, see Section G. This necessitates the use of high voltage capacitors. Generally, ceramic capacitors are used. However, as temperature fluctuates, the board on which the capacitor is mounted can flex, causing the ceramic capacitor to crack and fail. In the present invention, the ionization current bias voltage source is a charge pump, see FIG. 5.

Figure 55:
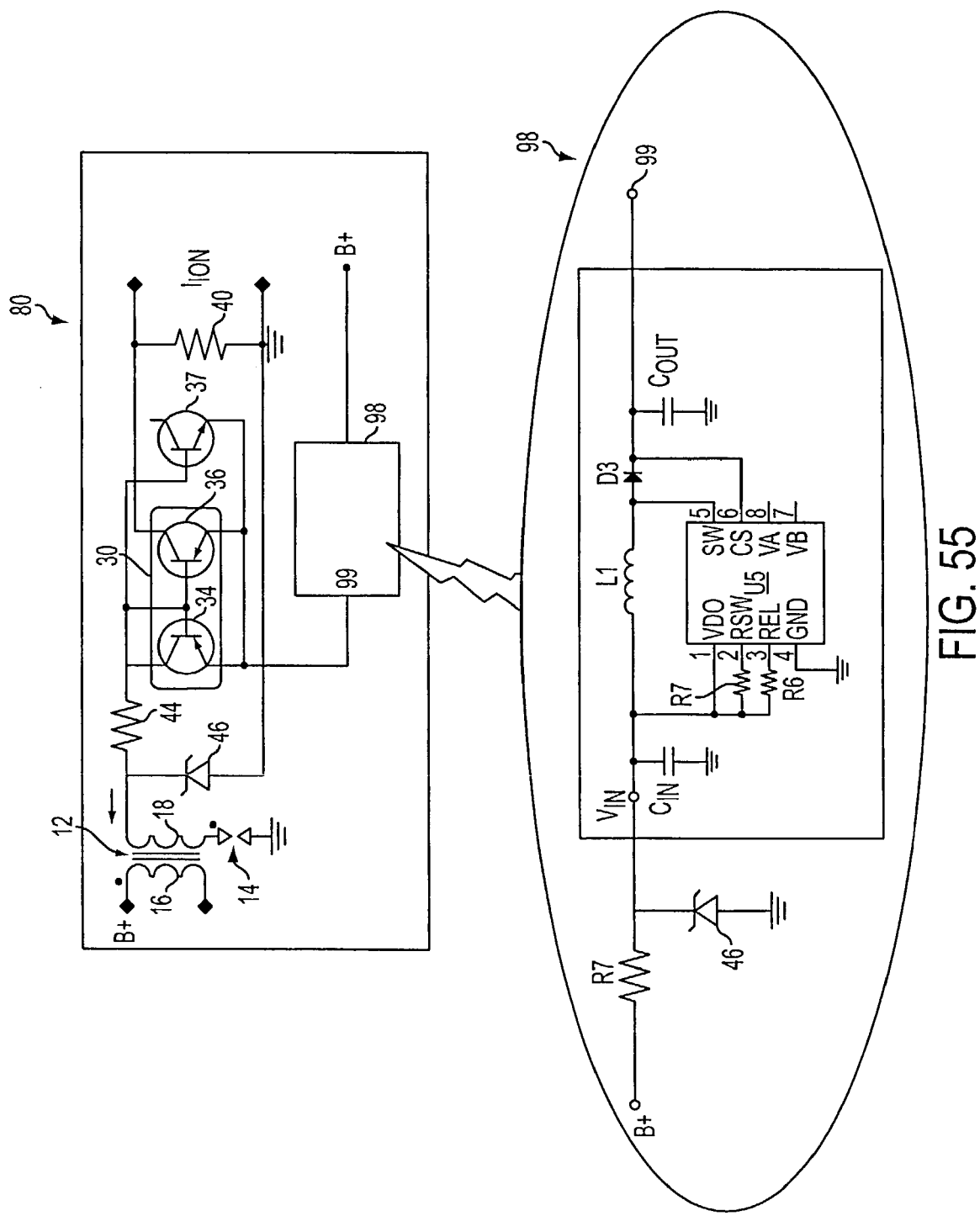
FIG. 55 is a circuit diagram of an ionization detection circuit using a charge pump the bias voltage source.

FIG. 55 shows an example of ionization detection circuit 80 with a blow-up sample bias voltage circuit using a charge pump 98. The charge pump circuit 98 converts the 12 Volt DC at the B+ terminal to a 90 to 100 volt pulse train with a pulse repetition frequency of 500 kHz at the charge pump output 99.

In a preferred embodiment, a model number MIC4827 EL driver (U5) is used in the charge pump circuit 98. It is manufactured by Micrel. The following table provides the pin configuration of the chip (U5) along with a table explaining their functions.

| Pin Number | Pin Name | Pin Function |
|---|---|---|
| 1 | VDD | Supply (input): 1.8 V to 5.5 V for internal circuitry. |
| 2 | RSW | Switch Resistor (external Component): Set switch frequency of the internal power MOSFET by connecting an external resistor to VDD. Connecting the external resistor to GND disables the switch oscillator and shuts down the device. |
| 3 | REL | EL Resistor (External Component): Set EL frequency of the internal H-bridge driver by connecting an external resistor to VDD. Connecting the external resistor to GND disables the EL oscillator. |
| 4 | GND | Ground Return. |
| 5 | SW | Switch Node (Input): Internal high-voltage power MOSFET drain. |
| 6 | CS | Regulated Boost Output (External Component): Connect to the output capacitor of the boost regulator and connect to the cathode of the diode. |

| Pin Number | Pin Name | Pin Function |
|---|---|---|
| 7 | VB | EL Output: Connect to one end of the EL lamp. Polarity is not important. |
| 8 | VA | EL Output: Connect to the other end of the EL lamp. Polarity is not important. |

The MIC4827 EL driver (U5) is comprised of two stages: a boost stage and an H-bridge stage. The boost stage steps the input voltage up to +90 Volts. The MIC4827 features separate oscillators for the boost-and H-bridge stages. External resistors independently set the operating frequency for each stage.

In a preferred embodiment, capacitor $C_{IN}$=10 uF, capacitor $C_{OUT}$=0.033 uF/100 Volts, D3 is a model 1N4148 diode, L1 is a 220 uH inductor, resistor R7=322 kohms and resistor R6=3.32 Mohms.

Using a charge pump 98 as the DC bias voltage has several advantages. First, eliminating high voltage capacitors as the power supply for the ion bias voltage (see Section G) leads to reduced cost and improved reliability (avoids cracked capacitor in hash environment). Further, size reduction results in more available space that is helpful for both pencil and COP coil-on-plug) coils. Additionally, the capacitor bias voltage, when charged by fly-back voltage (see section G), requires several ignition events to fully charge the capacitor. Also, in order to be able to detect ionization current during engine start-up operation, a few ignitions are used to charge the capacitor and get the ionization bias voltage ready. Using a charge pump can eliminate this requirement. Still further, since a charge pump can be easily manufactured on a piece of silicon along with the rest of ionization detection circuit (see Section E), this feature presents a large cost savings when compared with using expensive high voltage compact capacitors.

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:

1. A method of providing a regulated power supply for in-cylinder ionization detection, comprising the steps of:
    harvesting an ignition coil leakage energy from a primary winding of an ignition coil; and
    harvesting magnetizing energy from said primary winding of said ignition coil following turn off of said ignition coil.

2. The method according to claim 1 wherein said step of harvesting an ignition coil leakage energy comprises the steps of:
    turning a switch off;
    reversing a transformer primaiy voltage;
    forward biasing a diode; and
    charging a capacitor.

3. The method according to claim 1 wherein said step of harvesting an ignition coil leakage energy further comprises the step of capturing energy stored in a transformer leakage inductance and using it as an energy source for an ionization electronics circuit.

4. The method according to claim 1 wherein said step of harvesting an ignition coil leakage energy further comprises the step of diverting leakage energy into a high voltage capacitor, whereby dissipation and resulting heaxing of a primary IGBT is reduced.

5. The method according to claim 2 wherein said step of harvesting an ignition coil leakage energy thriher comprises the step of storing energy at 350 to 400 volts in a high voltage capacitor, whereby a smaller capacitor can be used to store energy.

6. The method according to claim 2 wherein said step of harvesting an ignition coil leakage energy further comprises the steps of:
    firing a spark plug;
    collapsing a secondaxy voltage of said transformer;
    igniting an air-fuel mixture;
    collapsing a primary voltage of said transformer; and
    reverse biasing said diode.

7. The method according to claim 2 further comprising the step of supplying current to at least one ionization circuit.

8. The method according to claim 2 further comprising the step of supplying current to a second capacitor.

9. The method according to claim 6 further comprising the step of supplying current to at least one ionization circuit.

10. The method according to claim 6 further comprising the step of supplying current to a second capacitor.

11. The method according to claim 7 wherein said step of supplying current comprises bleeding current from said capacitor to said at least one ionization current.

12. The method according to claim 8 wherein said step of supplying current comprises bleeding current from said capacitor to said second capacitor.

13. The method according to claim 9 wherein said step of supplying current comprises bleeding current from said capacitor to said at least one ionization current.

14. The method according to claim 10 wherein said step of supplying current comprises bleeding current from said capacitor to said second capacitor.

* * * * *

UNITED STATES PATENT AND TRADEMARK OFFICE
CERTIFICATE OF CORRECTION

PATENT NO.       : 7,137,385 B2
APPLICATION NO.  : 10/458712
DATED            : November 21, 2006
INVENTOR(S)      : Stephen J. Newton It is certified that error appears in the above-identified patent and that said Letters Patent is hereby corrected as shown below:

On the Title Page, Item (54) Title, and Column 1, line 4 "Coli" should be --Coil--.
Column 2, line 56, "engine." should be --engine;--.
Column 4, line 7, "signal" should be --signals--.
Column 4, line 20, after "pump" insert --as--.
Column 4, line 28, "used" should be --use--.
Column 4, line 51, after "circuit" insert --to--.
Column 5, line 49, "drover" should be --driver--.
Column 6, line 24, after "(" insert --or--.
Column 11, line 14, "opens the" should be --opens and the--.
Column 12, line 5, after "is" delete "at".
Column 12, line 7, after "tell" insert --in--.
Column 12, line 8, after "is" delete "in".
Column 12, line 18, "State-of the-art" should be --State-of-the-art---
Column 21, line 12, "$I_{pri}$" should be --$L_{pri}$--.
Column 21, line 34, "ion" should be --$I_{ion}$--.
Column 24, line 31, after "harness" insert --,--.
Column 24, line 40, after "e.g." insert --,--.
Column 25, line 53, "$V_{in}$becomes" should be-- $V_{in}$ becomes--.
Column 28, line 29, after "ionization" insert --current.--.
Column 28, line 37, "FIG. 5" should be --FIG. 55--.
Column 29, line 30, "section G" should be --Section G--.
Column 30, line 5, Claim 2, "primaiy" should be --primary--.
Column 30, line 16, Claim 4, "heaxing" should be --heating--.
Column 30, line 19, Claim 5, "thriher" should be --further--.
Column 30, line 27, Claim 6, "secondaxy" should be --secondary--.

Signed and Sealed this

Sixth Day of March, 2007

JON W. DUDAS
*Director of the United States Patent and Trademark Office*